(12) United States Patent
Lott et al.

(10) Patent No.: US 10,118,146 B2
(45) Date of Patent: *Nov. 6, 2018

(54) SYSTEMS AND METHODS FOR HYDROPROCESSING HEAVY OIL

(71) Applicant: HEADWATERS HEAVY OIL, LLC, South Jordan, UT (US)

(72) Inventors: Roger K. Lott, Edmonton (CA); Lap-Keung Lee, West Windsor, NJ (US)

(73) Assignee: Hydrocarbon Technology & Innovation, LLC, Lawrenceville, NJ (US)

( * ) Notice: Subject to any disclaimer, the term of this patent is extended or adjusted under 35 U.S.C. 154(b) by 146 days.

This patent is subject to a terminal disclaimer.

(21) Appl. No.: 15/354,230

(22) Filed: Nov. 17, 2016

(65) Prior Publication Data

US 2017/0066978 A1    Mar. 9, 2017

Related U.S. Application Data

(60) Continuation of application No. 14/095,698, filed on Dec. 3, 2013, now Pat. No. 9,605,215, which is a
(Continued)

(51) Int. Cl.
*B01J 8/08* (2006.01)
*C10G 49/12* (2006.01)
(Continued)

(52) U.S. Cl.
CPC . *B01J 8/08* (2013.01); *B01J 8/22* (2013.01); *B01J 8/226* (2013.01); *C10G 45/04* (2013.01);
(Continued)

(58) Field of Classification Search
CPC ........... B01J 8/08; C10G 49/005; C10G 49/12
See application file for complete search history.

(56) References Cited

U.S. PATENT DOCUMENTS

| 2,850,552 | A | 9/1958 | Ogle |
| 3,019,180 | A | 2/1959 | Schreiener et al. |

(Continued)

FOREIGN PATENT DOCUMENTS

| CA | 2004882 | 6/1991 |
| CA | 2088402 | 7/1993 |

(Continued)

OTHER PUBLICATIONS

U.S. Appl. No. 14/836,792, filed Aug. 26, 2015, Harris et al.
(Continued)

*Primary Examiner* — Renee Robinson
(74) *Attorney, Agent, or Firm* — Workman Nydegger

(57) ABSTRACT

A system and method for preparing and conditioning a heavy oil feedstock for hydroprocessing in a hydroprocessing system includes forming metal sulfide catalyst particles in situ within the heavy oil feedstock. The metal sulfide catalyst particles are formed in situ by (1) premixing a catalyst precursor with a hydrocarbon diluent to form a diluted precursor mixture, (2) mixing the diluted precursor mixture with the heavy oil feedstock to form a conditioned feedstock, and (3) heating the conditioned feedstock to decompose the catalyst precursor and cause or allow metal from the precursor to react with sulfur in the heavy oil feedstock to form metal sulfide catalyst particles in situ in the heavy oil feedstock. The in situ formed metal sulfide catalyst particles catalyze beneficial upgrading reactions between the heavy oil feedstock and hydrogen and eliminates or reduces formation of coke precursors and sediment.

28 Claims, 27 Drawing Sheets

Related U.S. Application Data continuation of application No. 13/866,220, filed on Apr. 19, 2013, now Pat. No. 8,673,130, which is a continuation of application No. 12/838,761, filed on Jul. 19, 2010, now Pat. No. 8,431,016, which is a continuation of application No. 12/106,112, filed on Apr. 18, 2008, now Pat. No. 7,815,870, which is a division of application No. 11/117,202, filed on Aug. 28, 2005, now Pat. No. 7,449,103, application No. 15/354,230, which is a continuation-in-part of application No. 11/374,369, filed on Mar. 13, 2006, which is a continuation-in-part of application No. 11/117,262, filed on Apr. 28, 2005, now Pat. No. 7,578,928.

(60) Provisional application No. 60/566,335, filed on Apr. 28, 2004, provisional application No. 60/566,268, filed on Apr. 28, 2004, provisional application No. 60/566,345, filed on Apr. 28, 2004.

(51) Int. Cl.
| | |
|---|---|
| *C10G 45/16* | (2006.01) |
| *C10G 45/56* | (2006.01) |
| *B01J 8/22* | (2006.01) |
| *C10G 47/26* | (2006.01) |
| *C10G 67/08* | (2006.01) |
| *C10G 65/02* | (2006.01) |
| *C10G 49/00* | (2006.01) |
| *C10G 45/04* | (2006.01) |
| *C10G 45/34* | (2006.01) |
| *C10G 45/46* | (2006.01) |
| *C10G 47/06* | (2006.01) |
| *C10G 65/00* | (2006.01) |

(52) U.S. Cl.
CPC ............ *C10G 45/16* (2013.01); *C10G 45/34* (2013.01); *C10G 45/46* (2013.01); *C10G 45/56* (2013.01); *C10G 47/06* (2013.01); *C10G 47/26* (2013.01); *C10G 49/005* (2013.01); *C10G 49/12* (2013.01); *C10G 65/00* (2013.01); *C10G 65/02* (2013.01); *C10G 67/08* (2013.01); *C10G 2300/107* (2013.01); *C10G 2300/1033* (2013.01); *C10G 2300/1077* (2013.01); *C10G 2300/202* (2013.01); *C10G 2300/206* (2013.01); *C10G 2300/4056* (2013.01); *C10G 2300/70* (2013.01); *C10G 2300/703* (2013.01); *C10G 2300/802* (2013.01)

(56) References Cited

U.S. PATENT DOCUMENTS

| | | | |
|---|---|---|---|
| 3,161,585 | A | 12/1964 | Gleim et al. |
| 3,254,017 | A | 5/1966 | Arey, Jr. et al. |
| 3,267,021 | A | 8/1966 | Gould |
| 3,297,563 | A | 1/1967 | Doumani |
| 3,349,713 | A | 10/1967 | Fassbender |
| 3,362,972 | A | 1/1968 | Kollar |
| 3,578,690 | A | 5/1971 | Becker |
| 3,595,891 | A | 7/1971 | Cavitt |
| 3,622,497 | A | 11/1971 | Gleim |
| 3,622,498 | A | 11/1971 | Stolfa et al. |
| 3,694,351 | A | 9/1972 | White |
| 3,694,352 | A | 9/1972 | Gleim |
| 3,816,020 | A | 6/1974 | Ogles |
| 3,870,623 | A | 3/1975 | Johnson et al. |
| 3,892,389 | A | 7/1975 | Contastin |
| 3,915,842 | A | 10/1975 | Gatsis |
| 3,919,074 | A | 11/1975 | Gatsis |
| 3,953,362 | A | 4/1976 | Lines et al. |
| 3,983,028 | A | 9/1976 | McCollum et al. |
| 3,992,285 | A | 11/1976 | Hutchings |
| 4,022,681 | A | 5/1977 | Sheng et al. |
| 4,066,530 | A | 1/1978 | Aldridge et al. |
| 4,066,561 | A | 1/1978 | Nnadi |
| 4,067,798 | A | 1/1978 | Hauschildt et al. |
| 4,067,799 | A | 1/1978 | Bearden, Jr. et al. |
| 4,068,830 | A | 1/1978 | Gray |
| 4,077,867 | A | 3/1978 | Aldridge et al. |
| 4,083,803 | A | 4/1978 | Oswald et al. |
| 4,125,455 | A | 11/1978 | Herbstman |
| 4,134,825 | A | 1/1979 | Bearden, Jr. et al. |
| 4,148,750 | A | 4/1979 | Pine |
| 4,151,070 | A | 4/1979 | Allan et al. |
| 4,178,227 | A | 12/1979 | Metrailer et al. |
| 4,181,601 | A | 1/1980 | Sze |
| 4,192,735 | A | 3/1980 | Aldridge et al. |
| 4,196,072 | A | 4/1980 | Aldridge et al. |
| 4,226,742 | A | 10/1980 | Bearden, Jr. et al. |
| 4,252,634 | A | 2/1981 | Khulbe et al. |
| 4,285,804 | A | 8/1981 | Jacquin et al. |
| 4,298,454 | A | 11/1981 | Aldridge et al. |
| 4,305,808 | A | 12/1981 | Bowes |
| 4,313,818 | A | 2/1982 | Aldridge et al. |
| 4,325,802 | A | 4/1982 | Porter et al. |
| 4,338,183 | A | 7/1982 | Gatsis |
| 4,352,729 | A | 10/1982 | Jacquin et al. |
| 4,370,221 | A | 1/1983 | Patmore et al. |
| 4,389,301 | A | 6/1983 | Dahlberg et al. |
| 4,411,768 | A | 10/1983 | Unger et al. |
| 4,420,008 | A | 12/1983 | Shu |
| 4,422,927 | A | 12/1983 | Kowalczyk et al. |
| 4,422,960 | A | 12/1983 | Shiroto et al. |
| 4,427,532 | A | 1/1984 | Varghese |
| 4,430,207 | A | 2/1984 | Kukes |
| 4,435,314 | A | 3/1984 | van de Leemput et al. |
| 4,452,265 | A | 6/1984 | Lonnebring |
| 4,454,023 | A | 6/1984 | Lutz |
| 4,455,218 | A | 6/1984 | Dymock et al. |
| 4,465,630 | A | 8/1984 | Akashi et al. |
| 4,467,049 | A | 8/1984 | Yoshii et al. |
| 4,485,004 | A | 11/1984 | Fisher et al. |
| 4,485,008 | A | 11/1984 | Maa et al. |
| 4,508,616 | A | 4/1985 | Larrauri et al. |
| 4,513,098 | A | 4/1985 | Tsao |
| 4,551,230 | A | 11/1985 | Kukes et al. |
| 4,557,823 | A | 12/1985 | Kukes et al. |
| 4,557,824 | A | 12/1985 | Kukes et al. |
| 4,561,964 | A | 12/1985 | Singhal et al. |
| 4,564,441 | A | 1/1986 | Kukes et al. |
| 4,567,156 | A | 1/1986 | Bearden, Jr. et al. |
| 4,568,657 | A | 2/1986 | Sepulveda et al. |
| 4,578,181 | A | 3/1986 | Derouane et al. |
| 4,579,646 | A | 4/1986 | Grosboll et al. |
| 4,581,344 | A | 4/1986 | Ledoux et al. |
| 4,582,432 | A | 4/1986 | Mehta |
| 4,585,545 | A | 4/1986 | Yancey, Jr. et al. |
| 4,590,172 | A | 5/1986 | Isaacs |
| 4,592,827 | A | 6/1986 | Galiasso et al. |
| 4,592,830 | A | 6/1986 | Howell et al. |
| 4,606,809 | A | 8/1986 | Garg |
| 4,608,152 | A | 8/1986 | Howell et al. |
| 4,613,427 | A | 9/1986 | Sepulveda et al. |
| 4,626,340 | A | 12/1986 | Galiasso et al. |
| 4,633,001 | A | 12/1986 | Cells |
| 4,652,311 | A | 3/1987 | Gulla et al. |
| 4,652,647 | A | 3/1987 | Schlosberg et al. |
| 4,674,885 | A | 6/1987 | Erwin et al. |
| 4,676,886 | A | 6/1987 | Rahbe et al. |
| 4,678,557 | A | 7/1987 | Rodriguez et al. |
| 4,693,991 | A | 9/1987 | Bjornson et al. |
| 4,695,369 | A | 9/1987 | Garg et al. |
| 4,701,435 | A | 10/1987 | Garcia et al. |
| 4,707,245 | A | 11/1987 | Baldasarri et al. |
| 4,707,246 | A | 11/1987 | Gardner et al. |
| 4,710,486 | A | 12/1987 | Lopez et al. |
| 4,713,167 | A | 12/1987 | Reno et al. |
| 4,716,142 | A | 12/1987 | Laine et al. |
| 4,724,069 | A | 2/1988 | Aldag et al. |

(56) References Cited

U.S. PATENT DOCUMENTS

| | | |
|---|---|---|
| 4,734,186 A | 3/1988 | Parrott et al. |
| 4,740,295 A | 4/1988 | Bearden, Jr. et al. |
| 4,746,419 A | 5/1988 | Peck et al. |
| 4,762,607 A | 8/1988 | Aldridge et al. |
| 4,762,812 A | 8/1988 | Lopez et al. |
| 4,762,814 A | 8/1988 | Parrott et al. |
| 4,764,266 A | 8/1988 | Chen et al. |
| 4,765,882 A | 8/1988 | Aldridge et al. |
| 4,770,764 A | 9/1988 | Ohtake et al. |
| 4,772,387 A | 9/1988 | Miyauchi et al. |
| 4,802,972 A | 2/1989 | Kukes et al. |
| 4,808,007 A | 2/1989 | King |
| 4,812,228 A | 3/1989 | Angevine et al. |
| 4,824,611 A | 4/1989 | Cells |
| 4,824,821 A | 4/1989 | Lopez et al. |
| 4,834,865 A | 5/1989 | Kukes et al. |
| 4,837,193 A | 6/1989 | Akizuki et al. |
| 4,851,107 A | 7/1989 | Kretschmar et al. |
| 4,851,109 A | 7/1989 | Chen et al. |
| 4,857,496 A | 8/1989 | Lopez et al. |
| 4,863,887 A | 9/1989 | Ohtake et al. |
| 4,959,140 A | 9/1990 | Kukes et al. |
| 4,963,247 A | 10/1990 | Belinko et al. |
| 4,970,190 A | 11/1990 | Lopez et al. |
| 4,983,273 A | 1/1991 | Kennedy et al. |
| 4,983,558 A | 1/1991 | Born et al. |
| 5,013,427 A | 5/1991 | Mosby et al. |
| 5,017,535 A | 5/1991 | Schoonhoven et al. |
| 5,017,712 A | 5/1991 | Usui et al. |
| 5,038,392 A | 8/1991 | Morris et al. |
| 5,055,174 A | 10/1991 | Howell et al. |
| 5,094,991 A | 3/1992 | Lopez et al. |
| 5,108,581 A | 4/1992 | Aldridge et al. |
| 5,114,900 A | 5/1992 | King |
| 5,134,108 A | 7/1992 | Thakur et al. |
| 5,154,818 A | 10/1992 | Harandi et al. |
| 5,162,282 A | 11/1992 | Lopez et al. |
| 5,164,075 A | 11/1992 | Lopez |
| 5,166,118 A | 11/1992 | Kretschmar et al. |
| 5,171,916 A | 12/1992 | Le et al. |
| 5,178,749 A | 1/1993 | Lopez et al. |
| 5,191,131 A | 3/1993 | Takahata et al. |
| 5,254,240 A | 10/1993 | Jacquin et al. |
| 5,281,328 A | 1/1994 | Degnan, Jr. et al. |
| 5,320,500 A | 6/1994 | Cholet |
| 5,332,709 A | 7/1994 | Nappier et al. |
| 5,358,634 A | 10/1994 | Rankel |
| 5,364,524 A | 11/1994 | Partridge et al. |
| 5,372,705 A | 12/1994 | Bhattacharya et al. |
| 5,374,348 A | 12/1994 | Sears et al. |
| 5,409,595 A | 4/1995 | Harandi et al. |
| 5,435,908 A | 7/1995 | Nelson et al. |
| 5,452,954 A | 9/1995 | Handke et al. |
| 5,460,714 A | 10/1995 | Fixari et al. |
| 5,474,977 A | 12/1995 | Gatsis |
| 5,578,197 A | 11/1996 | Cyr et al. |
| 5,597,236 A | 1/1997 | Fasano |
| 5,622,616 A | 4/1997 | Porter et al. |
| 5,865,537 A | 2/1999 | Streiff et al. |
| 5,866,501 A | 2/1999 | Pradhan et al. |
| 5,868,923 A | 2/1999 | Porter et al. |
| 5,871,638 A | 2/1999 | Pradhan et al. |
| 5,913,324 A | 6/1999 | Signer |
| 5,916,432 A | 6/1999 | McFarlane et al. |
| 5,925,235 A | 7/1999 | Habib |
| 5,932,090 A | 8/1999 | Marchionna et al. |
| 5,935,419 A | 8/1999 | Khan et al. |
| 5,954,945 A | 9/1999 | Cayton et al. |
| 5,962,364 A | 10/1999 | Wilson, Jr. et al. |
| 5,972,202 A | 10/1999 | Benham et al. |
| 6,004,453 A | 12/1999 | Benham et al. |
| 6,059,957 A | 5/2000 | Khan et al. |
| 6,068,758 A | 5/2000 | Strausz |
| 6,086,749 A | 7/2000 | Kramer et al. |
| 6,090,858 A | 7/2000 | El-Sayed |
| 6,093,824 A | 7/2000 | Reichle et al. |
| 6,136,179 A | 10/2000 | Sherwood, Jr. et al. |
| 6,139,723 A | 10/2000 | Pelrine et al. |
| 6,190,542 B1 | 2/2001 | Comolliea et al. |
| 6,214,195 B1 | 4/2001 | Yadav et al. |
| 6,217,746 B1 | 4/2001 | Thakkar et al. |
| 6,239,054 B1 | 5/2001 | Shukis et al. |
| 6,270,654 B1 | 8/2001 | Colyar et al. |
| 6,274,530 B1 | 8/2001 | Cayton et al. |
| 6,277,270 B1 | 8/2001 | Morel et al. |
| 6,342,224 B1 | 1/2002 | Bruck et al. |
| 6,379,532 B1 | 4/2002 | Hoehn et al. |
| 6,454,932 B1 | 9/2002 | Baldassari et al. |
| 6,455,594 B1 | 9/2002 | Tsuji |
| 6,462,095 B1 | 10/2002 | Bonsel et al. |
| 6,550,960 B2 | 4/2003 | Catalfamo et al. |
| 6,596,155 B1 | 7/2003 | Gates et al. |
| 6,660,157 B2 | 12/2003 | Que et al. |
| 6,686,308 B2 | 2/2004 | Mao et al. |
| 6,698,197 B1 | 3/2004 | Etchells, III et al. |
| 6,712,955 B1 | 3/2004 | Hou et al. |
| 6,783,661 B1 | 8/2004 | Briot et al. |
| 6,797,153 B1 | 9/2004 | Fukuyama et al. |
| 6,884,340 B1 | 4/2005 | Bogdan |
| 6,916,762 B2 | 7/2005 | Shibuya et al. |
| 7,011,807 B2 | 3/2006 | Zhou et al. |
| 7,090,767 B2 | 8/2006 | Kaminsky et al. |
| 7,285,698 B2 | 10/2007 | Liu et al. |
| 7,449,103 B2 | 11/2008 | Lott et al. |
| 7,517,446 B2 | 4/2009 | Lott et al. |
| 7,578,928 B2 | 8/2009 | Lott et al. |
| 7,815,870 B2 | 10/2010 | Lott et al. |
| 8,034,232 B2 | 10/2011 | Lott et al. |
| 8,142,645 B2 | 3/2012 | Zhou et al. |
| 8,303,082 B2 | 11/2012 | Lott et al. |
| 8,309,041 B2 | 11/2012 | Lott et al. |
| 8,557,105 B2 | 3/2013 | Lott et al. |
| 8,431,016 B2 | 4/2013 | Lott et al. |
| 8,440,071 B2 | 5/2013 | Lott et al. |
| 8,673,130 B2 | 3/2014 | Lott et al. |
| 2002/0179493 A1 | 12/2002 | Etter |
| 2003/0094400 A1 | 5/2003 | Levy et al. |
| 2003/0171207 A1 | 9/2003 | Shih et al. |
| 2004/0013601 A1 | 1/2004 | Butz et al. |
| 2004/0147618 A1 | 7/2004 | Lee et al. |
| 2005/0109674 A1 | 5/2005 | Klein |
| 2005/0241991 A1 | 11/2005 | Lott et al. |
| 2005/0241992 A1 | 11/2005 | Lott et al. |
| 2005/0241993 A1 | 11/2005 | Lott et al. |
| 2005/0258073 A1 | 11/2005 | Oballa et al. |
| 2005/0279670 A1 | 12/2005 | Long et al. |
| 2006/0060501 A1 | 3/2006 | Gauthier |
| 2006/0079396 A1 | 4/2006 | Saito |
| 2006/0175229 A1 | 8/2006 | Montanari et al. |
| 2006/0201854 A1 | 9/2006 | Lott et al. |
| 2006/0224000 A1 | 10/2006 | Papp et al. |
| 2006/0254956 A1 | 11/2006 | Khan |
| 2006/0289340 A1 | 12/2006 | Brownscombe et al. |
| 2007/0012595 A1 | 1/2007 | Brownscombe et al. |
| 2007/0029228 A1 | 2/2007 | Aoki et al. |
| 2007/0108100 A1 | 5/2007 | Satchell, Jr. |
| 2007/0131587 A1 | 6/2007 | Fukuyama et al. |
| 2007/0138059 A1 | 6/2007 | Farshid et al. |
| 2007/0158236 A1 | 7/2007 | Zhou et al. |
| 2007/0158238 A1 | 7/2007 | Wu et al. |
| 2007/0158239 A1 | 7/2007 | Satchell |
| 2007/0163921 A1 | 7/2007 | Keusenkothen et al. |
| 2007/0175797 A1 | 8/2007 | Iki et al. |
| 2007/0209965 A1 | 9/2007 | Duddy et al. |
| 2009/0159505 A1 | 6/2009 | Da Costa et al. |
| 2009/0310435 A1 | 12/2009 | Lott et al. |
| 2010/0065472 A1 | 3/2010 | Chabot |
| 2010/0122931 A1 | 5/2010 | Zimmerman et al. |
| 2011/0017637 A1 | 1/2011 | Reynolds et al. |
| 2011/0017641 A1 | 1/2011 | Gupta et al. |
| 2013/0075304 A1 | 3/2013 | Chang |
| 2013/0233765 A1 | 9/2013 | Lott et al. |
| 2014/0027344 A1 | 1/2014 | Harris et al. |
| 2014/0093433 A1 | 4/2014 | Lott et al. |

(56) References Cited

U.S. PATENT DOCUMENTS

FOREIGN PATENT DOCUMENTS

| | | |
|---|---|---|
| CA | 2579528 | 9/2007 |
| CN | 1295112 | 5/2001 |
| CN | 1966618 | 5/2007 |
| DE | 2324441 | 12/1973 |
| DE | 2315114 | 10/1974 |
| DE | 2421934 | 11/1974 |
| EP | 0199399 | 10/1986 |
| EP | 0546686 | 6/1993 |
| EP | 0559399 | 9/1993 |
| EP | 1043069 | 10/2000 |
| EP | 1753846 | 2/2007 |
| GB | 1047698 | 8/1963 |
| JP | Sho47-014205 | 10/1972 |
| JP | Sho 59-108091 | 6/1984 |
| JP | Sho 59-50276 | 12/1984 |
| JP | Hei 60-044587 | 3/1985 |
| JP | Sho 62-39634 | 8/1987 |
| JP | Sho 63-27596 | 2/1988 |
| JP | 2001-165692 | 6/1989 |
| JP | 2863858 | 2/1990 |
| JP | Hei 5-501829 | 4/1993 |
| JP | Hei 06-009966 | 1/1994 |
| JP | Hei 06-287574 | 10/1994 |
| JP | Hei 06-346064 | 12/1994 |
| JP | Hei 07-062355 | 3/1995 |
| JP | Hei 7-90282 | 4/1995 |
| JP | Hei 08-325580 | 12/1996 |
| JP | 2003-193074 | 7/2003 |
| WO | 1997/23582 | 12/1996 |
| WO | 1997/34967 | 3/1997 |
| WO | 2000/75336 | 12/2000 |
| WO | 2001/01408 | 1/2001 |
| WO | 2001/41799 | 6/2001 |
| WO | 2005/104749 | 11/2005 |
| WO | 2006/116913 | 11/2006 |
| WO | 2007/078622 | 7/2007 |
| WO | 2007/106783 | 9/2007 |
| WO | 2009-058785 | 5/2009 |

OTHER PUBLICATIONS

U.S. Appl. No. 15/258,653, filed Sep. 7, 2016, Mountainland et al.
U.S. Appl. No. 15/258,706, filed Sep. 7, 2016, Mountainland et al.
Aspen Hydrocracker™: A simulation system for monitoring, planning and optimizing hydrocracking and hydrotreating units, www.aspentec.com/brochures/hydrocracker.pdf (2001).
Criterion: Hydrocracking Process Description and Criterion/Zeolyst Hydrocracking Catalyst Applications, www.criterioncatalysts.com (2001).
Database CA [online] Chemical Abstracts Service retrieved from STN Database accession No. 1991:42412.
Alberto Del Bianco et al. "Upgrading Heavy Oil Using Slurry Processes" Chemtech, Nov. 30, 1995 (Nov. 30, 1995), pp. 35-43.
Lewis, Richard J., Hawley's Condensed Chemical Dictionary, 15 Edition, 2007, p. 321.
"HYVAHL, Significantly Improved RFCC Performance or Low Sulfur Fuel Oils Via Residue Hydrotreatment", Axens IPF Group Technologies, pp. 1,2 (Jan. 2003).
Roger K. Lott et al.: "(HC)3 Process—A Slurry Hydrocracking Technology Designed to Convert Bottoms of Heavy Oils" 7th UNITAR International Conference of Heavy Crude and Tar Sands, Beijing, Oct. 27, 1998 (Oct. 27, 1998) pp. 1-8.
Molecular Profile Report, Cobalt Benzoate, http://chemfinder.cambridgesoft.com/chembiofinder/forms/search/contentarea/chembiovizsearch.aspx?formgroupid=8&appname=chembiofinder&allowfullsearch=true&keeprecordcountsynchronized-flase&searchcriteraid=47searchcriteravalue=932-69-4&currentindex=0.
"OCR Moving Bed Technology for the future", pp. 1-2 (at least as early as 2004).

N. Panariti et al.: "petroleum Residue Upgrading with Dispered Catalysts Part 1. Catalysts Activity and Selctivity" Applied Catalysts A: General, vol. 204, Mar. 31, 2000 (Mar. 1, 2000) pp. 203-213.
"Petroleum Residue Upgrading with Dispersed Catalysts Part 2. Effect of Operating Conditions" Applied Catalysts A: General, vol. 204, Mar. 31, 2000 (Mar. 1, 2000) pp. 215-222.
Papaioannou et al., "Alkali-Metal- and Alkaline-Earth-Promoted Catalysts for Coal Liquefaction Applications", Energy & Fuels, vol. 4, No. 1, pp. 38-42 (1990).
Seader et al., "Perry's Chemical Engineers' Handbook", 7th Edition, Section 13—Distillation, 1997, 13-25.
Plain et al., "Options for Resid Conversion", Axens IFP Group Technologies, pp. 1-10 (at least as early as 2004).
Santori, R., et al., "Eni Slurry Technology: A Technology to Convert the Bottom of the Barrel to Transportation Fuels", 3rd Bottom of the Barrell Technology Conference & Exhibition (Oct. 2004).
Hydrocracking of Liaohe Vacuum Residue With Bimeta:, Shen et al., Preprints of Symposia—American Chemical society, Division of Fuel Chemistry (1998), 43(3), 481-485, OCDEN: Psadfz, 1998, XP009117504.
U.S. Appl. No. 13/866,220, Nov. 13, 2006, Notice of Allowance.
U.S. Appl. No. 11/117,262, Feb. 4, 2008, Office Action.
U.S. Appl. No. 11/117,202, Apr. 29, 2008, Office Action.
U.S. Appl. No. 11/117,203, Jul. 10, 2008, Office Action.
U.S. Appl. No. 11/117,262, Jul. 17, 2008, Office Action.
U.S. Appl. No. 11/117,202, Aug. 18, 2008, Notice of Allowance.
U.S. Appl. No. 11/117,262, Dec. 5, 2008, Office Action.
U.S. Appl. No. 11/117,203, Dec. 10, 2008, Notice of Allowance.
U.S. Appl. No. 11/117,262, Apr. 30, 2009, Notice of Allowance.
U.S. Appl. No. 11/374,369, May 28, 2009, Office Action.
U.S. Appl. No. 11/117,262, Jun. 26, 2009, Notice of Allowance.
U.S. Appl. No. 11/932,201, Nov. 23, 2009, Office Action.
U.S. Appl. No. 12/106,112, Jan. 26, 2010, Office Action.
U.S. Appl. No. 11/374,369, Mar. 18, 2010, Office Action.
U.S. Appl. No. 11/932,201, May 13, 2010, Office Action.
U.S. Appl. No. 12/106,112, Jun. 22, 2010, Notice of Allowance.
U.S. Appl. No. 11/968,934, Sep. 20, 2010, Office Action.
U.S. Appl. No. 12/838,761, Nov. 26, 2010, Office Action.
U.S. Appl. No. 11/968,934, Jan. 25, 2011, Office Action.
U.S. Appl. No. 11/932,201, Apr. 21, 2011, Notice of Allowance.
U.S. Appl. No. 12/838,761, May 18, 2011, Office Action.
U.S. Appl. No. 11/932,201, Jun. 8, 2011, Notice of Allowance.
U.S. Appl. No. 11/968,934, Jul. 12, 2011, Office Action.
U.S. Appl. No. 13/236,209, Sep. 19, 2011, Office Action.
U.S. Appl. No. 12/547,278, Dec. 29, 2011, Office Action.
U.S. Appl. No. 11/968,934, Jan. 6, 2012, Notice of Allowance.
U.S. Appl. No. 13/116,195, Jan. 12, 2012, Office Action.
U.S. Appl. No. 13/236,209, Jul. 11, 2012, Notice of Allowance.
U.S. Appl. No. 13/116,195, Jul. 11, 2012, Notice of Allowance.
U.S. Appl. No. 12/838,761, Jul. 20, 2012, Office Action.
U.S. Appl. No. 13/113,722, Aug. 8, 2012, Office Action.
U.S. Appl. No. 12/547,278, Sep. 7, 2012, Office Action.
U.S. Appl. No. 12/838,761, Jan. 10, 2013, Notice of Allowance.
U.S. Appl. No. 13/113,722, Jan. 22, 2013, Notice of Allowance.
U.S. Appl. No. 13/675,629, Feb. 7, 2013, Office Action.
U.S. Appl. No. 13/675,629, Jun. 14, 2013, Notice of Allowance.
U.S. Appl. No. 13/866,220, Jun. 28, 2013, Office Action.
U.S. Appl. No. 14/095,698, Dec. 3, 2013, Office Action.
U.S. Appl. No. 11/374,369, Mar. 12, 2014, Office Action.
U.S. Appl. No. 12/547,278, Apr. 22, 2014, Office Action.
U.S. Appl. No. 13/242,979, Aug. 21, 2014, Office Action.
U.S. Appl. No. 11/374,369, Aug. 28, 2014, Office Action.
U.S. Appl. No. 12/547,278, Nov. 24, 2014, Final Office Action.
U.S. Appl. No. 13/242,979, Mar. 12, 2015, Final Office Action.
U.S. Appl. No. 13/865,726, May 12, 2015, Office Action.
U.S. Appl. No. 13/561,479, Aug. 11, 2015, Office Action.
U.S. Appl. No. 13/561,479, Nov. 4, 2015, Final Office Action.
U.S. Appl. No. 13/865,726, Jan. 11, 2016, Final Office Action.
U.S. Appl. No. 13/561,479, Apr. 27, 2016, Office Action.
U.S. Appl. No. 11/374,369, May 18, 2016, Office Action.

(56) References Cited

OTHER PUBLICATIONS

McFarlane et al. "Dispersion and Activity of Inorganic Catalyst Precursor in Heavy Oil" Boston Congress ACS Energy and Fuel Diversification, p. 496, Aug. 31, 1998.
U.S. Appl. No. 12/547,278, Oct. 28, 2016, Office Action.
U.S. Appl. No. 11/374,369, Nov. 9, 2016, Final Office Action.

SYSTEMS AND METHODS FOR HYDROPROCESSING HEAVY OIL

CROSS REFERENCE TO RELATED APPLICATIONS

This application is a continuation of U.S. patent application Ser. No. 14/095,698, filed Dec. 3, 2013, which is a continuation of U.S. patent application Ser. No. 13/866,220, filed Apr. 19, 2013, which is a continuation of U.S. patent application Ser. No. 12/838,761, filed Jul. 19, 2010, now U.S. Pat. No. 8,431,016, which is a continuation of U.S. patent application Ser. No. 12/106,112, filed Apr. 18, 2008, now U.S. Pat. No. 7,815,870, which is a division of U.S. patent application Ser. No. 11/117,202, filed Apr. 28, 2005, now U.S. Pat. No. 7,449,103, which claims the benefit of U.S. Provisional Application No. 60/566,335, filed Apr. 28, 2004, and U.S. Provisional Application No. 60/566,268, filed Apr. 28, 2004. This Application is a continuation-in-part of U.S. patent application Ser. No. 11/374,369, filed Mar. 13, 2006, which is a continuation-in-part of U.S. patent application Ser. No. 11/117,262, filed Apr. 28, 2005, which claims the benefit of U.S. Provisional Application No. 60/566,345, filed Apr. 28, 2004. The disclosures of the foregoing are incorporated herein in their entirety.

BACKGROUND OF THE INVENTION

1. The Field of the Invention

The invention involves methods and systems for hydroprocessing heavy oil feedstocks that include a significant quantity of asphaltenes and fractions boiling above 524° C. (975° F.) to yield lower boiling, higher quality materials. The invention specifically relates to ebullated bed hydroprocessing methods and systems that employ a colloidal or molecular catalyst and a porous supported catalyst, and methods for upgrading an existing ebullated bed system, so as to be better suited for upgrading lower quality feedstocks by inhibiting the formation of coke precursors and sediment and/or extending the life of the supported catalyst.

2. The Relevant Technology

World demand for refined fossil fuels is ever-increasing and will inevitably outstrip the supply of high quality crude oil, whether as a result of actual shortages or due to the actions of oil cartels. In either case, as the price or shortage of crude oil increases there will be an every-increasing demand to find ways to better exploit lower quality feedstocks and extract fuel values therefrom. As more economical ways to process lower quality feedstocks become available, such feedstocks may possibly catch, or even surpass, higher quality crude oils, in the not-too-distant future, as the primary source of refined fossil fuels used to operate automobiles, trucks, farm equipment, aircraft, and other vehicles that rely on internal combustion.

Lower quality feedstocks are characterized as including relatively high quantities of hydrocarbons that have a boiling point of 524° C. (975° F.) or higher. They also contain relatively high concentrations of sulfur, nitrogen and metals. High boiling fractions typically have a high molecular weight and/or low hydrogen/carbon ratio, an example of which is a class of complex compounds collectively referred to as "asphaltenes". Asphaltenes are difficult to process and commonly cause fouling of conventional catalysts and hydroprocessing equipment.

Examples of lower quality feedstocks that contain relatively high concentrations of asphaltenes, sulfur, nitrogen and metals include heavy crude and oil sands bitumen, as well as bottom of the barrel and residuum left over from conventional refinery process (collectively "heavy oil"). The terms "bottom of the barrel" and "residuum" (or "resid") typically refer to atmospheric tower bottoms, which have a boiling point of at least 343° C. (650° F.), or vacuum tower bottoms, which have a boiling point of at least 524° C. (975° F.). The terms "resid pitch" and "vacuum residue" are commonly used to refer to fractions that have a boiling point of 524° C. (975° F.) or greater.

By way of comparison, Alberta light crude contains about 9% by volume vacuum residue, while Lloydminster heavy oil contains about 41% by volume vacuum residue, Cold Lake bitumen contains about 50% by volume vacuum residue, and Athabasca bitumen contains about 51% by volume vacuum residue. Resid contains even higher concentrations of fractions that boil at or above about 343° C. (650° F.), with vacuum tower bottoms almost exclusively comprising fractions that boil at or above about 524° C. (975° F.).

Converting heavy oil into useful end products requires extensive processing, including reducing the boiling point of the heavy oil, increasing the hydrogen-to-carbon ratio, and removing impurities such as metals, sulfur, nitrogen and high carbon forming compounds. Examples of catalytic hydrocracking processes using conventional supported catalysts to upgrade atmospheric tower bottoms include fixed-bed hydroprocessing, ebullated- or expanded-bed hydroprocessing, and moving-bed hydroprocessing. Noncatalytic processes used to upgrade vacuum tower bottoms include thermal cracking, such as delayed coking and Flexicoking, and solvent extraction. Solvent extraction is quite expensive and incapable of reducing the boiling point of the heavy oil. Existing commercial catalytic hydrocracking processes involve rapid catalyst deactivation and high catalyst cost, making them currently unsuitable for hydroprocessing vacuum tower bottoms unless substantially diluted with lower boiling fractions, such as atmospheric tower bottoms. Most existing ebullated bed processes operate at less than 65 wt % conversion, while most fixed bed processes have less than about 25 wt % conversion.

A major cause of catalyst and equipment fouling is the undesired formation of coke and sediment, which often results when asphaltenes are heated to the high temperatures required to effect catalytic and thermal cracking. Supported catalysts used in commercial hydrocracking processes such as fixed-bed and ebullated-bed processes utilize solid supported catalysts that include clusters of catalytic sites located within pores or channels in the support material. Most heavy oil feedstocks contain a significant portion of asphaltene molecules, which are either too large to enter the pores of the catalyst support or else become trapped within the pores. Asphaltene molecules that become trapped in the pores deactivate the catalyst sites in the blocked pores. In this way, smaller asphaltene molecules can progressively block all catalyst sites, entirely deactivating the catalyst.

Moreover, larger asphaltene molecules form free radicals, just like other hydrocarbon molecules in the feedstock, but, unlike smaller molecules in the feedstock, are too large to enter the catalyst pores. Because of this, they are generally unable to react with hydrogen radicals located at the catalyst sites. As a result, the larger asphaltene free radicals are free to react with asphaltene and other free radicals in the feedstock, thereby forming larger molecules which continue increasing in size that can foul both the catalyst and the hydroprocessing equipment through the formation of coke precursors and sediment. The tendency of asphaltenes to form coke and sediment increases as the conversion level of the residuum increases due to the more strenuous conditions required to increase conversion. The undesirable reactions and fouling involving asphaltene greatly increase the catalyst and maintenance costs of ebullated-bed and fixed-bed hydrocracking processes. They also render existing commercial processes unsuitable for hydroprocessing vacuum tower bottoms and other very low quality feedstocks rich in asphaltenes.

Even though ebullated bed hydroprocessing systems are able to operate at substantially higher conversion levels than fixed bed systems, ebullated bed systems likewise suffer from the inability to proportionally convert the asphaltene fraction at the same conversion level as the heavy oil as a whole. The result of disproportional conversion is a progressive buildup of asphaltenes in the processed feedstock, with an attendant increase in the likelihood that coke and sediment will form in the reactor and other processing equipment.

Another problem, particularly acute in the case of ebullated-bed processes, involves continued free radical reaction in the catalyst free zones located (i) between the liquid recycle cup and the upper end of the expanded catalyst bed, (ii) between the plenum and distributor grid plate at the bottom of the catalyst bed, (iii) outside the pores of the porous supported catalyst within the expanded catalyst bed, and (iv) within the hot separator. The hydrocarbon free radicals generated at elevated temperatures within the ebullated bed are generally able to undergo hydrogenation reactions in the expanded catalyst zone as intended (except for larger asphaltene molecules, as discussed above). However, it is difficult for catalyzed hydrogenation reactions to occur within the catalyst free zones. Moreover, as product is withdrawn and sent to the hot separator, hydrocarbon free radicals continue to persist and may be further generated at high feedstock temperatures within the hot separator, which may only be about 2-4° C. (3.6-7.2° F.) less than the temperature of the feedstock in the ebullated bed. Because the hot separator includes no catalyst, free radicals tend to polymerize with each other rather than being capped by hydrogen through catalytic hydrogenation, thereby resulting in the formation of coke precursors and sediment with a high tendency for fouling of the hot separator, downstream heat exchangers, and even the vacuum distillation tower. The formation of coke precursors and sediment in the hot separator is exacerbated in the case where the feedstock includes a significant concentration of asphaltenes. Aside from equipment fouling, sediments often lead to instability of residual resid when it is used as a fuel oil.

To prevent fouling of the hot separator, the LC-Fining ebullated-bed hydrocracking reactor at Syncrude Canada in the Province of Alberta, Canada has been modified to reduce the temperature of the partially upgraded feedstock within the hot separator in order to reduce free radical formation and associated sediment formation and fouling that would otherwise occur in the absence of cooling. This is accomplished using an oil quench, in which cooler oil is pumped at elevated pressure to the entrance of the hot separator in order to reduce the temperature of the reactor product coming into the hot separator.

Another problem associated with conventional ebullated-bed hydrocracking processes is the need to carefully control the temperature and rapidly disperse the heat that accumulates within stagnant areas throughout the entire bed. Because many hydroconversion reactions are exothermic, and because heat can increase the rate of certain reactions, the formation of stagnant spots when the supported catalyst particles are not properly fluidized within the ebullated bed reactor can result in reactions that quickly get out of control. Stagnant spots of increased temperature can promote the formation of coke precursors and sediment, which can bind the catalyst particles together to form catalyst balls that are too heavy to be fluidized. Exothermic reactions tend to persist around the catalyst balls and stagnant zones. One ebullated-bed reactor actually blew up due to uncontrolled run-away reactions accelerated by stagnant zones caused by poor distribution of hydrogen, reportedly killing several workers in the vicinity of the reactor. Thermocouples are therefore typically placed throughout the ebullated bed in order to monitor and maintain an evenly controlled temperature throughout the reactor.

In view of the foregoing, there is an ongoing need to provide improved ebullated bed hydroprocessing systems and/or improve (i.e., modify) existing ebullated bed systems to overcome one or more of the foregoing deficiencies.

SUMMARY OF THE INVENTION

The present invention relates to ebullated bed hydroprocessing methods and system for improving the quality of a heavy oil feedstock that employ both a porous supported catalyst and a colloidal or molecular catalyst. The invention also includes methods for upgrading an existing ebullated bed hydroprocessing system by augmenting or replacing at least a portion of the porous supported catalyst with a colloidal or molecular catalyst. The colloidal or molecular catalyst overcomes at least some of the problems associated with the use of porous supported catalysts in upgrading heavy oil feedstocks. These include more effective processing of asphaltene molecules, a reduction in the formation of coke precursors and sediment, reduced equipment fouling, increased conversion level, enabling the reactor to process a wider range of lower quality feedstocks, elimination of catalyst-free zones in the ebullated bed reactor and downstream processing equipment, longer operation in between maintenance shut downs, and more efficient use of the supported catalyst if used in combination with the colloidal or molecular catalyst. Reducing the frequency of shutdown and startup of process vessels means less pressure and temperature cycling of process equipment, and it significantly increases the process safety and extends the useful life of expensive equipment.

Conventional ebullated bed hydroprocessing systems typically include one or more ebullated bed reactors that comprise a reaction chamber, a port at the bottom of the reaction chamber through which a heavy oil feedstock and pressurized hydrogen gas are introduced, a port at the top of the reaction chamber through which fresh catalyst is introduced, a recycle cup and conduit in the center of the reaction chamber, an expanded catalyst zone, an ebullating pump that circulates the reactor liquid down through the recycle cup and conduit and up through the expanded catalyst zone, a first catalyst free zone at the reactor bottom (or plenum), a second catalyst free zone above the expanded catalyst zone, a port at the top of the reaction chamber through which an upgraded feedstock is withdrawn from the second catalyst free zone, and a port at the bottom of the reaction chamber through which spent catalyst is withdrawn. Circulation of the heavy oil feedstock upwards through the expanded catalyst zone maintains the solid supported catalyst in an expanded, or fluidized state. It also helps equalize the temperature of the feedstock throughout the reaction chamber.

All or substantially all of the beneficial upgrading reactions occur within the expanded catalyst zone since that is the only place within the ebullated bed reactor where the heavy oil feedstock, hydrogen and porous supported catalyst exist together. The heavy oil molecules within the feedstock undergo thermal cracking within the ebullated bed reactor to form free radicals of reduced chain length. The free radicals diffuse into the pores of the porous supported catalyst where the free radical ends are catalytically reacted with hydrogen, thereby forming stable hydrocarbons of reduced molecular weight and boiling point. Unfortunately, heavy oil molecules within the feedstock can continue undergoing thermal cracking reactions in the catalyst free zones so as to form free radicals that have the potential of reacting with other free radicals to produce coke precursors and sediment within the ebullated bed reactor and/or within downstream processing equipment. Likewise, larger molecules that are too large to diffuse into the pores of the ebullated bed catalyst.

Moreover, asphaltenes and/or other heavy oil molecules that are too large to enter the pores of the supported catalyst can form coke precursors and sediment even within the expanded catalyst zone, potentially fouling and/or prematurely deactivating the catalyst (e.g., by plugging the pores of the catalyst and/or agglomerating porous supported catalyst particles together to form catalyst balls). Asphaltene free radicals often also leave behind trace metals such as vanadium and nickel in the catalyst pores, gradually reducing the pore diameter and preventing further access by other hydrocarbon molecules or radicals. For the foregoing reasons, it is very difficult to upgrade heavy oil feedstocks rich in asphaltenes (e.g., vacuum tower bottoms) using conventional ebullated bed hydroprocessing systems because they tend to quickly foul and/or deactivate such systems.

The present invention provides improved ebullated bed hydroprocessing methods and systems that more effectively process lower quality heavy oil feedstocks. The ebullated bed hydroprocessing methods and systems of the invention employ a dual hydroprocessing catalyst system comprising a colloidal or molecular catalyst and a porous supported catalyst. The colloidal or molecular catalyst and porous supported catalyst may be used together within one or more ebullated bed reactors. Alternatively, the colloidal or molecular catalyst may be used separately within one or more slurry phase reactors and then together with the porous supported catalyst within one or more ebullated bed reactors. One or more hot separators may be positioned at various points within the system in order to remove gases and volatile liquids from the non-volatile liquid fraction, which is then processed in one or more downstream hydroprocessing reactors. A guard bed may be used to remove metals and other impurities and/or the colloidal or molecular catalyst prior to further processing of the feedstock into final usable products. Where it is desired to recycle a heavy resid fraction back through the hydroprocessing system it may be advantageous to leave the colloidal or molecular catalyst within the resid fraction. The colloidal or molecular catalyst generally does not become deactivated and can be used to catalyze beneficial upgrading reactions within the recycled resid fraction without having to add new catalyst.

According to one embodiment, a colloidal or molecular catalyst is formed and/or a well-dispersed catalyst precursor composition is incorporated within a heavy oil feedstock prior to introducing the feedstock into at least one of an ebullated bed or slurry phase reactor. The well-dispersed catalyst precursor composition is able to form the colloidal or molecular catalyst in situ in the feed heaters and/or within the ebullated bed or slurry phase reactor. One benefit of the colloidal or molecular catalyst is that it provides catalytic activity in addition to the porous supported catalyst.

In the case of heavy oil feedstocks that include asphaltenes, a significant portion of the colloidal-sized particles or molecules of the polar hydroprocessing catalyst become associated with the more hydrophilic asphaltene molecules. As the asphaltene molecules form free radicals during thermal cracking, the closely associated colloidal catalyst particles or molecules catalyze a reaction between the asphaltene radicals and hydrogen, thereby preferentially promoting beneficial upgrading reactions to form smaller hydrocarbon molecules that contain less sulfur instead of forming coke precursors and sediment. As a result, the asphaltene fraction found in heavy oil feedstocks can be upgraded into more usable materials along with other hydrocarbons in the feedstock rather than simply being a coke and sediment precursor that is, at best, a waste product that must be disposed of and, at worst, a nemesis that can quickly deactivate the porous supported catalyst and/or foul the ebullated bed hydroprocessing system, requiring substantially greater quantities of catalyst and/or costly shut downs and clean-up operations. Repeatedly shutting down pressurized vessels involving high temperature and high pressure cyclings can greatly increase the risk of damaging the mechanical integrity of the equipment and reduce their operating life.

When used in combination with a porous supported catalyst in an ebullated bed reactor, the colloidal or molecular catalyst promotes catalytic upgrading reactions rather than detrimental reactions between hydrocarbon free radicals within what would otherwise constitute the catalyst free zones of the ebullated bed reactor and downstream processing equipment. The colloidal or molecular catalyst also promotes beneficial upgrading reactions involving asphaltenes or other hydrocarbon molecules that are too large to diffuse into the pores of the porous supported catalyst. This reduces or eliminates the incidence of catalyst fouling, such as plugging the catalyst pores and/or catalyst balling, and/or formation of coke precursors and sediment that might otherwise foul the ebullated bed reactor and downstream equipment.

When the colloidal or molecular catalyst is used in a slurry phase reactor upstream from an ebullated bed reactor, upgrading reactions within the slurry phase reactor reduce the quantity of asphaltenes or other larger hydrocarbon molecules that otherwise could not enter the pores of the supported catalyst within the ebullated bed reactor. In this way, the colloidal or molecular catalyst can be employed to preliminarily upgrade a lower quality heavy oil feedstock into a higher quality feedstock comprising smaller hydrocarbon molecules of lower molecular weight that can be more effectively hydroprocessed by the porous supported catalyst of the ebullated bed reactor. This reduces fouling of the ebullated bed reactor and downstream equipment and increases the lifespan of the porous supported catalyst.

The methods and systems according to the invention may employ other processing equipment as desired upstream and/or downstream from one or more ebullated bed reactors. Examples of other processing equipment that may be incorporated within the ebullated bed hydroprocessing systems of the invention include one or more of a preheating chamber, such as for causing the well dispersed catalyst precursor composition to decompose and/or for causing the heavy oil feedstock to liberate sulfur that can combine with the metal liberated from the catalyst precursor composition, a slurry phase reactor, a fixed bed reactor, an atmospheric distillation tower, a vacuum distillation tower, a scrubber, an aqueous washing system, and conduits and channels for transporting the feedstock from one location in the system to another.

The colloidal or molecular catalyst within the heavy oil feedstock is typically formed in situ within the heavy oil feedstock prior to, or upon introducing the feedstock into an ebullated bed and/or slurry phase reactor. According to one embodiment, an oil soluble catalyst precursor composition comprising an organo-metallic compound or complex is blended with the heavy oil feedstock containing sulfur bearing molecules and thoroughly mixed in order to achieve a very high dispersion of the precursor composition within the feedstock prior to formation of the catalyst. An exemplary catalyst precursor composition is a molybdenum 2-ethylhexanoate complex containing approximately 15% by weight molybdenum.

In order to ensure thorough mixing of the precursor composition within the feedstock, the catalyst precursor composition is preferably preblended with a hydrocarbon oil diluent (e.g., vacuum gas oil, decant oil, cycle oil, or light gas oil) to create a diluted precursor mixture, which is thereafter blended with the heavy oil feedstock. The decomposition temperature of the catalyst precursor composition is selected so as to be sufficiently high so that the catalyst precursor composition resists substantial premature decomposition before intimate mixing of the catalyst precursor composition within the feedstock has been achieved. Subsequent heating of the feedstock to a temperature sufficient to cause the release of hydrogen sulfide from sulfur-bearing hydrocarbon molecules, either before or upon commencing hydroprocessing, causes the catalyst precursor composition that has been intimately mixed with the feedstock to yield individual metal sulfide catalyst molecules and/or extremely small particles that are colloidal in size (i.e., less than 100 nm, preferably less than about 10 nm, more preferably less than about 5 nm, and most preferably less than about 1 nm).

Once formed, the metal sulfide catalyst compound, being dissociated from the oil soluble portion of the catalyst precursor, is highly polar. On the other hand, oil feedstocks are very hydrophobic, making it impossible to disperse larger hydrophilic metal sulfide catalyst particles into smaller-sized particles within the feedstock, let alone so as to yield a colloidal or molecular dispersion of catalyst. This is true whether the metal catalyst compound is added directly to the oil feedstock as a solid powder or as part of an aqueous solution instead of using an oil soluble catalyst precursor composition as in the present invention to form the catalyst compound in situ within the feedstock. It is for this reason that the oil soluble precursor composition is intimately mixed with the feedstock before decomposition of the catalyst precursor composition and formation of the catalyst compound.

If the oil soluble catalyst precursor composition is well mixed throughout the heavy oil feedstock before decomposition, the metal catalyst atoms and/or metal catalyst compounds will be physically separated from each other and surrounded by the heavy oil feedstock molecules, which is believed to prevent or inhibit substantial agglomeration. It has been found that preblending the catalyst precursor composition with a hydrocarbon diluent prior to blending the resulting diluted precursor mixture within the feedstock greatly aids in ensuring that thorough blending of the precursor composition within the feedstock occurs before decomposition of the precursor composition to yield the catalyst, particularly in the case of large-scale industrial applications. The result of thorough mixing is that all, or a substantial portion, of the catalyst precursor composition is converted into individual metal sulfide molecules, or particles colloidal in size, instead of larger metal sulfide particles comprising a large number of metal sulfide compounds joined together. On the other hand, failure to intimately blend the oil soluble precursor composition into the feedstock before decomposition of the precursor results in the formation of larger catalyst particles (i.e., micron-sized or greater) comprising a relatively large number of metal sulfide molecules joined together rather than a molecular or colloidal dispersion of the metal sulfide catalyst.

Notwithstanding the generally hydrophobic nature of heavy oil feedstocks, because asphaltene molecules generally have a large number of oxygen, sulfur and nitrogen functional groups, as well as associated metal constituents such as nickel and vanadium, the asphaltene fraction is significantly less hydrophobic and more hydrophilic than other hydrocarbons within the feedstock. Asphaltene molecules therefore generally have a greater affinity for the polar metal sulfide catalyst, particularly when in a colloidal or molecular state, compared to more hydrophobic hydrocarbons in a heavy oil feedstock. As a result, a significant portion of the polar metal sulfide molecules or colloidal particles tend to become associated with the more hydrophilic and less hydrophobic asphaltene molecules compared to the more hydrophobic hydrocarbons in the feedstock. The close proximity of the catalyst particles or molecules to the asphaltene molecules helps promote beneficial upgrading reactions involving free radicals formed through thermal cracking of the asphaltene fraction. This phenomenon is particularly beneficial in the case of heavy oils that have a relatively high asphaltene content, which are otherwise difficult, if not impossible, to upgrade using conventional hydroprocessing techniques due to the tendency of asphaltenes to deactivate porous supported catalysts and deposit coke and sediments on or within the processing equipment. In the case of conventional ebullated bed hydroprocessing systems, the asphaltene content may generally not exceed 10% by volume of the feedstock.

According to one embodiment, metal catalyst atoms liberated from the organo-metallic precursor compound or complex react with sulfur liberated from the heavy oil feedstock during heating to yield metal catalyst compounds that comprise one or more types of metal sulfides. A non-limiting example of a useful metal sulfide catalyst that may be employed in the methods and systems according to the invention is molybdenum disulfide. A non-limiting example of a catalyst precursor composition used to form molybdenum disulfide is molybdenum 2-ethyl hexanoate.

The molecular or colloidal catalyst generally never becomes deactivated because it is not contained within the pores of a support material. Moreover, because of intimate contact with the heavy oil molecules, the molecular or colloidal catalyst particles can rapidly catalyze a hydrogenation reaction between hydrogen atoms and free radicals formed from the heavy oil molecules. Although the molecular or colloidal catalyst leaves the reactor with the upgraded product, it is constantly being replaced with fresh catalyst contained in the incoming feedstock. As a result, process conditions, throughput and conversion levels remain significantly more constant over time compared to ebullated bed processes that utilize a porous supported catalyst as the sole hydroprocessing catalyst. Moreover, because the molecular or colloidal catalyst is more freely dispersed throughout the feedstock, including being intimately associated with asphaltenes, conversion levels and throughput are significantly or substantially increased compared to conventional ebullated bed hydroprocessing systems.

The more uniformly dispersed molecular or colloidal catalyst is also able to more evenly distribute the catalytic reaction sites throughout the reaction chamber and feedstock. This reduces the tendency for free radicals to react with one another to form coke precursor molecules and sediment compared to conventional ebullated bed reactors that only use a relatively large (e.g., ¼"×⅛" or ¼"×1/16") (6.35 mm×3.175 mm or 6.35 mm×1.5875 mm) supported catalyst, wherein the heavy oil molecules must diffuse into the pores of catalyst support to reach the active catalyst sites.

In another aspect of the invention, an existing ebullated bed hydroprocessing system can be upgraded by augmenting or at least partially replacing the supported catalyst with the molecular or colloidal catalyst described herein. Ebullated bed hydroprocessing systems typically cost millions of dollars to build. Rather than dismantling such systems, or building entirely new hydroprocessing systems at great cost to accommodate low quality heavy oil feedstocks that are rich in asphaltenes and/or high boiling fractions (e.g., above 975° F.), the present invention provides a method for modifying a pre-existing ebullated bed hydroprocessing system so that it can more effectively process lower quality heavy oil feedstocks.

The modifying or upgrading of a pre-existing ebullated bed system is accomplished by incorporating a colloidal or molecular catalyst and/or a well-dispersed catalyst precursor composition within the heavy oil feedstock prior to introducing the feedstock into the ebullated bed reactor. The well-dispersed catalyst precursor composition is able to form the colloidal or molecular catalyst in situ in the feed heaters and/or within the ebullated bed reactor. This provides catalytic activity within what previously constituted catalyst free zones within the ebullated bed reactor and downstream processing equipment prior to upgrading according to the invention. This promotes beneficial upgrading reactions within the former catalyst free zones rather than detrimental reactions between hydrocarbon free radicals.

According to one embodiment of the invention, a pre-existing ebullated bed hydroprocessing reactor system is upgraded by incorporating a colloidal or molecular catalyst within the heavy oil feedstock while maintaining the same quantity of porous supported catalyst employed previously. Incorporating the colloidal or molecular catalyst within the heavy oil feedstock would be expected to increase the life of the porous supported catalyst, thereby reducing the rate at which spent supported catalyst must be replaced. This has the beneficial effect of reducing the porous supported catalyst requirement. The more evenly distributed catalytic sites also increase the conversion level, while reducing or eliminating the tendency of free radicals to react together to form coke precursors and sediment.

According to another embodiment of the invention, a pre-existing ebullated bed hydroprocessing reactor system is upgraded by incorporating a colloidal or molecular catalyst within the heavy oil feedstock while reducing the quantity of the porous supported catalyst within the ebullated bed reactor. Because of the additive catalytic effect of the colloidal or molecular catalyst, less porous supported catalyst will generally be required to maintain a desired conversion level. The amount of porous supported catalyst may be reduced from an initial threshold quantity to a final reduced quantity, either abruptly or gradually over time. The quantity of porous supported catalyst may also be incrementally reduced to one or more intermediate plateaus that are maintained for a desired period of time before finally reaching the final reduced quantity.

Alternatively, the amount of porous supported catalyst and/or colloidal or molecular catalyst may be periodically reduced or increased in order to maintain an optimum ratio of the colloidal or molecular catalyst to the porous supported catalyst for a particular grade of heavy oil feedstock. This may be beneficial in the case where the quality of the heavy oil feedstock fluctuates from time to time. This allows the upgraded ebullated bed system to be altered or fine tuned depending on the chemical make-up of the feedstock that is to be processed at any given time.

In the case where a pre-existing hydroprocessing system includes more than one ebullated bed reactor in sequence, it is within the scope of the invention to upgrade each ebullated bed reactor in the same way (e.g., by maintaining a constant level of the porous supported catalyst in each reactor or by reducing the supported catalyst by the same amount in each ebullated bed reactor). It is also within the scope of the invention to utilize or maintain varying quantities of porous supported catalyst among the different ebullated bed reactors. It is also within the scope of the invention to remove at least a portion of the colloidal or molecular catalyst, other metals, and/or impurities from the upgraded feedstock before introducing it into a subsequent ebullated bed reactor downstream, e.g., by means of a "guard bed". Alternatively, supplemental colloidal or molecular catalyst can be added to the upgraded feedstock and/or the downstream reactor(s) to offset possible catalyst removal by the porous supported catalyst in the upstream reactor(s).

It is also within the scope of the invention to upgrade a pre-existing ebullated bed reactor by eliminating the porous supported catalyst entirely and replacing it with the colloidal or molecular catalyst. In this case, the "upgraded" ebullated bed reactor within the ebullated bed system may no longer technically be an "ebullated bed reactor" but a "slurry phase reactor". By way of example and not limitation, a first ebullated bed reactor within a hydroprocessing system that includes multiple ebullated bed reactors may be upgraded by eliminating the porous supported catalyst entirely, while one or more downstream ebullated bed reactors may still include at least a portion of the original quantity of porous supported catalyst employed initially. Alternatively, or in addition, one or more new slurry phase reactors comprising a heavy oil feedstock and a colloidal or molecular catalyst as liquid phase and hydrogen gas as gaseous phase may be constructed upstream relative to one or more ebullated bed reactors, including an ebullated bed reactor that has been converted into a slurry phase reactor.

An upgraded ebullated bed hydroprocessing system according to the invention may include processing and handling equipment upstream and downstream from the one or more ebullated bed reactors as needed to yield a desired hydroprocessing system. Such other processing and handling equipment may include, for example, one or more of a preheating chamber, such as for causing the well dispersed catalyst precursor composition to decompose and/or for causing the heavy oil feedstock to liberate sulfur that can combine with the metal liberated from the catalyst precursor composition, a hot separator, a slurry phase reactor, a fixed bed reactor, a guard bed, an atmospheric distillation tower, a vacuum distillation tower, a scrubber, an aqueous washing system, and conduits and channels for transporting the feedstock from one location in the system to another.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings, in which.

DETAILED DESCRIPTION OF THE PREFERRED EMBODIMENTS

I. Introduction and Definitions

Figure 1:
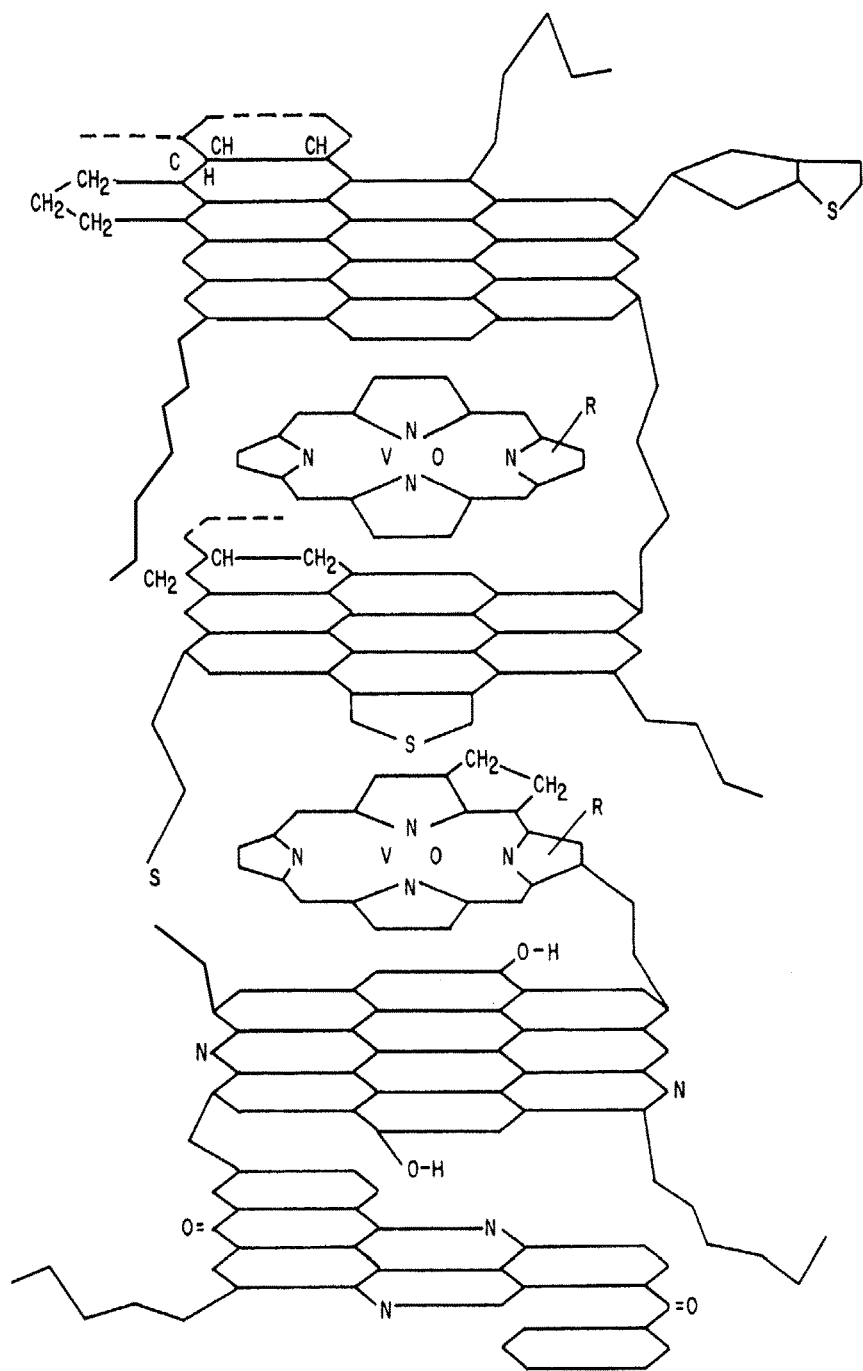
FIG. 1 depicts a hypothetical chemical structure for an asphaltene molecule.

The present invention relates to ebullated bed hydroprocessing methods and systems for improving the quality of a heavy oil feedstock. Such methods and systems employ a dual catalyst system that includes a molecularly- or colloidally-dispersed hydroprocessing catalyst and a porous supported catalyst. The ebullated bed hydroprocessing methods and systems of the invention more effectively process asphaltene molecules, reduce or eliminate the formation of coke precursors and sediment, reduce equipment fouling, increase conversion level, eliminate catalyst-free zones that would otherwise exist in conventional ebullated bed reactors and downstream processing equipment, and more efficiently use the porous supported catalyst.

The invention also relates to methods for upgrading a pre-existing ebullated bed hydroprocessing system. This involves augmenting or replacing at least a portion of the porous supported catalyst in the pre-existing ebullated bed system with a molecular or colloidal catalyst.

The terms "colloidal catalyst" and "colloidally-dispersed catalyst" shall refer to catalyst particles having a particle size that is colloidal in size, e.g., less than about 100 nm in diameter, preferably less than about 10 nm in diameter, more preferably less than about 5 nm in diameter, and most preferably less than about 1 nm in diameter. The term "colloidal catalyst" includes, but is not limited to, molecular or molecularly-dispersed catalyst compounds.

The terms "molecular catalyst" and "molecularly-dispersed catalyst" shall refer to catalyst compounds that are essential "dissolved" or completely dissociated from other catalyst compounds or molecules in a heavy oil hydrocarbon feedstock, non-volatile liquid fraction, bottoms fraction, resid, or other feedstock or product in which the catalyst may be found. It shall also refer to very small catalyst particles that only contain a few catalyst molecules joined together (e.g., 15 molecules or less).

The terms "residual catalyst", "residual molecular catalyst" and "residual colloidal catalyst" shall refer to catalyst molecules or colloidal particles that remain with an upgraded feedstock or material when transferred from one vessel to another (e.g., from a hydrocracking reactor to a hot separator, another hydroprocessing reactor, or distillation tower).

The term "conditioned feedstock" shall refer to a heavy oil feedstock into which an oil soluble catalyst precursor composition has been combined and mixed sufficiently so that, upon decomposition of the catalyst precursor and formation of the catalyst, the catalyst will comprise a colloidal or molecular catalyst dispersed within the feedstock.

The term "hydrocracking" shall refer to a process whose primary purpose is to reduce the boiling range of a heavy oil feedstock and in which a substantial portion of the feedstock is converted into products with boiling ranges lower than that of the original feedstock. Hydrocracking generally involves fragmentation of larger hydrocarbon molecules into smaller molecular fragments having a fewer number of carbon atoms and a higher hydrogen-to-carbon ratio. The mechanism by which hydrocracking occurs typically involves the formation of hydrocarbon free radicals during fragmentation followed by capping of the free radical ends or moieties with hydrogen. The hydrogen atoms or radicals that react with hydrocarbon free radicals during hydrocracking are generated at or by active catalyst sites.

The term "hydrotreating" shall refer to a more mild operation whose primary purpose is to remove impurities such as sulfur, nitrogen, oxygen, halides, and trace metals from the feedstock and saturate olefins and/or stabilize hydrocarbon free radicals by reacting them with hydrogen rather than allowing them to react with themselves. The primary purpose is not to change the boiling range of the feedstock. Hydrotreating is most often carried out using a fixed bed reactor, although other hydroprocessing reactors can also be used for hydrotreating, an example of which is an ebullated bed hydrotreater.

Of course, "hydrocracking" may also involve the removal of sulfur and nitrogen from a feedstock as well as olefin saturation and other reactions typically associated with "hydrotreating". The terms "hydroprocessing" and "hydroconversion" shall broadly refer to both "hydrocracking" and "hydrotreating" processes, which define opposite ends of a spectrum, and everything in between along the spectrum.

The terms "solid supported catalyst", "porous supported catalyst" and "supported catalyst" shall refer to catalysts that are typically used in conventional ebullated bed and fixed bed hydroprocessing systems, including catalysts designed primarily for hydrocracking or hydrodemetallization and catalysts designed primarily for hydrotreating. Such catalysts typically comprise (i) a catalyst support having a large surface area and numerous interconnected channels or pores of uneven diameter and (ii) fine particles of an active catalyst such as sulfides of cobalt, nickel, tungsten, and molybdenum dispersed within the pores. For example a heavy oil hydrocracking catalyst manufactured by Criterion Catalyst, Criterion 317 trilube catalyst, has a bi-modal pore size distribution, with 80% of the pores ranging between 30 to 300 Angstroms with a peak at 100 Angstroms and 20% of the pores ranging between 1000 to 7000 Angstroms with a peak at 4000 Angstroms. The pores for the solid catalyst support are of limited size due to the need for the supported catalyst to maintain mechanical integrity to prevent excessive breakdown and formation of excessive fines in the reactor. Supported catalysts are commonly produced as cylindrical pellets or spherical solids.

The term "heavy oil feedstock" shall refer to heavy crude, oils sands bitumen, bottom of the barrel and resid left over from refinery processes (e.g., visbreaker bottoms), and any other lower quality material that contains a substantial quantity of high boiling hydrocarbon fractions (e.g., that boil at or above 343° C. (650° F.), more particularly at or above about 524° C. (975° F.)), and/or that include a significant quantity of asphaltenes that can deactivate a solid supported catalyst and/or cause or result in the formation of coke precursors and sediment. Examples of heavy oil feedstocks include, but are not limited to, Lloydminster heavy oil, Cold Lake bitumen, Athabasca bitumen, atmospheric tower bottoms, vacuum tower bottoms, residuum (or "resid"), resid pitch, vacuum residue, and nonvolatile liquid fractions that remain after subjecting crude oil, bitumen from tar sands, liquefied coal, oil shale, or coal tar feedstocks to distillation, hot separation, and the like and that contain higher boiling fractions and/or asphaltenes.

The term "hydrocracking reactor" shall refer to any vessel in which hydrocracking (i.e., reducing the boiling range) of a feedstock in the presence of hydrogen and a hydrocracking catalyst is the primary purpose. Hydrocracking reactors are characterized as having an input port into which a heavy oil feedstock and hydrogen can be introduced, an output port from which an upgraded feedstock or material can be withdrawn, and sufficient thermal energy so as to form hydrocarbon free radicals in order to cause fragmentation of larger hydrocarbon molecules into smaller molecules. Examples of hydrocracking reactors include, but are not limited to, slurry phase reactors (i.e., a two phase, gas-liquid system), ebullated bed reactors (i.e., a three phase, gas-liquid-solid system), fixed bed reactors (i.e., a three-phase system that includes a liquid feed trickling downward over a fixed bed of solid supported catalyst with hydrogen typically flowing cocurrently, but possibly countercurrently in some cases).

The term "hydrocracking temperature" shall refer to a minimum temperature required to effect significant hydrocracking of a heavy oil feedstock. In general, hydrocracking temperatures will preferably fall within a range of about 410° C. (770° F.) to about 460° C. (860° F.), more preferably in a range of about 420° C. (788° F.) to about 450° C. (842° F.), and most preferably in a range of about 430° C. (806° F.) to about 445° C. (833° F.). It will be appreciated that the temperature required to effect hydrocracking may vary depending on the properties and chemical make up of the heavy oil feedstock. Severity of hydrocracking may also be imparted by varying the space velocity of the feedstock, i.e., the residence time of feedstock in the reactor, while maintaining the reactor at a fixed temperature. Milder reactor temperature and longer feedstock space velocity are typically required for heavy oil feedstock with high reactivity and/or high concentration of asphaltenes.

The term "gas-liquid slurry phase hydrocracking reactor" shall refer to a hydroprocessing reactor that includes a continuous liquid phase and a gaseous disperse phase which forms a "slurry" of gaseous bubbles within the liquid phase. The liquid phase typically comprises a hydrocarbon feedstock that may contain a low concentration of a colloidal catalyst or molecular-sized catalyst, and the gaseous phase typically comprises hydrogen gas, hydrogen sulfide, and vaporized low boiling point hydrocarbon products. The term "gas-liquid-solid, 3-phase slurry hydrocracking reactor" is used when a solid catalyst is employed along with liquid and gas. The gas may contain hydrogen, hydrogen sulfide and vaporized low boiling hydrocarbon products. The term "slurry phase reactor" shall broadly refer to both type of reactors (e.g., those with a colloidal or molecular catalyst, those with a micron-sized or larger particulate catalyst, and those that include both). In most cases, it shall refer to a reactor that at least includes a colloidal or molecular catalyst. An exemplary slurry phase reactor is disclosed in U.S. Pat. No. 6,960,325, entitled "APPARATUS FOR HYDROCRACKING AND/OR HYDROGENATING FOSSIL FUELS", the disclosure of which is incorporated herein by specific reference.

The term "asphaltene" shall refer to the fraction of a heavy oil feedstock that is typically insoluble in paraffinic solvents such as propane, butane, pentane, hexane, and heptane and that includes sheets of condensed ring compounds held together by hetero atoms such as sulfur, nitrogen, oxygen and metals. Asphaltenes broadly include a wide range of complex compounds having anywhere from 80 to 160,000 carbon atoms, with predominating molecular weights, as determined by solution techniques, in the 5000 to 10,000 range. About 80-90% of the metals in the crude oil are contained in the asphaltene fraction which, together with a higher concentration of non-metallic hetero atoms, renders the asphaltene molecules more hydrophilic and less hydrophobic than other hydrocarbons in crude. A hypothetical asphaltene molecule structure developed by A.G. Bridge and co-workers at Chevron is depicted in FIG. 1.

The terms "upgrade", "upgrading" and "upgraded", when used to describe a feedstock that is being or has been subjected to hydroprocessing, or a resulting material or product, shall refer to one or more of a reduction in the molecular weight of the feedstock, a reduction in the boiling point range of the feedstock, a reduction in the concentration of asphaltenes, a reduction in the concentration of hydrocarbon free radicals, and/or a reduction in the quantity of impurities, such as sulfur, nitrogen, oxygen, halides, and metals.

II. Ebullated Bed Hydroprocessing Methods and System

A. Exemplary Ebullated Bed Reactors and Systems

Figure 2A:
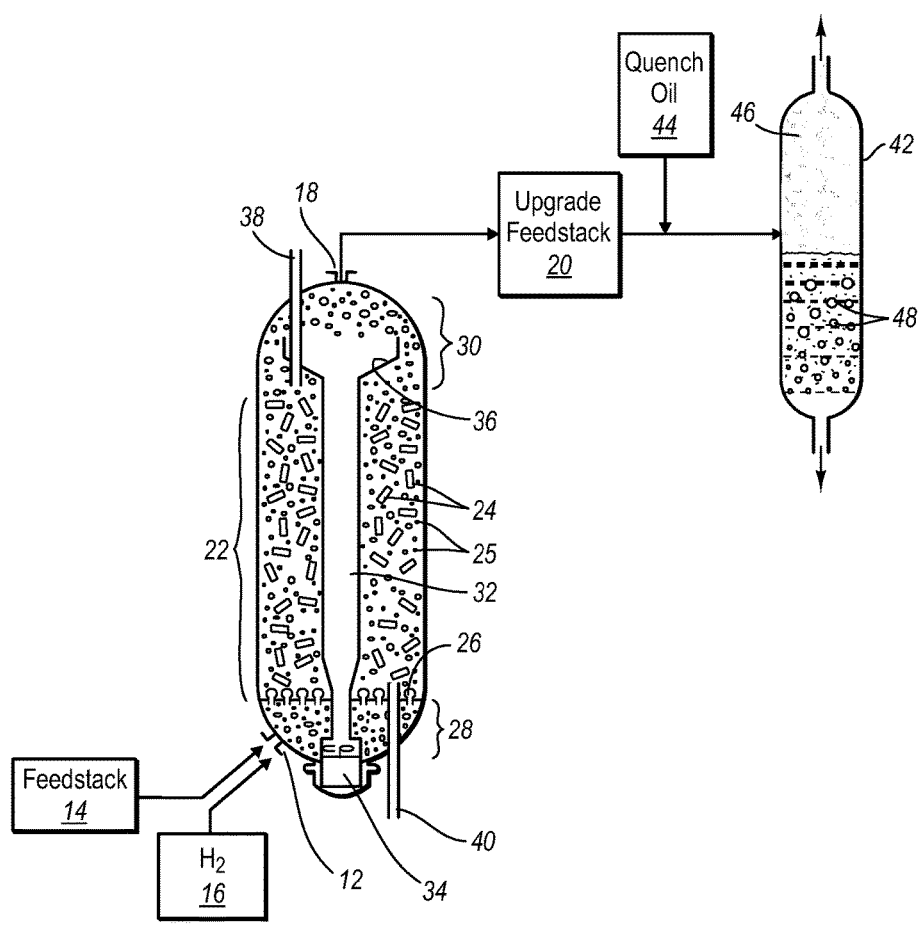
FIGS. 2A and 2B are schematic diagrams that illustrate exemplary ebullated bed reactors that may be incorporated into improved ebullated bed hydroprocessing systems according to the invention.
Figure 2B:
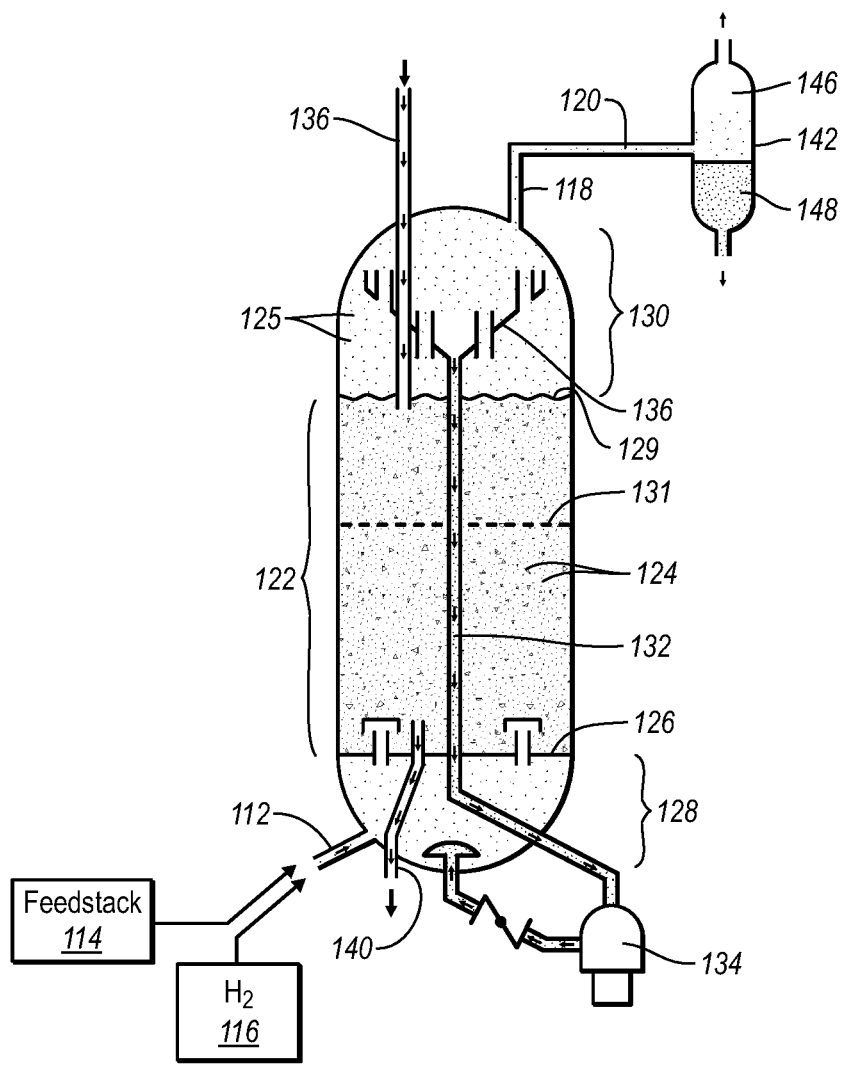

FIGS. 2A and 2B schematically depict conventional ebullated bed reactors that are used to process a hydrocarbon feedstock and that can be upgraded according to the invention. FIG. 2A schematically depicts an ebullated bed reactor 10 used in the LC-Fining hydrocracking system developed by C-E Lummus. Ebullated bed reactor 10 includes an input port 12 at the bottom through which a feedstock 14 and pressurized hydrogen gas 16 are introduced and an output port 18 at the top through which an upgraded feedstock 20 is withdrawn.

Ebullated bed reactor 10 further includes an expanded catalyst zone 22 comprising a porous supported catalyst 24 that is maintained in an expanded or fluidized state against the force of gravity by upward movement of feedstock and gas (schematically depicted as bubbles 25) through the ebullated bed reactor 10. The lower end of the expanded catalyst zone 22 is defined by a distributor grid plate 26, which separates the expanded catalyst zone 22 from a lower supported catalyst free zone 28 located between the bottom of the ebullated bed reactor 10 and the distributor grid plate 26. The distributor grid plate 26 distributes the hydrogen gas and feedstock even across the reactor and prevents the supported catalyst 24 from falling by the force of gravity into the lower supported catalyst free zone 28. The upper end of the expanded catalyst zone 22 is the height at which the downward force of gravity begins to equal or exceed the uplifting force of the upwardly moving feedstock and gas through the ebullated bed reactor 10 as the supported catalyst 24 reaches a given level of expansion or separation. Above the expanded catalyst zone 22 is an upper supported catalyst free zone 30.

Feedstock within the ebullated bed reactor 10 is continuously recirculated from the upper supported catalyst free zone 30 to the lower supported catalyst free zone 28 of the ebullated bed reactor 10 by means of a recycling channel 32 disposed in the center of the ebullated bed reactor 10 in communication with an ebullating pump 34 disposed at the bottom of the ebullated bed reactor 10. At the top of the recycling channel 32 is a funnel-shaped recycle cup 36 through which feedstock is drawn from the upper supported catalyst free zone 30. The feedstock drawn downward through the recycling channel 32 enters the lower catalyst free zone 28 and then passes up through the distributor grid plate 26 and into the expanded catalyst zone 22, where it is blended with the feedstock 14 and hydrogen gas 16 entering the ebullated bed reactor 130 through the input port 12. Continuously circulating blended feedstock upward through the ebullated bed reactor 10 advantageously maintains the supported catalyst 24 in an expanded or fluidized state within the expanded catalyst zone 22, minimizes channeling, controls reaction rates, and keeps heat released by the exothermic hydrogenation reactions to a safe level.

Fresh supported catalyst 24 is introduced into the ebullated bed reactor 10, more specifically the expanded catalyst zone 22, through a catalyst input tube 38 that passes through the top of the ebullated bed reactor 10 and directly into the expanded catalyst zone 22. Spent supported catalyst 24 is withdrawn from the expanded catalyst zone 22 through a catalyst withdrawal tube 40 that passes from a lower end of the expanded catalyst zone 22 through both the distributor grid plate 26 and the bottom of the ebullated bed reactor 10. It will be appreciated that the catalyst withdrawal tube 40 is unable to differentiate between fully spent catalyst, partially spent but active catalyst, and fresh catalyst such that a random distribution of supported catalyst 24 is withdrawn from the ebullated bed reactor 10 as "spent" catalyst. This has the effect of wasting a certain amount of the supported catalyst 24.

Finally, the upgraded feedstock 20 withdrawn from the ebullated bed reactor 10 is introduced into a hot separator 42. In the case where the feedstock 14 contains a significant quantity of asphaltenes (e.g., about 10% or more), the hot separator 42 may need to be operated at a substantially cooler temperature than the hydrocracking temperature within the ebullated bed reactor 10 in order to reduce the tendency of asphaltene free radicals to form and foul the hot separator 42 and downstream apparatus. In such cases, quench oil 44 is added to cool the upgraded feedstock 20. The hot separator 42 separates the volatile fraction 46, which is withdrawn from the top of hot separator 42, from the non-volatile fraction 48, which is withdrawn from the bottom of hot separator 42. It will be appreciated that adding the quench oil 44 reduces the ratio of the volatile fraction 46 to the non-volatile fraction 48, thereby reducing the efficiency of the hot separation process.

FIG. 2B schematically depicts an ebullated bed reactor 110 used in the H-Oil hydrocracking system developed by Hydrocarbon Research Incorporated, presently operated by Husky Oil in Alberta, Canada, which is an example of an ebullated bed hydroprocessing system that can be upgraded according to the invention. Ebullated bed reactor 110 includes an input port 112 through which a heavy oil feedstock 114 and pressurized hydrogen gas 116 are introduced and an output port 118 through which upgraded feedstock 120 is withdrawn. An expanded catalyst zone 122 comprising a porous supported catalyst 124 is bounded by a distributor grid plate 126, which separates the expanded catalyst zone 122 from a lower catalyst free zone 128 between the bottom of the reactor 110 and the distributor grid plate 126, and an upper end 129, which defines an approximate boundary between the expanded catalyst zone 122 and an upper catalyst free zone 130. A boundary 131 shows the approximate level of supported catalyst 124 when not in an expanded or fluidized state.

Feedstock is continuously recirculated within the reactor 110 by means of a recycling channel 132 in communication with an ebullating pump 134 disposed outside of the reactor 110. Feedstock is drawn through a funnel-shaped recycle cup 136 from the upper catalyst free zone 130. The recycle cup 136 is spiral-shaped, which helps separate hydrogen bubbles 125 from the feedstock 136 so as to prevent cavitation of the ebullating pump 134. Recycled feedstock enters the lower catalyst free zone 128, where it is blended with the feedstock 116 and hydrogen gas 118, and the mixture passes up through the distributor grid plate 126 and into the expanded catalyst zone 122. Fresh catalyst 124 is introduced into the expanded catalyst zone 122 through a catalyst input tube 136, and spent catalyst 124 is withdrawn from the expanded catalyst zone 122 through a catalyst discharge tube 140.

The main difference between the H-Oil ebullated bed reactor 110 and the LC-Fining ebullated bed reactor 10 is the location of the ebullating pump. The ebullating pump 134 in the H-Oil reactor 110 is located external to the reaction chamber. The recirculating feedstock is introduced through a recirculation port 141 at the bottom of the reactor 110. The recirculation port 141 includes a bubble cap 143, which aids in evenly distributing the feedstock through the lower catalyst free zone 128. The upgraded feedstock 120 is shown being sent to a hot separator 142, which separates the volatile fraction 146 from the non-volatile fraction 148.

Figure 2C:
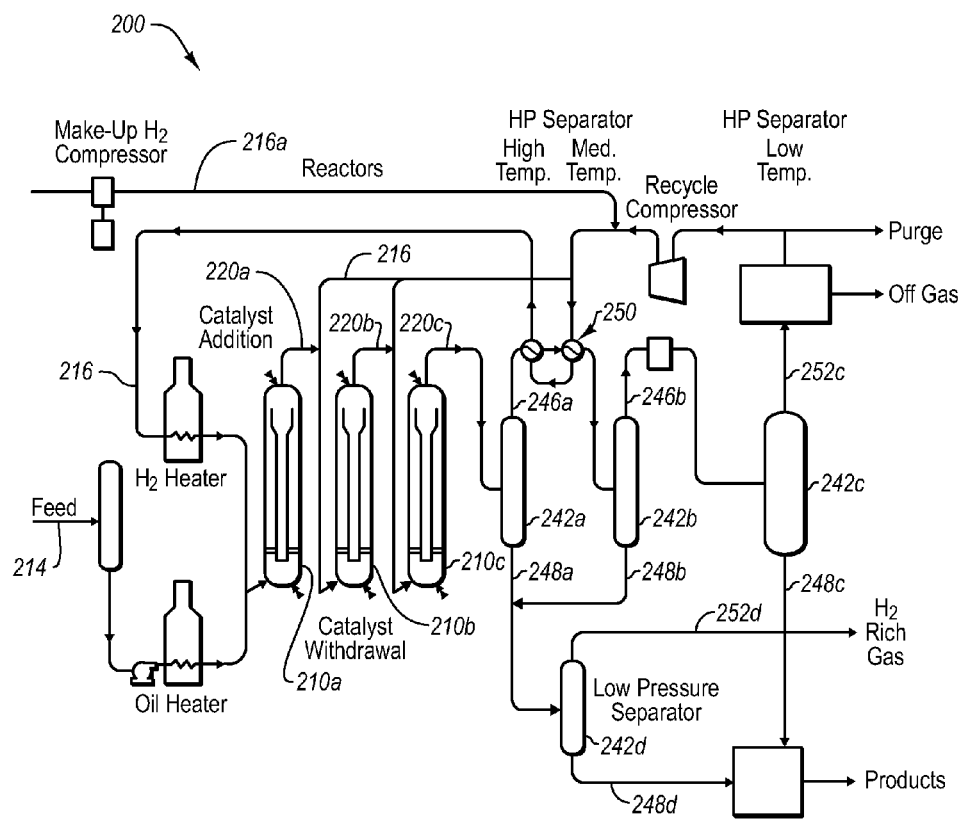
FIG. 2C is a schematic diagram that illustrates an exemplary ebullated bed hydroprocessing system comprising multiple ebullated bed reactors that may be incorporated into or upgraded to yield an improved ebullated bed hydroprocessing system according to the invention.

FIG. 2C schematically depicts a conventional ebullated bed hydroprocessing system 200 comprising multiple ebullated bed reactors. The hydroprocessing system 200, which is an LC-Fining hydroprocessing unit, includes three ebullated bed reactors 210 in series for upgrading a feedstock 214. The feedstock 214 is introduced into the first ebullated bed reactor 210a together with hydrogen gas 216, both of which are preliminary passed through respective heaters. The upgraded feedstock 220a from the first ebullated bed reactor 210a is introduced together with additional hydrogen gas 216 into the second ebullated bed reactor 210b. The upgraded feedstock 220b from the second ebullated bed reactor 210b is introduced together with additional hydrogen gas 216 into the third ebullated bed reactor 210c.

The upgraded feedstock 220c from the third ebullated bed reactor 210c is sent to a high temperature separator 242a, which separates the volatile and non-volatile fractions. The volatile fraction 246a then passes through a heat exchanger 250, which preheats hydrogen gas 216 prior to being introduced into the first ebullated bed reactor 210a. The somewhat cooled volatile fraction 246a is sent to a medium temperature separator 242b, which separates the remaining volatile fraction 246b from a resulting liquid fraction 248b that forms as a result of cooling. The remaining volatile fraction 246b is sent downstream to a low temperature separator 246c for further separation into a gaseous fraction 252c and a degassed liquid fraction 248c.

The liquid fraction 248a from the high temperature separator 242a is sent together with the resulting liquid fraction 248b from the medium temperature separator 242b to a low pressure separator 242d, which separates hydrogen rich gas 252d from a degassed liquid fraction 248d, which is then mixed with the degassed liquid fraction 248c from the low temperature separator 242c and fractionated into products. The gaseous fraction 252c from the low temperature separator 242c is purified into off gas, purge gas, and hydrogen gas 216. The hydrogen gas 216 is compressed, mixed with make-up hydrogen gas 216a, and either passed through heat exchanger 250 and introduced into the first ebullated bed reactor 210a together with the feedstock 216 or introduced directly into second and third ebullated bed reactors 210b and 210b.

B. Preparation and Characteristics of Colloidal or Molecular Catalyst

Figure 3:
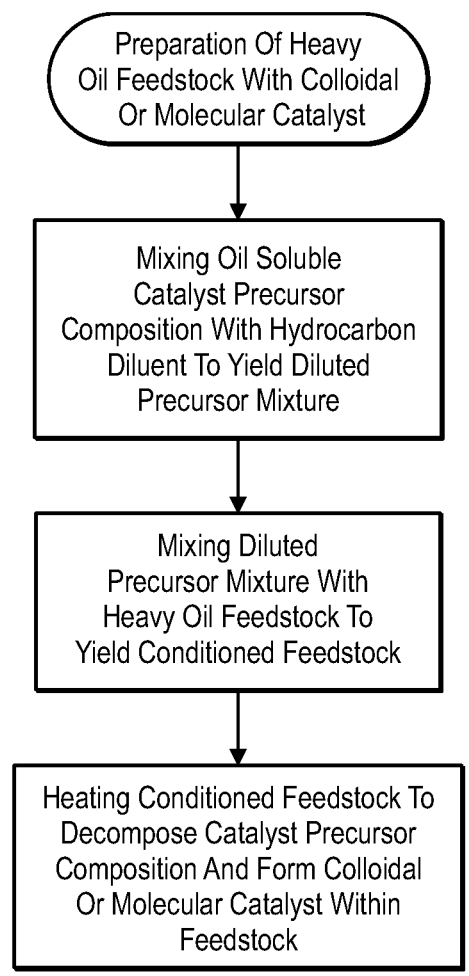
FIG. 3 is a flow diagram that schematically illustrates an exemplary process for preparing a heavy oil feedstock to include a molecular or colloidal catalyst dispersed therein.

The inventive methods and systems for upgrading a heavy oil feedstock include the preliminary step of, or sub-system for, preparing a heavy oil feedstock so as to have a colloidal or molecular catalyst dispersed therein, an example of which is schematically illustrated in the flow diagram depicted in FIG. 3. According to one embodiment, an oil soluble catalyst precursor composition is pre-mixed with a diluent hydrocarbon stream to form a diluted precursor mixture. Preparing a heavy oil feedstock to include a colloidal or molecular catalyst also forms part of exemplary methods for upgrading a pre-existing ebullated bed hydroprocessing system, as discussed more fully below.

The oil soluble catalyst precursor preferably has a decomposition temperature in a range from about 100° C. (212° F.) to about 350° C. (662° F.), more preferably in a range of about 150° C. (302° F.) to about 300° C. (572° F.), and most preferably in a range of about 175° C. (347° F.) to about 250° C. (482° F.). Examples of exemplary catalyst precursor compositions include organometallic complexes or compounds, more specifically, oil soluble compounds or complexes of transition metals and organic acids. A currently preferred catalyst precursor is molybdenum 2-ethylhexanoate (also commonly known as molybdenum octoate) containing 15% by weight molybdenum and having a decomposition temperature or range high enough to avoid substantial decomposition when mixed with a heavy oil feedstock at a temperature below about 250° C. (482° F.). Other exemplary precursor compositions include, but are not limited to, molybdenum naphthenate, vanadium naphthenate, vanadium octoate, molybdenum hexacarbonyl, vanadium hexacarbonyl, and iron pentacarbonyl. One of skill in the art can, following the present disclosure, select a mixing temperature profile that results in intimate mixing of a selected precursor composition without substantial decomposition prior to formation of the colloidal or molecular catalyst.

Examples of suitable hydrocarbon diluents include, but are not limited to, vacuum gas oil (which typically has a boiling range of 360-524° C.) (680-975° F.), decant oil or cycle oil (which typically has a boiling range of 360°-550°

C.) (680-1022° F.), and light gas oil (which typically has a boiling range of 200°-360° C.) (392-680° F.).

The ratio of catalyst precursor composition to hydrocarbon oil diluent is preferably in a range of about 1:500 to about 1:1, more preferably in a range of about 1:150 to about 1:2, and most preferably in a range of about 1:100 to about 1:5 (e.g., 1:100, 1:50, 1:30, or 1:10).

The catalyst precursor composition is advantageously mixed with the hydrocarbon diluent at a temperature below which a significant portion of the catalyst precursor composition starts to decompose, preferably, at temperature in a range of about 25° C. (77° F.) to about 250° C. (482° F.), more preferably in range of about 50° C. (122° F.) to about 200° C. (392° F.), and most preferably in a range of about 75° C. (167° F.) to about 150° C. (302° F.), to form the diluted precursor mixture. It will be appreciated that the actual temperature at which the diluted precursor mixture is formed typically depends largely on the decomposition temperature of the particular precursor composition that is utilized. The precursor composition is preferably mixed with the hydrocarbon oil diluent for a time period in a range of about 1 second to about 20 minutes, more preferably in a range of about 5 seconds to about 10 minutes, and most preferably in a range of about 20 seconds to about 5 minutes. The actual mixing time is dependent, at least in part, on the temperature (i.e., which affects the viscosity of the fluids) and mixing intensity. Mixing intensity is dependent, at least in part, on the number of stages e.g., for in-line static mixer.

Whereas it is within the scope of the invention to directly blend the catalyst precursor composition with the heavy oil feedstock, care must be taken in such cases to mix the components for a time sufficient to thoroughly blend the precursor composition within the feedstock before substantial decomposition of the precursor composition has occurred. For example, U.S. Pat. No. 5,578,197 to Cyr et al., the disclosure of which is incorporated by reference, describes a method whereby molybdenum 2-ethyl hexanoate was mixed with bitumen vacuum tower residuum for 24 hours before the resulting mixture was heated in a reaction vessel to form the catalyst compound and to effect hydrocracking (see col. 10, lines 4-43). Whereas 24-hour mixing in a testing environment may be entirely acceptable, such long mixing times may make certain industrial operations prohibitively expensive.

It has now been found that preblending the precursor composition with a hydrocarbon diluent prior to blending the diluted precursor mixture with the heavy oil feedstock greatly aids in thoroughly and intimately blending the precursor composition within the feedstock, particularly in the relatively short period of time required for large-scale industrial operations to be economically viable. Forming a diluted precursor mixture shortens the overall mixing time by (1) reducing or eliminating differences in solubility between the more polar catalyst precursor composition and the heavy oil feedstock, (2) reducing or eliminating differences in rheology between the catalyst precursor composition and the heavy oil feedstock, and/or (3) breaking up the catalyst precursor molecules to form a solute within a hydrocarbon oil diluent that is much more easily dispersed within the heavy oil feedstock. It is particularly advantageous to first form a diluted precursor mixture in the case where the heavy oil feedstock contains water (e.g., condensed water). Otherwise, the greater affinity of the water for the polar catalyst precursor composition can cause localized agglomeration of the precursor composition, resulting in poor dispersion and formation of micron-sized or larger catalyst particles. The hydrocarbon oil diluent is preferably substantially water free (i.e., contains less than about 0.5% water) to prevent the formation of substantial quantities of micron-sized or larger catalyst particles.

The diluted precursor mixture is then combined with the heavy oil feedstock and mixed for a time sufficient and in a manner so as to disperse the catalyst precursor composition throughout the feedstock in order to yield a conditioned feedstock composition in which the precursor composition is thoroughly mixed within the heavy oil feedstock. In order to obtain sufficient mixing of the catalyst precursor composition within the heavy oil feedstock so as to yield a colloidal or molecular catalyst upon decomposition of the precursor composition, the diluted precursor mixture and heavy oil feedstock are preferably mixed for a time period in a range of about 1 second to about 20 minutes, more preferably in a range from about 5 second to about 10 minutes, and most preferably in a range of about 20 seconds to about 3 minutes. Increasing the vigorousness and/or shearing energy of the mixing process generally reduce the time required to effect thorough mixing.

Examples of mixing apparatus that can be used to effect thorough mixing of the catalyst precursor composition and heavy oil feedstock include, but are not limited to, high shear mixing such as mixing created in a vessel with a propeller or turbine impeller; multiple static in-line mixers; multiple static in-line mixers in combination with in-line high shear mixers; multiple static in-line mixers in combination with in-line high shear mixers; multiple static in-line mixers in combination with in-line high shear mixers follows by a pump around in the surge vessel; combinations of the above followed by one or more multi-stage centrifugal pumps; and one or more multi-stage centrifugal pumps. According to one embodiment, continuous rather than batch-wise mixing can be carried out using high energy pumps having multiple chambers within which the catalyst precursor composition and heavy oil feedstock are churned and mixed as part of the pumping process itself. The foregoing mixing apparatus may also be used for the pre-mixing process discussed above in which the catalyst precursor composition is mixed with the hydrocarbon oil diluent to form the catalyst precursor mixture.

Alternatively, the diluted precursor mixture can be initially mixed with 20% of the heavy oil feedstock, the resulting mixed heavy oil feedstock can be mixed in with another 40% of the heavy oil feedstock, and the resulting 60% of the mixed heavy oil feedstock can be mixed in with the remainder 40% of heavy oil in accordance with good engineering practice of progressive dilution to thoroughly dispersed the catalyst precursor in the heavy oil feedstock. Vigorous adherence to the mixing time in the appropriate mixing devices or methods described herein should still be used in the progressive dilution approach.

In the case of heavy oil feedstocks that are solid or extremely viscous at room temperature, such feedstocks may advantageously be heated in order to soften them and create a feedstock having sufficiently low viscosity so as to allow good mixing of the oil soluble catalyst precursor into the feedstock composition. In general, decreasing the viscosity of the heavy oil feedstock will reduce the time required to effect thorough and intimate mixing of the oil soluble precursor composition within the feedstock. However, the feedstock should not be heated to a temperature above which significant decomposition of the catalyst precursor composition occurs until after thorough and complete mixing to form the blended feedstock composition. Prematurely decomposing the catalyst precursor composition generally results in the formation of micron-sized or larger catalyst particles rather than a colloidal or molecular catalyst. The heavy oil feedstock and diluted precursor mixture are preferably mixed and conditioned at a temperature in a range of about 25° C. (77° F.) to about 350° C. (662° F.), more preferably in a range of about 50° C. (122° F.) to about 300° C. (572° F.), and most preferably in a range of about 75° C. (167° F.) to about 250° C. (482° F.) to yield the conditioned feedstock.

After the catalyst precursor composition has been well-mixed throughout the heavy oil feedstock so as to yield the conditioned feedstock composition, this composition is then heated to above the temperature where significant decomposition of the catalyst precursor composition occurs in order to liberate the catalyst metal therefrom so as to form the final active catalyst. According to one embodiment, the metal from the precursor composition is believed to first form a metal oxide, which then reacts with sulfur liberated from the heavy oil feedstock to yield a metal sulfide compound that is the final active catalyst. In the case where the heavy oil feedstock includes sufficient or excess sulfur, the final activated catalyst may be formed in situ by heating the heavy oil feedstock to a temperature sufficient to liberate the sulfur therefrom. In some cases, sulfur may be liberated at the same temperature that the precursor composition decomposes. In other cases, further heating to a higher temperature may be required.

If the oil soluble catalyst precursor composition is thoroughly mixed throughout the heavy oil feedstock, at least a substantial portion of the liberated metal ions will be sufficiently sheltered or shielded from other metal ions so that they can form a molecularly-dispersed catalyst upon reacting with sulfur to form the metal sulfide compound. Under some circumstances, minor agglomeration may occur, yielding colloidal-sized catalyst particles. However, it is believed that taking care to thoroughly mix the precursor composition throughout the feedstock will yield individual catalyst molecules rather than colloidal particles. Simply blending, while failing to sufficiently mix, the catalyst precursor composition with the feedstock typically causes formation of large agglomerated metal sulfide compounds that are micron-sized or larger.

In order to form the metal sulfide catalyst, the blended feedstock composition is preferably heated to a temperature in a range of about 275° C. (527° F.) to about 450° C. (842° F.), more preferably in a range of about 350° C. (662° F.) to about 440° C. (824° F.), and most preferably in a range of about 375° C. (707° F.) to about 420° C. (788° F.). According to one embodiment, the conditioned feedstock is heated to a temperature that is about 100° C. (180° F.) less than the hydrocracking temperature within the hydrocracking reactor, preferably about 50° C. (90° F.) less than the hydrocracking temperature. According to one embodiment, the colloidal or molecular catalyst is formed during preheating before the heavy oil feedstock is introduced into the hydrocracking reactor. According to another embodiment, at least a portion of the colloidal or molecular catalyst is formed in situ within the hydrocracking reactor itself. In some cases, the colloidal or molecular catalyst can be formed as the heavy oil feedstock is heated to a hydrocracking temperature prior to or after the heavy oil feedstock is introduced into a hydrocracking reactor. The initial concentration of the catalyst metal in the colloidal or molecular catalyst is preferably in a range of about 5 ppm to about 500 ppm by weight of the heavy oil feedstock, more preferably in a range of about 15 ppm to about 300 ppm, and most preferably in a range of about 25 ppm to about 175 ppm. The catalyst may become more concentrated as volatile fractions are removed from a non-volatile resid fraction.

Figure 4:
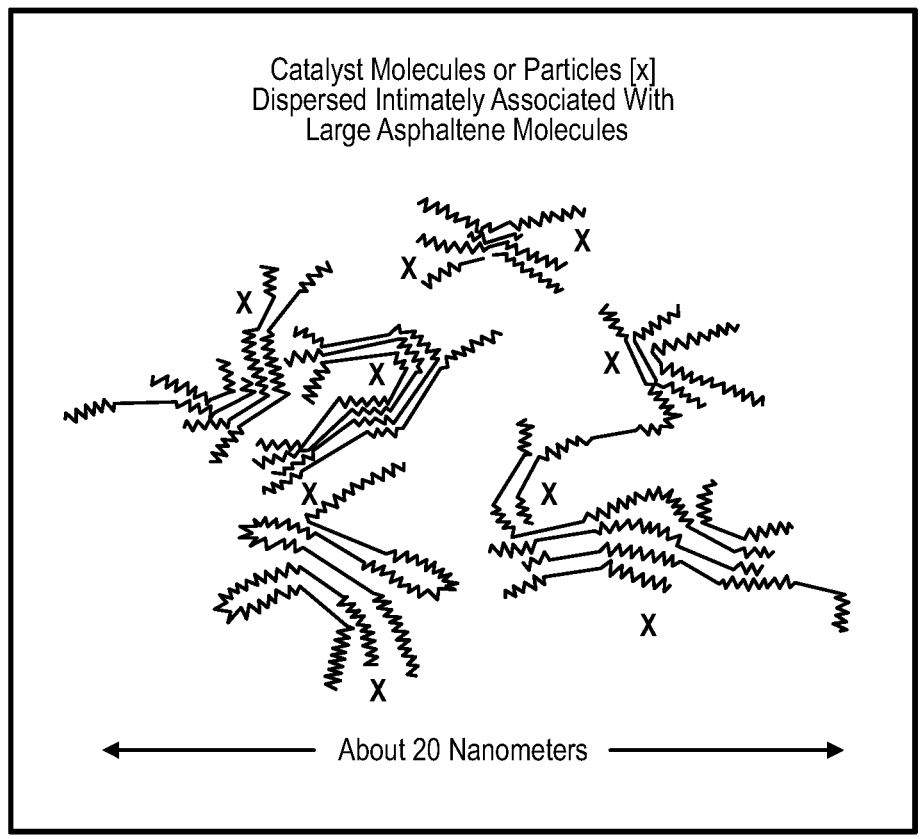
FIG. 4 schematically illustrates catalyst molecules or colloidal-sized catalyst particles associated with asphaltene molecules.

In the case where the heavy oil feedstock includes a significant quantity of asphaltene molecules, the catalyst molecules or colloidal particles will preferentially associate with, or remain in close proximity to, the asphaltene molecules. Asphaltene has a greater affinity for the colloidal or molecular catalyst since asphaltene molecules are generally more hydrophilic and less hydrophobic than other hydrocarbons contained within the heavy oil feedstock. Because the colloidal or molecular catalyst tends to be very hydrophilic, the individual particles or molecules will tend to migrate toward the more hydrophilic moieties or molecules within the heavy oil feedstock. FIG. 4 schematically depicts catalyst molecules, or colloidal particles "X" associated with, or in close proximity to, the asphaltene molecules.

While the highly polar nature of the catalyst compound causes or allows the colloidal or the molecular catalyst to associate with asphaltene molecules, it is the general incompatibility between the highly polar catalyst compound and the hydrophobic heavy oil feedstock that necessitates the aforementioned intimate or thorough mixing of the oil soluble catalyst precursor composition within the heavy oil feedstock prior to decomposition of the precursor and formation of the colloidal or molecular catalyst. Because metal catalyst compounds are highly polar, they cannot be effectively dispersed within a heavy oil feedstock in colloidal or molecular form if added directly thereto or as part of an aqueous solution or an oil and water emulsion. Such methods inevitably yield micron-sized or larger catalyst particles.

Figure 5A:
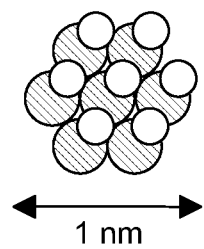
FIGS. 5A and 5B schematically depict top and side views of a molybdenum disulfide crystal approximately 1 nm in size.
Figure 5B:
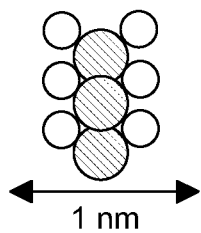

Reference is now made to FIGS. 5A and 5B, which schematically depict a nanometer-sized molybdenum disulfide crystal. FIG. 5A is a top view, and FIG. 5B is a side view of a molybdenum disulfide crystal. Molecules of molybdenum disulfide typically form flat, hexagonal crystals in which single layers of molybdenum (Mo) atoms are sandwiched between layers of sulfur (S) atoms. The only active sites for catalysis are on the crystal edges where the molybdenum atoms are exposed. Smaller crystals have a higher percentage of molybdenum atoms exposed at the edges.

Figure 6:
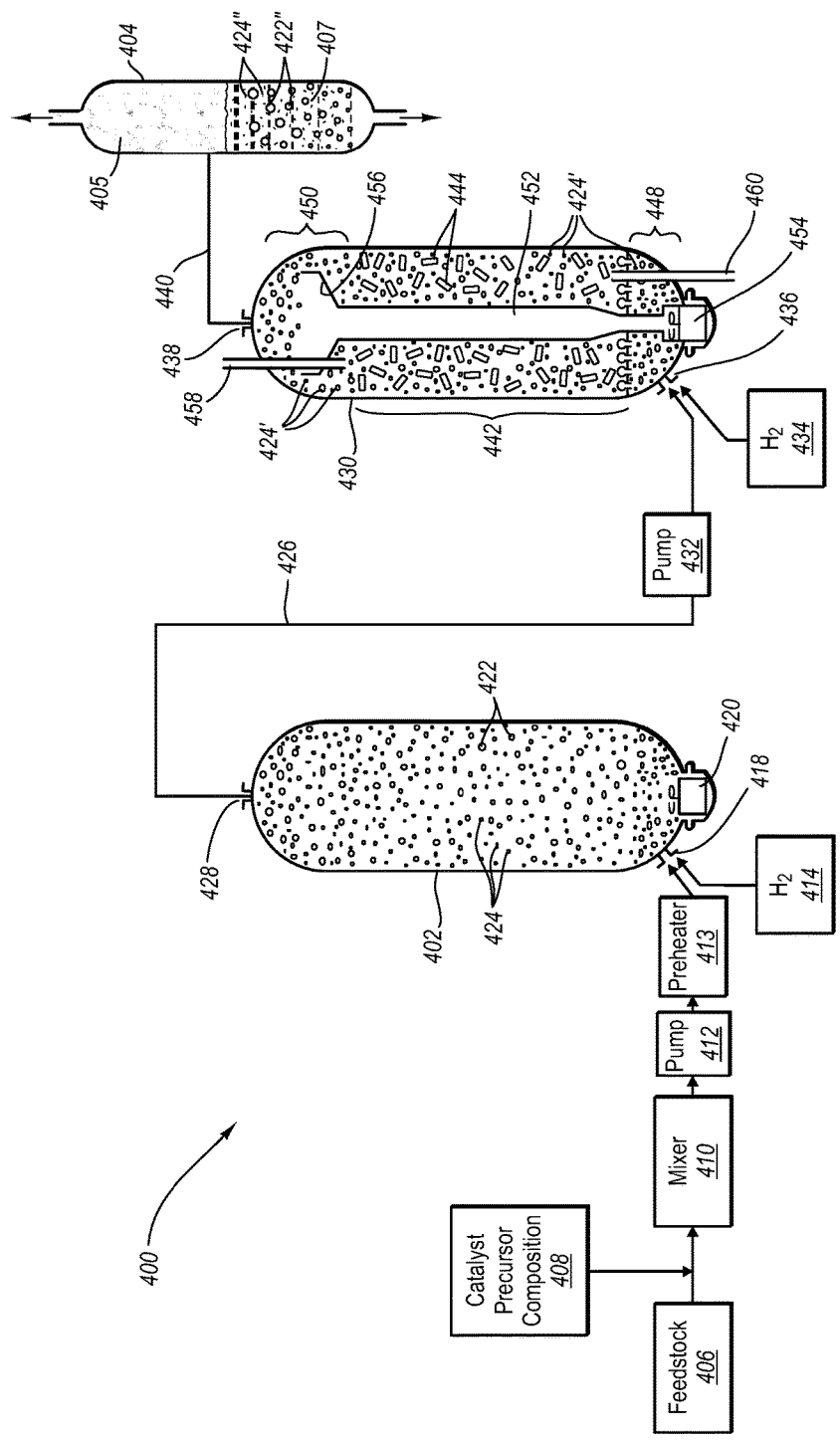
FIG. 6 is a schematic diagram of an exemplary ebullated bed hydroprocessing system according to the invention that includes a slurry phase reactor, an ebullated bed reactor, and a hot separator.

The diameter of a molybdenum atom is approximately 0.3 nm, and the diameter of a sulfur atom is approximately 0.2 nm. A nanometer-sized crystal of molybdenum disulfide has 7 molybdenum atoms sandwiched in between 14 sulfur atoms. As best seen in FIG. 5A, 6 out of 7 (85.7%) of the total molybdenum atoms will be exposed at the edge and available for catalytic activity. In contrast, a micron-sized crystal of molybdenum disulfide has several million atoms, with only about 0.2% of the total molybdenum atoms being exposed at the crystal edge and available for catalytic activity. The remaining 99.8% of the molybdenum atoms in the micron-sized crystal are embedded within the crystal interior and are therefore unavailable for catalysis. This means that nanometer-sized molybdenum disulfide particles are, at least in theory, orders of magnitude more efficient than micron-sized particles in providing active catalyst sites.

In practical terms, forming smaller catalyst particles results in more catalyst particles and more evenly distributed catalyst sites throughout the feedstock. Simple mathematics dictates that forming nanometer-sized particles instead of micron-sized particles will result in approximately $1000^3$ (or 1 million) to $1000^3$ (or 1 billion) times more particles depending on the size and shape of the catalyst crystals. That means there are approximately 1 million to 1 billion times more points or locations within the feedstock where active catalyst sites reside. Moreover, nanometer-sized or smaller molybdenum disulfide particles are believed to become intimately associated with asphaltene molecules, as shown in FIG. 4. In contrast, micron-sized or larger catalyst particles are believed to be far too large to become intimately associated with or within asphaltene molecules.

C. Ebullated Bed Reactors and Systems that Employ the Colloidal or Molecular Catalyst FIG. 6 schematically illustrates an exemplary ebullated bed hydroprocessing system 400 according to the invention. Ebullated bed hydroprocessing system 400 includes a slurry phase hydrocracking reactor 402, a hot separator 404, and an ebullated bed reactor 430 disposed between the slurry phase reactor 402 and the hot separator 404. A heavy oil feedstock 406 is initially blended and conditioned with a catalyst precursor composition 408 within a mixer 410, preferably after first pre-mixing the precursor composition 408 with a diluent as discussed above. The conditioned feedstock from the mixer 410 is pressurized by a pump 412, passed through a pre-heater 413, and continuously or periodically fed into the slurry phase reactor 402 together with hydrogen gas 414 through an input port 418 located at or near the bottom of the slurry phase reactor 402. A stirrer 420 at the bottom of the slurry phase reactor 402 helps to more evenly disperse the hydrogen 414, schematically depicted as gas bubbles 422, within the feedstock 406. Alternatively or in addition to the stirrer 420, the slurry phase reactor 402 may include a recycle channel, recycling pump, and distributor grid plate (not shown) as in conventional ebullated bed reactors to promote more even dispersion of reactants, catalyst, and heat. The colloidal or molecular catalyst within the feedstock 406 is schematically depicted as catalyst particles 424. It will be appreciated that gas bubbles 422 and catalyst particles 424 are shown oversized so that they may be seen in the drawing. In reality, they are likely invisible to the naked eye.

The heavy oil feedstock 406 is catalytically upgraded in the presence of the hydrogen and colloidal or molecular catalyst within the slurry phase reactor 402 to form an upgraded feedstock 426, which is continuously withdrawn along with residual hydrogen and from the slurry phase reactor 402 through an output port 428 located at or near the top of the slurry phase reactor 402. The upgraded feedstock 426 is optionally pressurized by pump 432 and introduced together with supplemental hydrogen 434 into the ebullated bed reactor 430 through an input port 436 located at or near the bottom of the ebullated bed reactor 430. The upgraded feedstock 426 contains residual or molecular catalyst, schematically depicted as catalyst particles 424' within the ebullated bed reactor 430, and hydrogen. The ebullated bed reactor 430 also includes an output port 438 at or near the top of the ebullated bed reactor 430 through which a further hydroprocessed feedstock 440 is withdrawn.

The ebullated bed reactor 430 further includes an expanded catalyst zone 442 comprising a porous supported catalyst 444. A lower supported catalyst free zone 448 is located below the expanded catalyst zone 442, and above the expanded catalyst zone 442 is an upper supported catalyst free zone 450. Residual colloidal or molecular catalyst 424' is dispersed throughout the feedstock within the ebullated bed reactor 430, including both the expanded catalyst zone 442 and the supported catalyst free zones 448, 450, 452 thereby being available to promote upgrading reactions within what constitute catalyst free zones in conventional ebullated bed reactors. Feedstock within the ebullated bed reactor 430 is continuously recirculated from the upper supported catalyst free zone 450 to the lower supported catalyst free zone 448 by means of a recycling channel 452 in communication with an ebullating pump 454. At the top of the recycling channel 452 is a funnel-shaped recycle cup 456 through which feedstock is drawn from the upper supported catalyst free zone 450. The recycled feedstock is blended with fresh upgraded feedstock 426 and supplemental hydrogen gas 434.

Fresh supported catalyst 444 is introduced into the ebullated bed reactor 430 reactor through a catalyst input tube 458, and spent supported catalyst 444 is withdrawn through a catalyst withdrawal tube 460. Whereas the catalyst withdrawal tube 460 is unable to differentiate between fully spent catalyst, partially spent but active catalyst, and fresh catalyst, the existence of residual colloidal or molecule catalyst, schematically shown as catalyst particles 424' within the ebullated bed reactor 430, provides additional catalytic hydrogenation activity, both within the expanded catalyst zone 442, the recycle channel 452, and the lower and upper supported catalyst free zones 448, 450. Capping of free radicals outside of the supported catalyst 444 minimizes formation of sediment and coke precursors, which are often responsible for deactivating the supported catalyst. This has the effect of reducing the amount of supported catalyst 444 that would otherwise be required to carry out a desired hydroprocessing reaction. It also reduces the rate at which the supported catalyst 444 must be withdraw and replenished.

Finally, the further hydroprocessed feedstock 440 withdrawn from the ebullated bed reactor 430 is introduced into the hot separator 404. The hot separator 404 separates the volatile fraction 405, which is withdrawn from the top of hot separator 404, from the non-volatile fraction 407, which is withdrawn from the bottom of hot separator 404. According to one embodiment, the hot separator is advantageously operated at a temperature within about 20° F. (about 11° C.) of the hydroprocessing temperature within the ebullated bed reactor 430. The non-volatile fraction 407 still contains residual colloidal or molecular catalyst, schematically depicted as catalyst particles 424", and residual hydrogen gas, schematically depicted as bubbles 422", dispersed therein. As a result, beneficial hydrogenation reactions between hydrocarbon free radicals that still exist and/or that are formed within the non-volatile fraction 407 and the residual hydrogen 422" can be catalyzed by the residual colloidal or molecular catalyst 424" within the hot separator 404. There is therefore no need to add quenching oil to the further hydroprocessed feedstock 440 to prevent fouling of the hot separator 404.

Figure 7A:
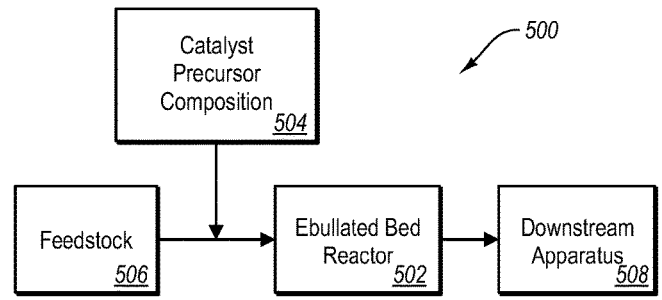
FIG. 7A-7C are block diagrams that illustrate exemplary ebullated bed hydroprocessing systems according to the invention.
Figure 7B:
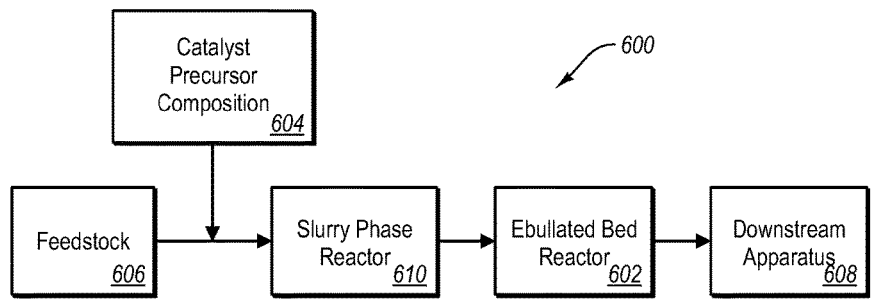
Figure 7C:
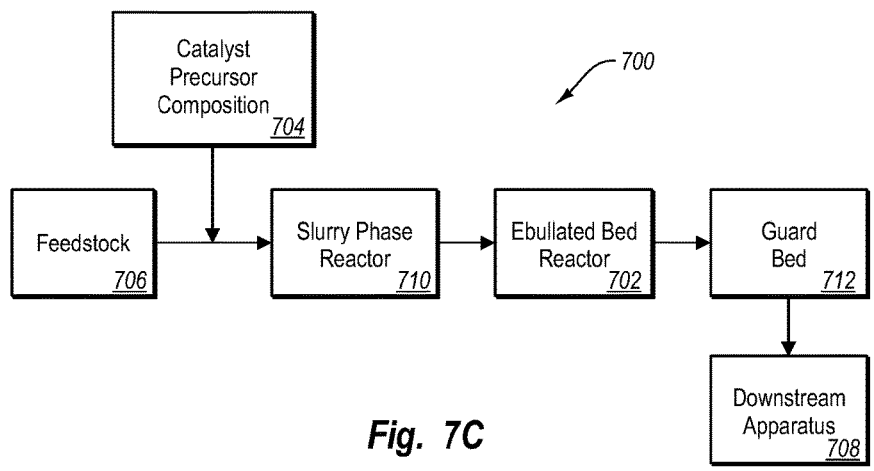

FIGS. 7A-7C further illustrate exemplary ebullated bed hydroprocessing systems according to the invention, including upgraded systems from pre-existing ebullated bed systems. FIG. 7A is a box diagram that schematically illustrates an exemplary hydroprocessing system 500 which includes an ebullated bed reactor 502 and that differs from a conventional ebullated bed system by blending a catalyst precursor composition 504 with a heavy oil feedstock 506 prior to introducing the feedstock 506 into the ebullated bed reactor 502 and downstream apparatus 508. Downstream apparatus 508 may comprise one or more additional ebullated bed reactors, other hydrocracking or hydroprocessing reactors, hot separators, distillation towers, a guard bed, and the like.

The heavy oil feedstock 506 may comprise any desired fossil fuel feedstock and/or fraction thereof including, but not limited to, one or more of heavy crude, oil sands bitumen, bottom of the barrel fractions from crude oil, atmospheric tower bottoms, vacuum tower bottoms, coal tar, liquefied coal, and other resid fractions. According to one embodiment, the heavy oil feedstock 506 includes a significant fraction of high boiling point hydrocarbons (i.e., at or above 343° C. (650° F.), more particularly at or above about 524° C. (975° F.)) and/or asphaltenes. Asphaltenes are complex hydrocarbon molecules that include a relatively low ratio of hydrogen to carbon that is the result of a substantial number of condensed aromatic and naphthenic rings with paraffinic side chains (See FIG. 1). Sheets consisting of the condensed aromatic and naphthenic rings are held together by heteroatoms such as sulfur or nitrogen and/or polymethylene bridges, thio-ether bonds, and vanadium and nickel complexes. The asphaltene fraction also contains a higher content of sulfur and nitrogen than does crude oil or the rest of the vacuum resid, and it also contains higher concentrations of carbon-forming compounds (i.e., that form coke precursors and sediment).

The catalyst precursor composition 504 is intimately mixed with the feedstock 506 prior to introducing the feedstock into the ebullated bed reactor 502. According to one embodiment, the catalyst precursor composition may be pre-mixed with a diluent hydrocarbon stream (not shown) to form a diluted precursor mixture that is then mixed with the heavy oil feedstock 506. The colloidal or molecular catalyst may be generated prior to introducing the feedstock 506 into the ebullated bed reactor 502 and/or generated in situ within the ebullated bed reactor 502. In this way, the ebullated bed reactor 502 within hydroprocessing system 500 employs a colloidal or molecular catalyst, which provides the benefits described above (e.g., promotes beneficial upgrading reactions involving asphaltenes or other large hydrocarbon molecules that are too large to diffuse into the pores of a porous supported catalyst and provides a hydroprocessing catalyst in what would otherwise constitute catalyst free zones inherent in an ebullated bed reactor and downstream apparatus 508).

FIG. 7B is a box diagram that schematically illustrates an exemplary ebullated bed hydroprocessing system 600 that includes a slurry phase reactor 610 upstream from an ebullated bed reactor 602 and downstream apparatus 608. The slurry phase reactor 610 may comprise a previously operating ebullated bed reactor that has been converted into a slurry phase reactor, or it may comprise a newly constructed reactor within the hydroprocessing system 600. The catalyst precursor composition 604 is intimately mixed with the heavy oil feedstock 606 prior to introducing the feedstock 606 into the slurry phase reactor 610. The slurry phase reactor 610 yields an upgraded feedstock, which is thereafter introduced into the ebullated bed reactor 602, either directly or after additional processing (e.g., one or more additional slurry phase reactors, one or more hot separators, and/or one or more ebullated bed reactors upstream from ebullated bed reactor 602). The hydroprocessing system 600 may further include downstream apparatus 608 as desired to complete the system (e.g., one or more of a guard bed, fixed bed hydrotreating reactor, hot separator, and the like).

FIG. 7C is a box diagram that schematically illustrates an exemplary ebullated bed hydroprocessing system 700 that includes a slurry phase reactor 710 upstream from an ebullated bed reactor 702 and a guard bed 712 downstream from the ebullated bed reactor 702. The catalyst precursor composition 704 is intimately mixed with the heavy oil feedstock 706 prior to introducing the feedstock 706 into the slurry phase reactor 710. The slurry phase reactor 710 yields an upgraded feedstock, which is thereafter introduced into the ebullated bed reactor 702 for further hydrocracking and/or hydrotreating. The further upgraded material from the ebullated bed reactor 702 is sent to the guard bed 712, which advantageously comprises a fixed bed reactor that includes a catalyst that is specially designed to remove targeted impurities (e.g., one or more of metal impurities such as nickel and vanadium and at least a portion of the colloidal or molecular catalyst). The hydroprocessing system 700 may further include downstream apparatus 708 as desired to complete the system.

Any of the foregoing exemplary ebullated bed hydroprocessing systems, as well as others, that may be made by those of skill in the art based on the teachings disclosed herein, may comprise entirely new equipment (e.g., a "green field operation"), or they may integrate one or more components from pre-existing hydroprocessing systems. It is within the scope of the invention to upgrade a pre-existing ebullated bed reactor or hydroprocessing system to yield a hydroprocessing system according to the invention.

D. Methods for Upgrading an Existing Ebullated Bed Reactor or System

Figure 8A:
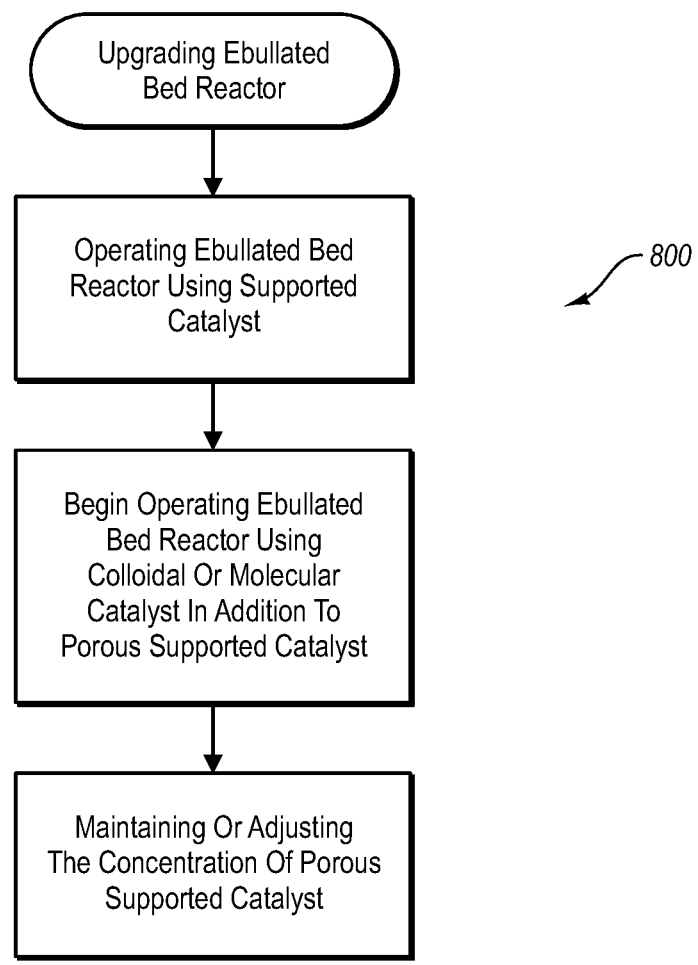
FIGS. 8A-8D are flow diagrams that illustrate exemplary methods for upgrading a pre-existing ebullated bed hydroprocessing system.

FIGS. 8A-8D show box diagrams that schematically illustrate exemplary methods for upgrading pre-existing ebullated bed reactors and systems according to the invention. FIG. 8A is a box diagram of an exemplary method 800 for upgrading a pre-existing ebullated bed reactor. The first step or act involves operating a pre-existing ebullated bed reactor using a porous supported ebullated bed catalyst. Such catalysts typically have a size of, for example, $\frac{1}{4}"\times\frac{1}{8}"$ or $\frac{1}{4}"\times\frac{1}{16}"$ (6.35 mm×3.175 mm or 6.35 mm×1.5875 mm), and include a porous inert support material and active metal catalyst sites disposed within the pores of the support material. As discussed above, the heavy oil feedstock molecules, more particularly the hydrocarbon free radicals generated by thermal cracking, must diffuse into the pores of the catalyst. As a result, larger molecules such as asphaltenes that are too large to enter the pores cannot be effectively hydroprocessed using the porous supported catalyst. Moreover, hydrocarbon free radicals of any size within the catalyst free zones of the ebullated bed reactor cannot be hydroprocessed because they are not in contact with the porous supported catalyst, nor can molecules outside the pores of the porous supported catalyst.

According to one embodiment of the invention, the ebullated bed reactor is initially upgraded by operating the reactor using a colloidal or molecular catalyst in addition to the porous supported catalyst. The colloidal or molecular catalyst can be generated within a heavy oil feedstock prior to introducing the feedstock into the ebullated bed reactor, or the feedstock may contain a well-dispersed catalyst precursor composition that forms the colloidal or molecular catalyst in situ within the ebullated bed reactor. Exemplary methods for preparing the colloidal or molecular catalyst within a feedstock are described more fully above.

Operating the ebullated bed reactor using the colloidal or molecular catalyst immediately helps to offset at least two deficiencies inherent in the ebullated bed reactor prior to upgrading according to the invention. First, the colloidal or molecular catalyst will remain within the heavy oil feedstock as it passes into what were previous the catalyst free zones of the ebullated bed reactor. As a result, the colloidal or molecular catalyst allows beneficial upgrading reactions of the feedstock throughout the entire reaction chamber, including what previous constituted catalyst free zones (e.g., hydrocarbon free radicals formed anywhere in the reaction chamber as a result of thermal cracking can be hydroprocessed and capped with hydrogen anywhere in the reaction chamber, as well as within downstream processing equipment, such as hot separators. Second, asphaltenes and other hydrocarbon molecules that are too large to enter the pores of the supported catalyst can be hydroprocessed by the colloidal or molecular catalyst, both within the expanded catalyst zone and what previously constituted the catalyst free zones prior to upgrading. The result is increased conversion of the feedstock and decreased fouling of the equipment.

Either before, but typically after, beginning to operate the ebullated bed reactor using the colloidal or molecular catalyst, the concentration of porous supported catalyst within the ebullated bed reactor can be adjusted to a desired level. In some cases it may be desirable to simply maintain the concentration of supported catalyst at the same level as before upgrading the ebullated bed reactor and operating the reactor at a higher conversion or using a lower quality feedstock. However, because the catalytic effect of the colloidal or molecular catalyst is additive to that of the supported catalyst, it may be possible in many cases to reduce the concentration of the porous supported catalyst. The concentration of the supported catalyst can be reduced from an initial level to a reduced level all at once, or it may be done gradually in steps. In some cases it may be possible or desirable to eliminate the supported catalyst entirely, which would convert the ebullated bed reactor into a slurry phase reactor.

It is also within the scope of the invention to vary the concentration of the supported catalyst and/or the colloidal or molecular catalyst in order to optimize the hydroprocessing of different feedstocks of varying quality. In this way the precise ratio of supported catalyst and colloidal or molecular catalyst can be fined-tuned to a particular heavy oil feedstock. For example, for feedstocks that include relatively high concentrations of asphaltenes, it may be advantageous to increase the ratio of colloidal or molecular catalyst to supported catalyst. Conversely, for feedstocks that include a relatively low concentration of asphaltenes, it may be advantageous to decrease the ratio of colloidal or molecular catalyst to supported catalyst.

Figure 8B:
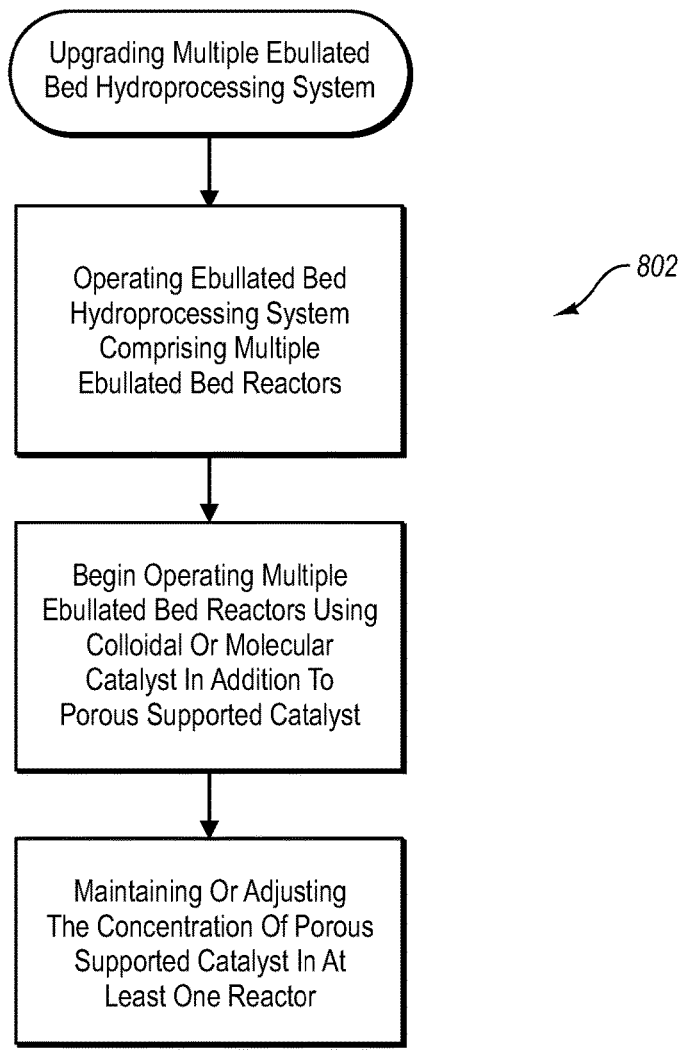

FIG. 8B is a box diagram of an exemplary method 802 for upgrading a pre-existing ebullated bed hydroprocessing system comprising multiple ebullated bed reactors. It should be understood that operating and upgrading an ebullated bed hydroprocessing system comprising multiple ebullated bed reactors as illustrated in FIG. 8B is not mutually exclusive to operating and upgrading an ebullated bed reactor as illustrated in FIG. 8A. The first step or act involves operating a pre-existing ebullated bed hydroprocessing system comprising multiple ebullated bed reactors using a porous supported catalyst within each reactor.

According to one embodiment of the invention, the ebullated bed hydroprocessing system is initially upgraded by operating one or more of the ebullated bed reactors using a colloidal or molecular catalyst in addition to the porous supported catalyst. Operating one or more ebullated bed reactors using the colloidal or molecular catalyst allows beneficial upgrading reactions of the feedstock throughout the entire reaction chamber of the one or more ebullated bed reactors, including what previous constituted catalyst free zones, and allows for hydroprocessing of asphaltenes and other hydrocarbon molecules too large to enter the pores of the supported catalyst. The result is increased conversion of the feedstock and decreased fouling of the system.

Either before or after beginning to operate one or more ebullated bed reactors using the colloidal or molecular catalyst, the concentration of porous supported catalyst within one or more ebullated bed reactors can be adjusted to a desired level. The concentration of supported catalyst in all the ebullated bed reactors can be maintained at their initial levels or they may all be adjusted to a desired lower level, either simultaneously or sequentially. Alternatively, the concentration of the supported catalyst and/or the colloidal or molecular catalyst can be varied from reactor to reactor to account for differences in the quality of feedstock that is introduced into each ebullated bed reactor. It within the scope of the invention to eliminate the supported catalyst entirely within one or more ebullated bed reactors, while keeping at least some of the supported catalyst within on or more other ebullated bed reactors. According to one embodiment, the last ebullated bed reactor in a series may include a porous catalyst designed to remove at least a portion of the colloidal or molecular catalyst from the upgraded feedstock. According to one embodiment, supplemental colloidal or molecular catalyst can be added to the upgraded feedstock and/or the downstream reactor(s) to offset possible catalyst removal by the porous supported catalyst in the upstream reactor(s).

Figure 8C:
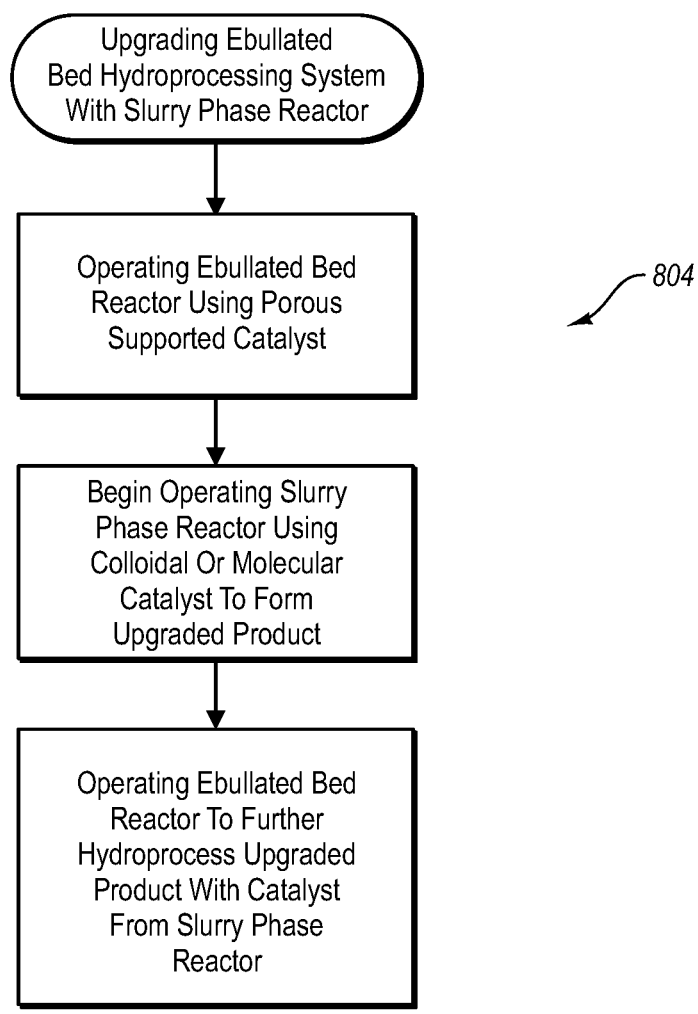

FIG. 8C is a box diagram of an exemplary method 804 for upgrading a pre-existing ebullated bed hydroprocessing system comprising at least one ebullated bed reactor. It should be understood that operating and upgrading at least one ebullated bed reactor as illustrated in FIG. 8C is not mutually exclusive to operating and upgrading an ebullated bed reactor as illustrated in FIG. 8A or operating and upgrading a hydroprocessing system comprising multiple ebullated bed reactors as illustrated in FIG. 8B. The first step or act involves operating a pre-existing ebullated bed hydroprocessing system comprising at least one ebullated bed reactor using a porous supported catalyst.

According to one embodiment of the invention, the ebullated bed hydroprocessing system is initially upgraded by beginning operating one or more slurry phase reactors upstream from at least one ebullated bed reactor using a colloidal or molecular catalyst within the slurry phase reactor. Operating one or more slurry phase reactors using the colloidal or molecular catalyst allows beneficial upgrading reactions of the feedstock prior to introducing the upgraded feedstock into the at least one ebullated bed reactor. Because of this, the upgraded feedstock introduced into the ebullated bed reactor will be of higher quality compared to the quality of the feedstock prior to upgrading. For example, the upgraded feedstock from the slurry phase reactor has a lower average boiling point and contains fewer asphaltenes and other larger molecules that might otherwise tend to foul the at least one ebullated bed reactor.

In addition, the upgraded feedstock from the slurry phase reactor that is introduced into the ebullated bed reactor(s) contains the colloidal or molecular catalyst, which will further improve the hydroprocessing reaction in the ebullated bed reactor for the reasons given above. As above, it is within the scope of the invention to maintain the initial concentration of supported catalyst. Alternatively, the concentration of the supported catalyst may be reduced or altered depending on the quality of the feedstock or a desired conversion.

In a variation of the method illustrated in FIG. 8C, a guard bed may be added after the last ebullated bed in order to remove the molecular or colloidal catalyst and/or other metals that may remain in the hydroprocessed material produced by the upgraded ebullated bed hydroprocessing system. In addition to the guard bed, a fixed bed hydrotreating reactor may be installed after the guard bed.

Figure 8D:
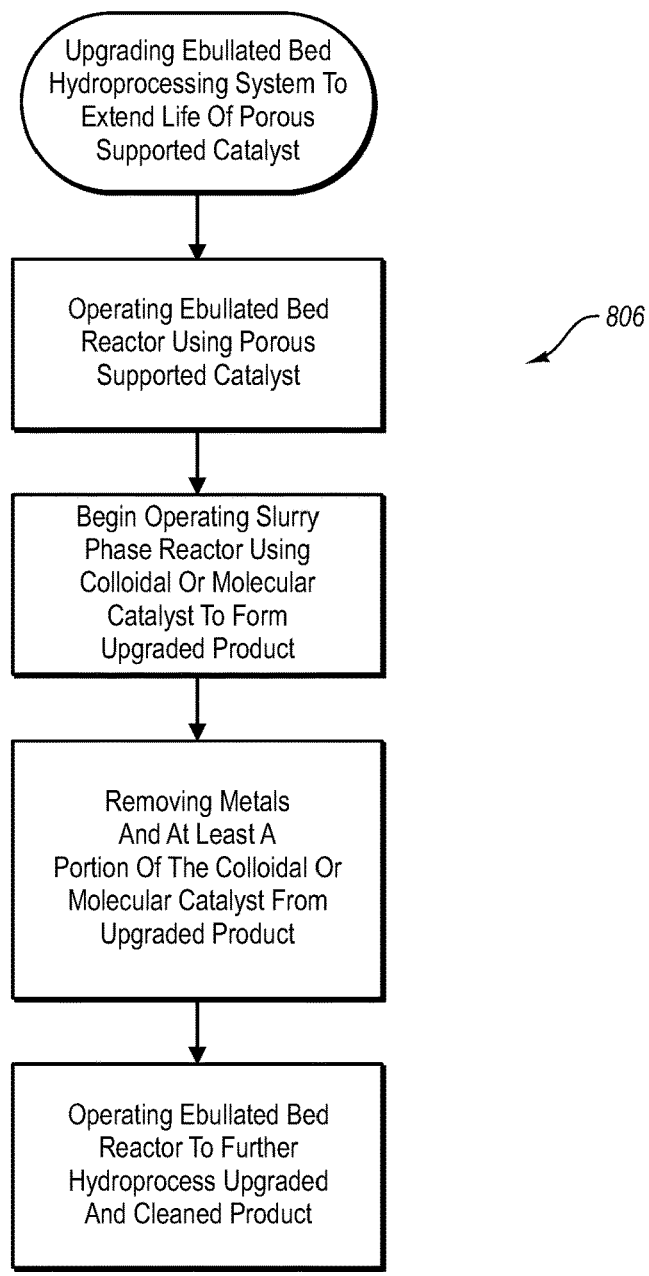

FIG. 8D is a box diagram of an exemplary method 806 for upgrading a pre-existing ebullated bed hydroprocessing system comprising at least one ebullated bed reactor in a manner that is expressly designed to prolong the life of the supported catalyst within the ebullated bed. It should be understood that operating and upgrading at least one ebullated bed reactor as illustrated in FIG. 8D is not mutually exclusive to operating and upgrading an ebullated bed reactor as illustrated in FIG. 8A, a hydroprocessing system comprising multiple ebullated bed reactors as illustrated in FIG. 8B, or at least one ebullated reactor as in illustrated in FIG. 8C. The first step or act involves operating a pre-existing ebullated bed hydroprocessing system comprising at least one ebullated bed reactor using a porous supported catalyst.

As in the immediately preceding example, the ebullated bed hydroprocessing system is initially upgraded by beginning operating one or more slurry phase reactors upstream from the ebullated bed reactor(s) using a colloidal or molecular catalyst within the slurry phase reactor. After upgrading the feedstock in the one or more slurry phase reactors, and optionally one or more ebullated bed reactors upstream from the ebullated bed reactor in question, the upgraded feedstock is processed so as to remove at least a portion of the colloidal or molecular catalyst, as well as any metal impurities, prior to introducing the feedstock into the ebullated bed reactor in question. This may be accomplished, for example, by passing the upgraded feedstock through a reactor that includes a porous catalyst that is designed to remove metal impurities from a feedstock. The reactor containing the porous catalyst for removing metal impurities may be a fixed bed reactor (e.g., a guard bed) or it may be an ebullated bed containing the aforementioned catalyst. The purified feedstock is then feed into and hydroprocessed using the ebullated bed reactor in question.

The improved ebullated bed hydroprocessing methods and systems of the present invention preferably achieve conversion levels of at least about 50%, more preferably at least about 65%, and most preferably at least about 80%. Use of the colloidal or molecular catalyst can achieve conversion levels up to about 95%. Moreover, whereas conventional ebullated bed systems typically have a lower conversion level for the asphaltene fraction as compared to the heavy oil feedstock as a whole, the improved ebullated bed hydroprocessing methods and systems preferably maintain similar conversion levels for both the asphaltene fraction and the overall heavy oil feedstock.

III. Experimental Studies and Results

The following test studies demonstrate the effects and advantages of using a colloidal or molecular catalyst instead of, or in addition to, a conventional porous supported catalyst when hydroprocessing a heavy oil feedstock that includes a significant quantity of asphaltenes.

Example 1

The ability of a colloidal or molecular catalyst and a porous supported catalyst to convert the asphaltene fraction of a heavy oil feedstock was compared. A heavy oil feedstock comprising Cold Lake bitumen atmospheric resid and 300 ppm of a molybdenum disulfide catalyst in colloidal or molecular form was introduced into a pilot slurry phase hydroprocessing reactor system and operated at various percent resid conversion levels. The pilot reactor system used in this test was similar to that shown in FIG. 10 (discussed more fully below), except that the pilot reactor system only had a single continuous flow slurry phase reactor having a volume of 1200 ml. The pilot reactor was a hollow tube and had no internal liquid recycle system. The pilot plant experiments were carried out under 2000 psig of hydrogen pressure, with a reaction temperature over the range of 430-450° C. to control the conversion level and a hydrogen flow rate of 5000 standard cubic feet per barrel of heavy oil (SCF/bbl). The percent conversion of the asphaltenes versus the overall conversion level for the resid material when using the colloidal or molecular catalyst is plotted in the chart shown at FIG. 9.

Cold Lake bitumen atmospheric resid was also hydroprocessed using a porous supported catalyst within a 3 phase, gas-liquid-solid continuous flow stirred reactor that was operated at various percent resid conversion levels. The porous supported catalyst was contained within a spinning cage and experiments were carried out at 2000 psig hydrogen pressure at reaction temperature between 420-440° C. to control the conversion level. The percent conversion of the asphaltenes versus the overall conversion level for the resid material when using the porous supported catalyst is also plotted in the chart shown at FIG. 9.

Figure 9:
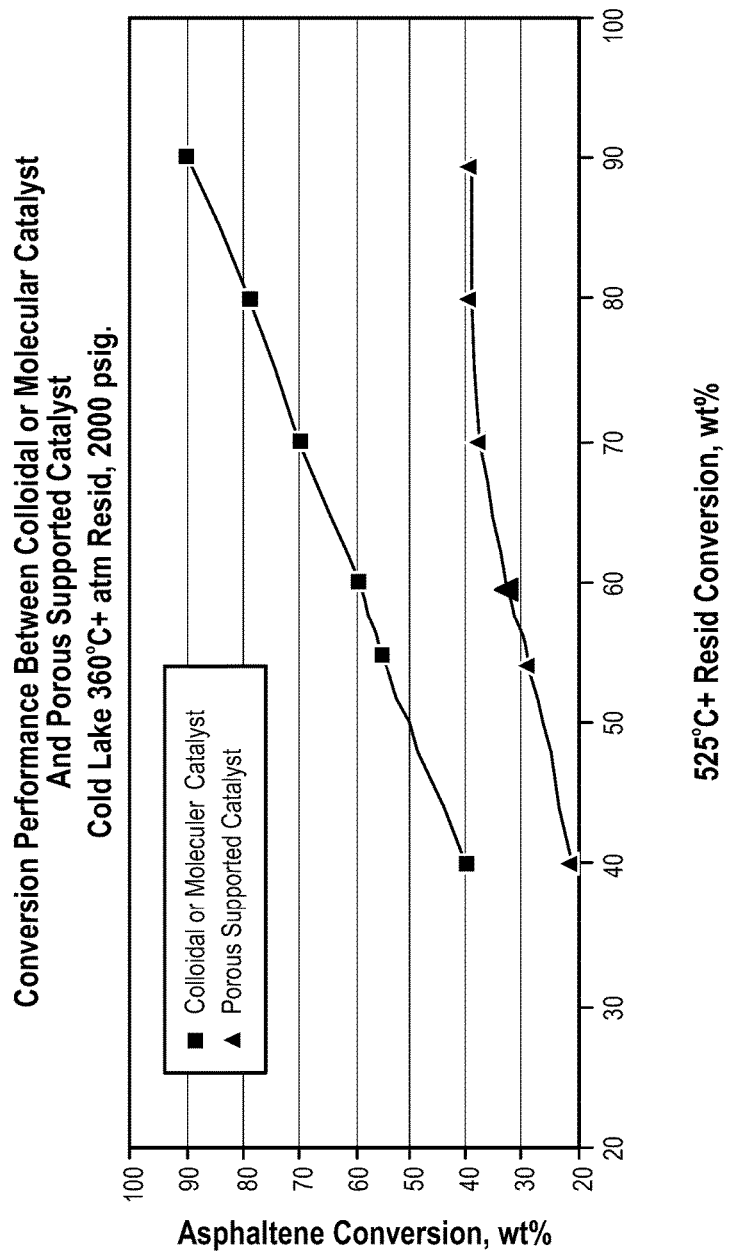
FIG. 9 is a chart comparing the asphaltene conversions using a colloidal or molecular catalyst versus using a porous supported catalyst.

According to the chart of FIG. 9, the comparative study showed that the percent conversion of asphaltenes using the colloidal or molecular catalyst was the same as the percent conversion of the resid material as a whole. That means the asphaltenes were converted into lower boiling materials at the same conversion level as the resid material as a whole, demonstrating that the colloidal or molecular catalyst was as active in converting asphaltenes as other resid hydrocarbon molecules. In practical terms, the result is no incremental buildup of asphaltenes in the feedstock.

In contrast, the percent conversion of asphaltenes using the porous supported catalyst was half or less of the percent conversion of the resid fraction as a whole. That means the porous supported catalyst was substantially less effective in converting asphaltenes than other hydrocarbons in the resid material, most likely because the larger asphaltenes are not able to diffuse into the pores of catalyst as readily as other, smaller molecules in the resid material. As a result, a much higher proportion of asphaltenes remained unconverted, and the remaining unconverted resid material contained an increased proportion of asphaltenes. Producing a resid material having an ever-increasing concentration of asphaltenes would be expected to lead to catalyst and equipment fouling, which is why only diluted vacuum tower residuum or low asphaltene feedstocks can be hydroprocessed using conventional ebullated bed and fixed bed systems and at a conversion level less than 60.

Example 2

Figure 10:
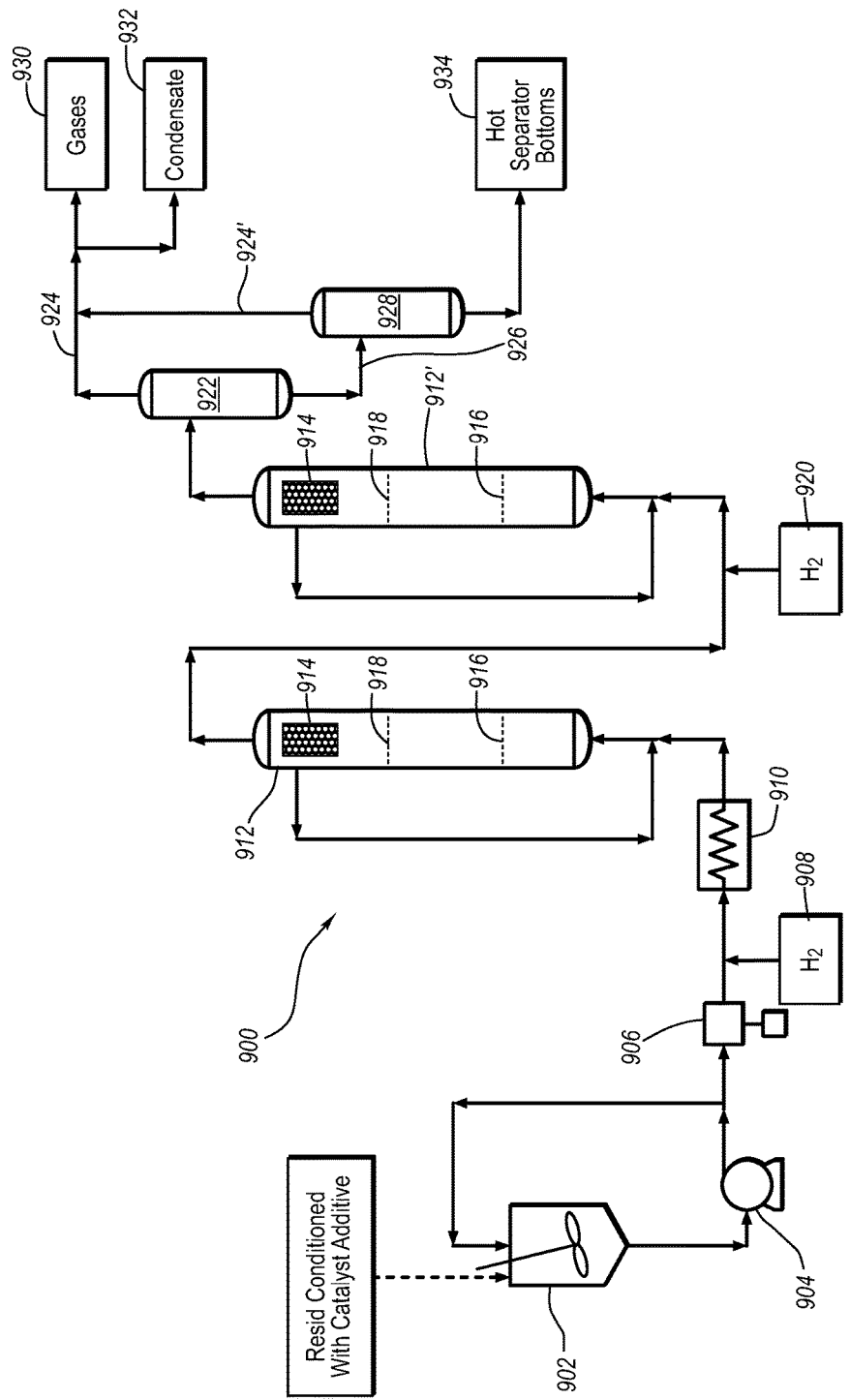
FIG. 10 is a schematic diagram of a pilot slurry phase/ebullated bed hydroprocessing system used to compare a colloidal or molecular catalyst according to the invention and a conventional ebullated bed catalyst.

A heavy oil feedstock comprising Athabasca vacuum tower bottoms (which included 21 wt. % of pentane insoluble asphaltenes) from the Syncrude Canada Ltd. plant in Alberta, Canada, with 150 ppm of a molybdenum sulfide catalyst in colloidal or molecular form was introduced into a pilot plant similar to the one shown in FIG. 10 having two gas-liquid slurry phase reactors connected in series. Each reactor had a volume of 2200 ml. The first reactor was heated to a weighted averaged temperature below 370° C. (698° F.), and the second reactor was heated to a weighted averaged temperature between 419-445° C. (786-833° F.) and liquid hourly space velocity between 0.41 and 0.7/hr. The results of this test showed that the concentration of the asphaltene in the residual resid at 75% conversion was also 21 wt. %, which was identical to that in the original feedstock, thereby further confirming the ability of the colloidal or molecular catalyst to convert the asphaltene fraction at the same rate as the resid material as a whole.

Example 3

This example tested the ability of a colloidal or molecular catalyst utilized in a slurry phase reactor according to the invention to convert various resid materials and their asphaltene and sulfur fractions at high conversion rates. The pilot plant used in this example was the same slurry phase, tubular reactor described in Example 1. In each test, the heavy oil feedstock was thoroughly mixed with up to 250 parts per million of the catalyst precursor over a prolonged period of time before being introduced to the reactor. The reactor temperature was maintained between 430-450° C. to control the conversion level. The reactor pressure was 2000 psig and the hydrogen treat rate was 5000 standard cubic feet per barrel of heavy oil. The results of this test are set forth in Table I below:

TABLE I

| | Feedstock | | | |
|---|---|---|---|---|
| | Athabasca Bitumen | Cold Lake Bottoms | Maya/ Isthmus Blend | Chinese Paraffinic Bottoms Blend |
| 975° F. + resid conversion, wt % | 94 | 94 | 63 | 95 |
| Asphaltene ($C_5$ Ins.) conversion wt % | 95 | 93 | 67 | 96 |
| Sulfur conversion wt % | 78 | 78 | 56 | 92 |

This test confirms that a colloidal or molecular catalyst utilized in a slurry phase reactor according to the invention was able to convert the asphaltene fraction at essentially the same rate as the overall resid conversion rate, even at very high overall conversion rates. This demonstrates the superiority of the hydroprocessing methods and systems disclosed herein compared to conventional fixed bed systems, which cannot be operated at conversion levels higher than about 25% when processing reside feedstocks having a significant asphaltene fraction, and conventional ebullated bed systems, which convert asphaltenes at substantially lower conversion levels compared to overall resid conversion, particular at high resid conversion levels. This shows that the methods and systems of the invention satisfy a long-felt need in the art that has not been solved using convention hydroprocessing systems (i.e., being able to convert high asphaltene-containing feedstocks at high conversion levels while also converting the asphaltene fraction at the same conversion level). It is also a surprising and unexpected result given the fact that conventional supported catalysts in existence and used for decades cannot convert the asphaltene and overall resid fractions at the same rate, particularly at high overall conversion levels.

Example 4

This example utilized the pilot plant shown in FIG. 10, which included two ebullated bed reactors connected in series and which was used to compare the difference between using a porous supported ebullated bed catalyst ("EB catalyst") by itself when processing a heavy oil feedstock containing asphaltenes and the EB catalyst in combination with a colloidal or molecular molybdenum disulfide catalyst. A currently-operating commercial ebullated bed unit was simulated in this pilot test. The feedstock for this test was a vacuum tower bottoms generated from a Russian crude in an operating commercial plant, and the EB catalyst was taken from inventory at the same commercial plant. The vacuum tower bottoms contained 90 wt. % of material with a boiling point of 525° C.+ (i.e., greater than or equal to 525° C.). The comparative experiments were carried out at reaction temperature between 418-435° C. to control the conversion level, a space velocity of 0.26 per hour, a hydrogen feed rate of 4500 standard cubic feet per barrel of heavy oil, and a pressure of 2100 psig.

The results of this comparative study are graphically depicted in FIGS. 11-14. The comparative study demonstrated the ability of the colloidal or molecular catalyst to convert asphaltenes to lower boiling materials while also prolonging the useful lifespan of the porous supported catalyst.

The first run (Run "A") was a base-line test simulating the current commercial unit operation with the EB catalyst, but without the colloidal or molecular catalyst. To simulate real commercial conditions, a mixture of one-third fresh EB catalyst and ⅔ equilibrium EB catalyst taken from the commercial plant was used. The test unit was operated for 5 days at approximately 50 wt % residuum (b.p.≥524° C.) conversion, and then for 4 days at 58-60 wt % conversion. At the end of the 9-day period, the test had to be shut down because of a significant increase in pressure across the second reactor schematically shown in FIG. 10. At the end of the run, the reactors were opened, the EB catalyst was unloaded, and the reactor walls and all accessories were inspected. Samples were taken and analyzed.

The second test (Run "B") was a duplication of Run "A", using an identical catalyst charge (i.e., a mixture of fresh and equilibrium EB catalyst), but with the feedstock conditioned with 25 to 100 ppm of a colloidal or molecular molybdenum sulfide catalyst (i.e., 50 ppm from 0-120 hours; 100 ppm from 120-195 hours; 100 ppm from 195-270 hours; 50 ppm from 270-340 hours, and 25 ppm beyond 340 hours). After operating for 8 days at the same conditions as Run "A", conversion was increased to 70% and was held at that level for 3 days. The residuum conversion level was then reduced back to 60% and held for 5 days to confirm the reproducibility of the test results. Run "B" was then terminated at the end of this time, with the observation that the unit was fully operable with no noticeable change in pressure drop across the second reactor shown in FIG. 10, even after 16 days on-stream. As in the first test, the reactors were opened and inspected after shutdown.

Figure 11:
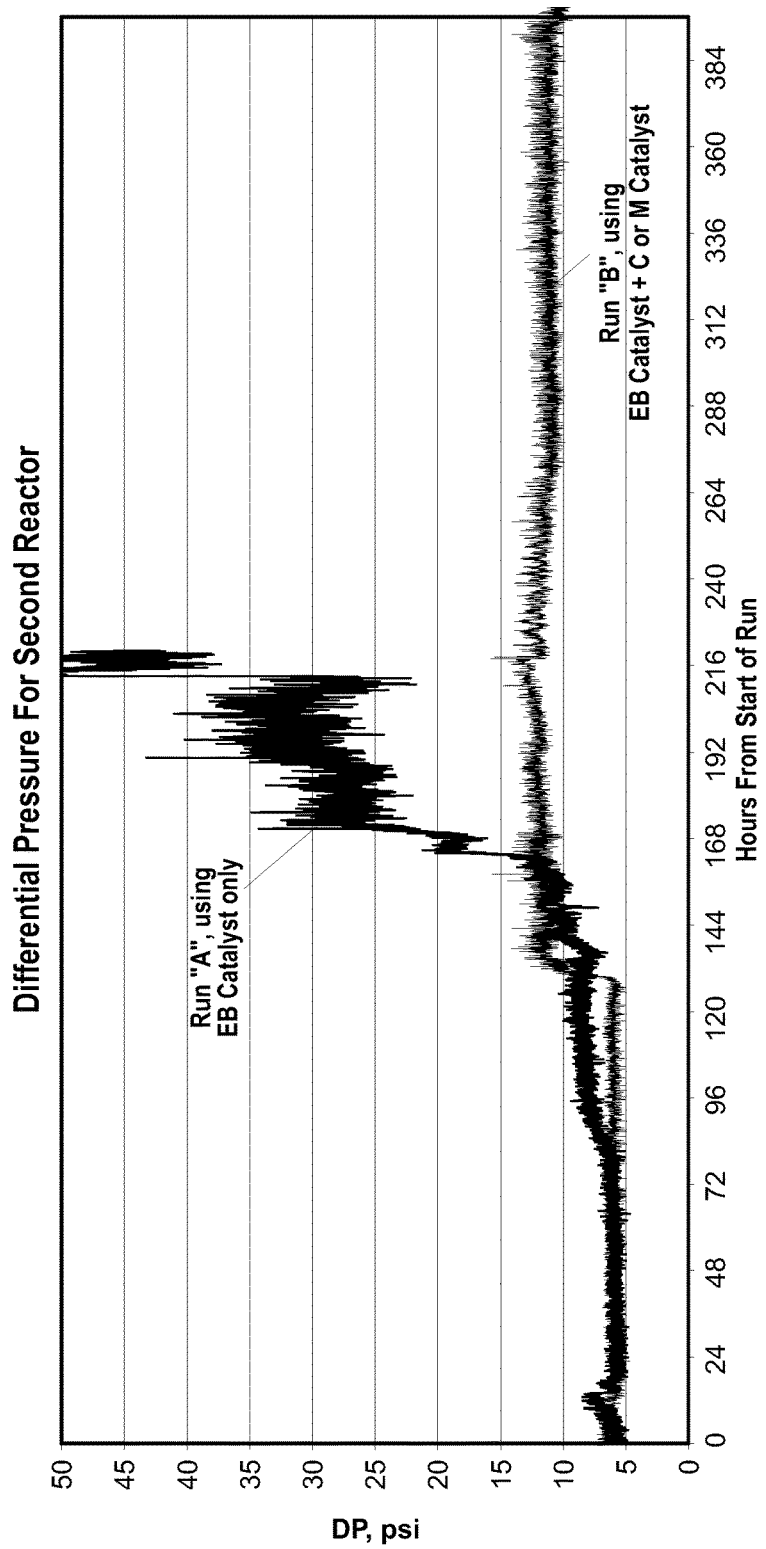
FIG. 11 is a chart comparing increases in pressure drop across the second pilot ebullated bed reactor over time for test runs using either a porous supported catalyst by itself or in combination with a colloidal or molecular catalyst.

The pressure drop across the second reactor that caused the shutdown of Run "A", but which did not occur in Run "B", is graphically depicted in the chart of FIG. 11. As shown in FIG. 11, Run "A" lasted a little over approximately 220 hours before it was halted due to a dramatic increase in pressure drop across the second reactor resulting from deposition of sediment in the reactor (i.e., equipment fouling). A post-run inspection showed significant fouling of the screen at the reactor liquid recycle cup of the second reactor, which caused the increase in pressure drop between the reactor inlet and outlet. On the other hand, Run "B" lasted about 400 hours and was only halted because all the relevant data had been obtained, not because of any equipment fouling or pressure increase across the second reactor. A post-run inspection showed minimal fouling of the screen at the reactor liquid recycle cup in the second reactor, thus preventing, or at least minimizing, the type of differential pressure increase that occurred in Run "A".

Figure 12:
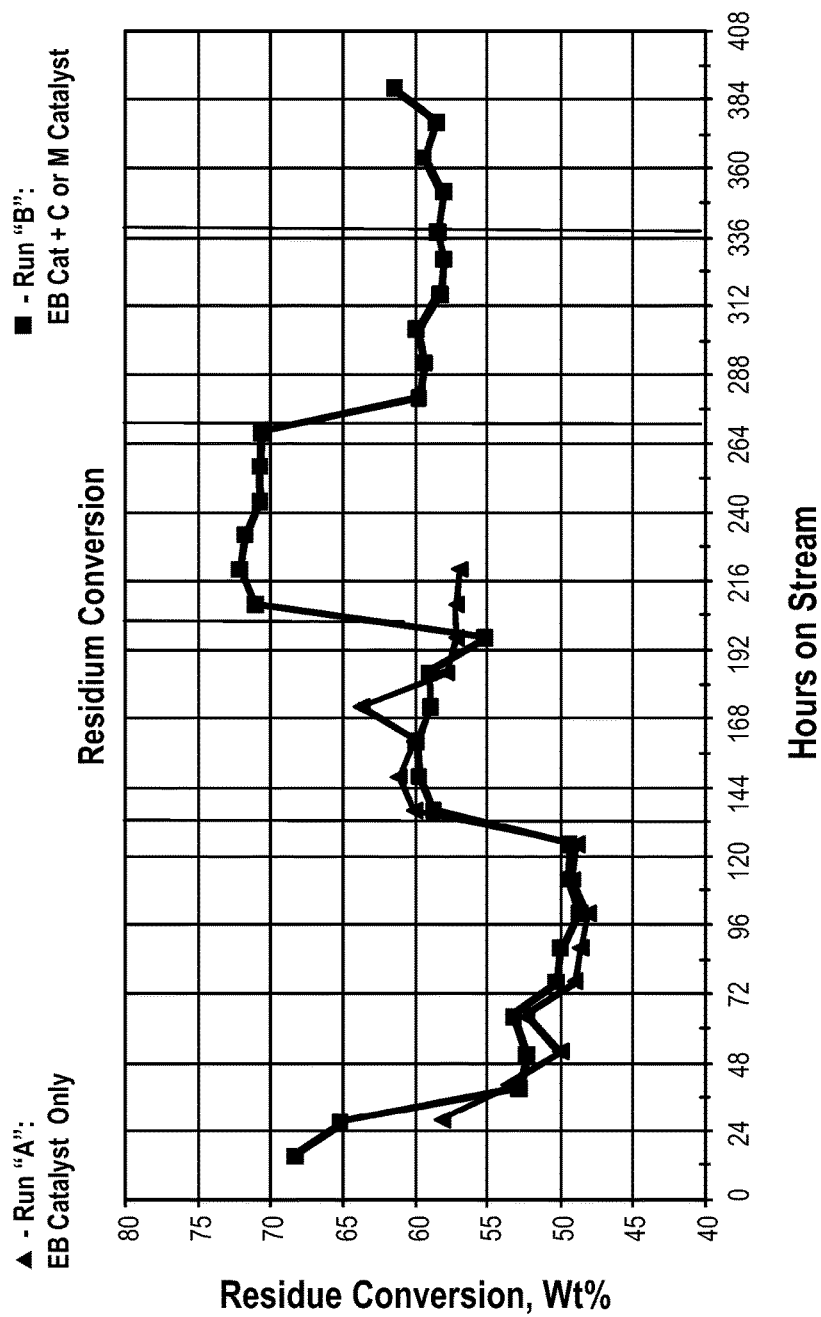
FIG. 12 is a chart depicting resid conversion at various hours on stream for test runs using either a porous supported catalyst by itself or in combination with a colloidal or molecular catalyst.

The chart shown in FIG. 12 plots resid conversion versus hours on-stream. For the first 9 days, the two test runs tracked each other very well. Only Run "B" was able to continue more than 9 days, however, as described above. As shown in FIG. 12, when the percent conversion was maintained at approximately the same level for both test runs, Run "B" had a substantially higher percent conversion of the resid fraction. This demonstrated that the colloidal or molecular catalyst assisted the EB catalyst in converting the vacuum tower residuum material to lower boiling materials.

Figure 13:
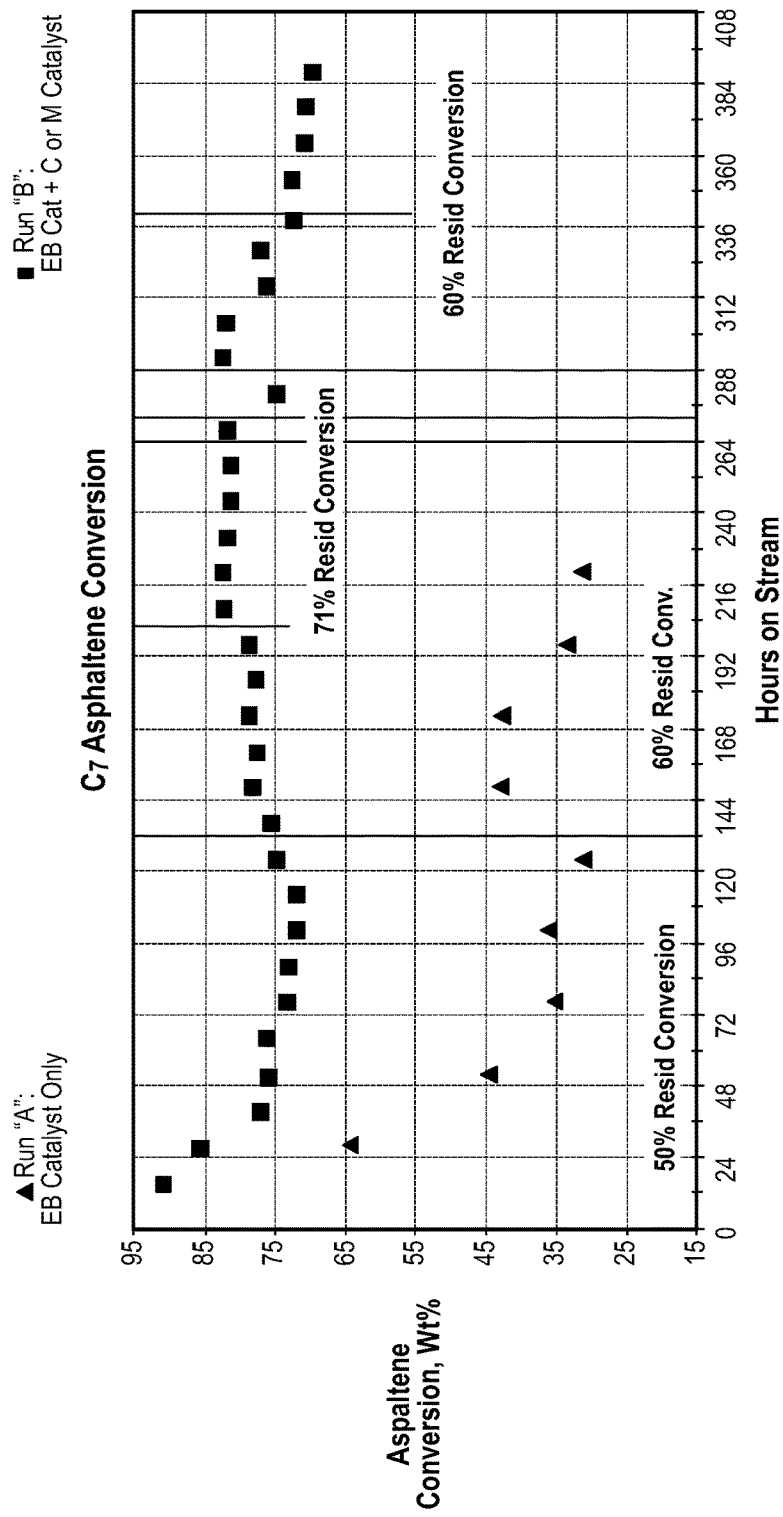
FIG. 13 is a chart comparing asphaltene conversion at various hours on stream for test runs using either a porous supporting catalyst by itself or in combination with a colloidal or molecular catalyst.

The chart depicted in FIG. 13 shows asphaltene conversion (defined in terms of heptane insolubles) versus time on-stream at various resid conversion levels. Run "B", using the colloidal or molecular catalyst and EB catalyst, achieved approximately twice the asphaltene conversion as in Run "A", using the EB catalyst alone. This significant improvement in asphaltene conversion is directly attributable to the use of the colloidal or molecular catalyst because, otherwise, the two test runs were identical. This test confirms the results of Example 1, which demonstrated that a colloidal or molecular catalyst is much better able to convert asphaltenes in a heavy oil feedstock than a porous supported catalyst.

Figure 14:
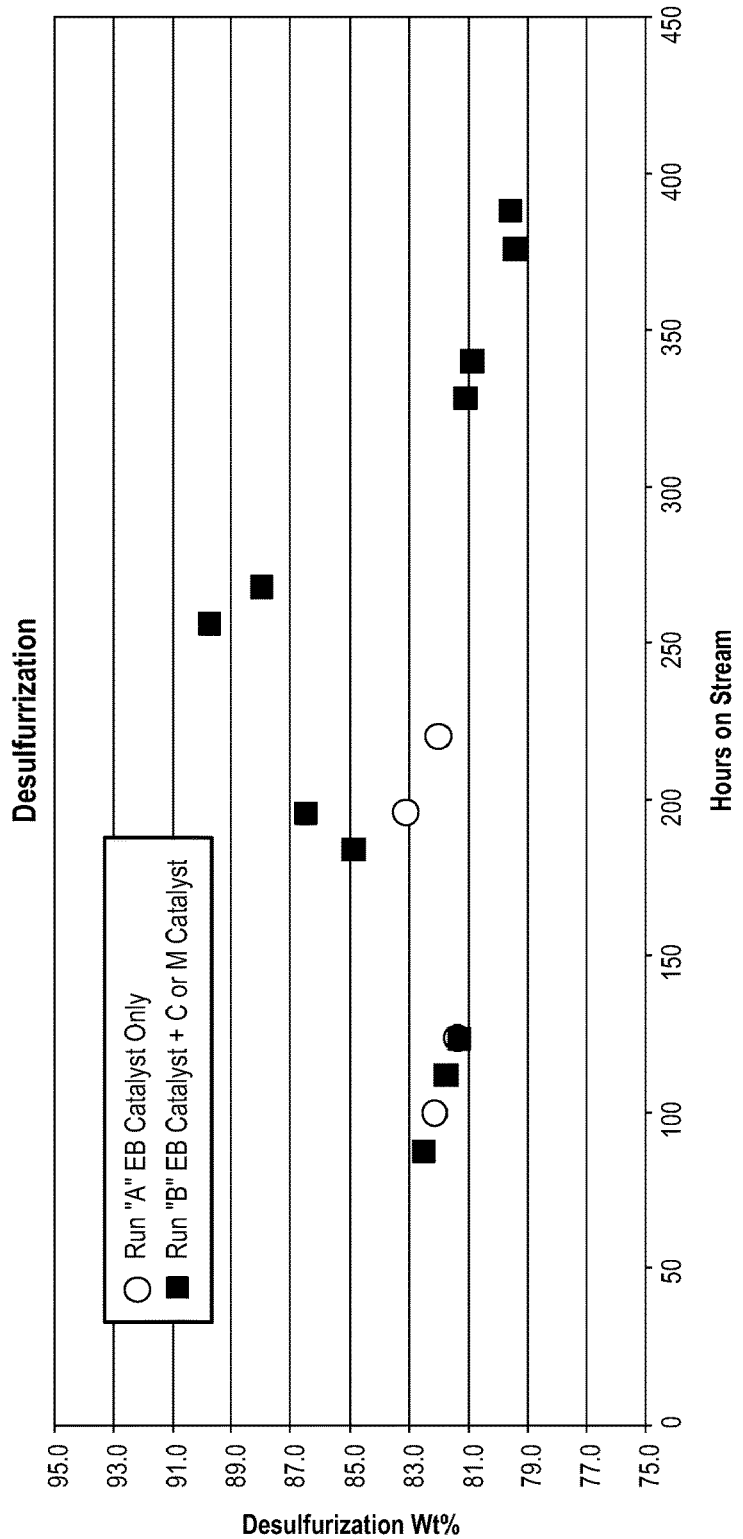
FIG. 14 is a chart comparing desulfurization at various hours on stream for test runs using either a porous supported catalyst by itself or in combination with a colloidal or molecular catalyst.

The chart depicted in FIG. 14 plots percent desulfurization of the residuum as a function of time comparing Run "A" using just the EB catalyst and Run "B" using both the EB catalyst and the colloidal or molecular catalyst.

Table II below summarizes the test data on sediment formation as determined by the IP 375 Method.

TABLE II

IMPACT OF COLLOIDAL OR MOLECULAR CATALYST ON SEDIMENT FORMATION AND FOULING

| | Residuum conversion wt. % | | | |
|---|---|---|---|---|
| | 50 | 60 | 71 | 60 |
| Time On-Stream hours | 0 to 132 | 133 to 220 | 204 to 272 | 272 to 400 |
| RUN "A": Sediment wt. % (EB catalyst only) | 0.12-0.22 | 0.59-0.86 | N/A | N/A |
| RUN "B": Sediment wt. % (EB catalyst + C or M catalyst) | 0.06-0.15 | 0.32-0.36 | 0.72-1.06 | 0.23-0.35 |

Run A operated for 220 hours but had to be stopped when the differential pressure in the second reactor increased significantly. No data was generated after 220 hours. A post-run inspection showed significantly fouling on the screen of the reactor liquid recycle cup. Run B operated for 400 hours with very little change in reactor differential pressure. Inspection showed the screen at the reactor liquid recycle cup to be clean with minimal fouling.

The sediment formation values for Run "B" were about half of those from Run "A" during the comparative time periods and reaction conditions. For Run "B", when conversion was reduced from 71% to 60% in the last 5 days, sediment values returned to the same range as in the initial 60% conversion, despite any additional EB catalyst deactivation that may have occurred when operating the reactor at 71% conversion. Because sediment was significantly reduced when the colloidal or molecular catalyst was used, the pilot plant unit proved to be less prone to fouling and plugging than when just the conventional EB catalyst was used, as evidenced by the lower pressure drop across the reactor. It can be extrapolated that the same benefits of using the colloidal or molecular catalyst would apply in commercial-scale operations. That is, reduced sediment formation would be expected to lead to less fouling of the equipment and solid supported catalyst which, in turn, would result in longer unit operation and less maintenance when the colloidal or molecular catalyst is used in addition to, or in combination with, the EB catalyst.

In summary, the colloidal or molecular catalyst consistently increased the asphaltene conversion in parallel with the resid conversion and reduced sediment formation. These results demonstrate that the colloidal or molecular catalyst significantly increased hydrogen transfer outside the supported catalyst, capped the free radicals, and minimized combination reactions involving free radicals, as reflected in the reduction of sediment at all levels of resid conversion. Reducing sediment formation reduces rate of deactivation of the supported catalyst. The supported catalyst is therefore able to continue to perform its catalytic function of removing sulfur and transferring hydrogen, resulting in higher API gravity products.

Example 5

A test was conducted using the pilot plant describes in FIG. 10, except that the first and second reactors were operated in a slurry phase hydroprocessing system comprising a slurry phase reactor that utilized 125 parts per million of a colloidal or molecular molybdenum disulfide catalyst. (The reactors operated as "slurry phase" reactors in this test rather than ebullated bed reactors because they utilized no porous supported ebullated bed catalyst). The pilot plant operated at 1500 psig of hydrogen pressure, with the conditioned Athabasca resid being fed at a space velocity of 0.7 per hour, a hydrogen treat rate at 4500 standard cubic feet per barrel of resid, within the first reactor being maintained at less than 370° C. and the second reactor being maintained at 441° C. The liquid product was collected and fed into a simulated guard bed reactor packed with a demetalizing catalyst.

The purpose of this test was to determine whether a slurry phase reactor employing a colloidal or molecular molybdenum disulfide catalyst could be used to preliminarily convert resid and asphaltene fractions, as well as metals contained therein to metal sulfides, followed by removing any metal sulfides, including the colloidal or molecular molybdenum disulfide catalyst by the guard bed. This would allow a fixed bed reactor to subsequently carry out desulfurization and denitrogenation of the preliminarily converted feedstock without the risk of plugging the hydrotreating catalyst by metals originally in the feedstock and/or from the added colloidal or molecular molybdenum disulfide catalyst.

In this study, a catalyst precursor composition comprising molybdenum 2-ethylhexanoate (15% molybdenum by weight) was first diluted down to about 1% by weight molybdenum metal using Number 2 fuel oil (heavy diesel). This diluted precursor composition was intimately mixed with Athabasca vacuum tower bottoms to yield a conditioned feedstock, which was heated to 400° C. (752° F.) in a feed heater to form the colloidal or molecular molybdenum disulfide catalyst and then hydrocracked at 440° C. (824° F.) in a pilot gas-liquid slurry phase back-mixed reactor.

The second reactor shown in FIG. 10 had an effective volume of 2,239 ml, a height of 4.27 meters, and an internal diameter of 2.95 cm. The pilot reactor had an external recycle pump to circulate the reactor liquid from the top of the reactor back to the reactor entrance by means of an external loop. Circulating the reactor liquid enabled rapid dissipation of heat generated by hydroprocessing reactions and maintenance of a homogeneous reactor liquid temperature profile. At the reactor entrance, fresh feedstock and hydrogen were joined with the recycled reactor liquid, which then underwent hydrocracking reactions.

Effluent taken from the reactor was introduced into a hot separator, which separated the effluent into a hot vapor and gaseous stream, which was removed from the top, and a liquid product stream, which was removed from the bottom. After cooling and pressure reduction through subsequent downstream separators, the hydrocracked products were collected as light condensates, bottom liquid, product gas, and dissolved gas. The light condensate and bottom liquid were combined as total liquid and fed to the guard bed reactor packed with a commercial demetalization catalyst supplied by WR Grace.

140 grams of demetalization catalyst were utilized within the guard bed unit. The feed rate was 124 g/hr of hydrocracked product from the slurry phase reactor. Operating conditions were 380° C. (716° F.) at 2,000 psi. The hydrogen flow rate was 300 SCF/bbl (standard cubic feet per barrel—42 gallons of liquid feed). The metal analysis of the hydrocracked product from the pilot slurry phase reactor are shown in Table III as follows:

TABLE III

| Metal | Concentration (Weight Part Per Million (WPPM)) |
|---|---|
| Nickel | 94 |
| Vanadium | 260 |
| Molybdenum | 134 |

The metal analysis after the product was demetalized using the guard bed demetalization catalyst is shown in Table IV as follows:

TABLE IV

| Metal | WPPM | Wt % Removed |
|---|---|---|
| Nickel | 4 | 95.7 |
| Vanadium | 5 | 98.1 |
| Molybdenum | 4 | 97.0 |

As plainly shown, fixed bed demetalization resulted in the removal of the vast majority of metals from the upgraded feedstock formed using the colloidal or molecular catalyst within the pilot slurry phase reactor. This shows that preliminary upgrading of a heavy oil feedstock using a colloidal or molecular catalyst can be successfully carried out in order to (i) upgrade asphaltenes and other higher boiling resid hydrocarbons and (ii) convert metals into a form that facilitates their removal by guard bed demetalization so as to prevent fouling of a downstream fixed bed hydrotreating reactor used for desulfurization and denitrogenation. The demetalization catalyst removed both the colloidal or molecular molybdenum disulfide catalyst and the nickel and vanadium fraction found in the feedstock at about the same rate, thereby demonstrating that the colloidal or molecular catalyst could be removed using the same demetalization process typically used to remove metal contaminants from a feedstock. In view of this, one of skill in the art would expect that preliminary upgrading of a heavy oil feedstock rich in asphaltenes can be carried out upstream of a fixed bed hydroprocessing reactor using a colloidal or molecular catalyst, e.g., in one or more of a slurry phase reactor or an ebullated bed reactor, followed by demetalization in a guard bed, in order to eliminate or greatly reduce fouling of a downstream hydrotreating fixed bed reactor by asphaltenes and/or metals found in the feedstock.

Example 6

A pilot plant with two ebullated bed reactors connected in series was used to compare the difference between using a porous supported ebullated bed catalyst ("EB catalyst") by itself when processing a heavy oil feedstock containing asphaltenes and the EB catalyst in combination with a colloidal or molecular molybdenum disulfide catalyst. The pilot plant 900 for this test is schematically depicted in FIG. 10, and included a high shear mixing vessel 902 used to blend molybdenum 2-ethylhexanoate (15% molybdenum by weight of the catalyst precursor composition) into the feedstock to form a conditioned feedstock. The feedstock for this test was 95% Athabasca resid and 5% decant oil from an operating commercial plant, and the EB catalyst was taken from inventory at the same commercial plant. The conditioned feedstock was circulated out and back into the mixing vessel 902 by a pump 904. A high precision metering piston pump 906 drew the conditioned feedstock from the loop and pressurized it to the reactor pressure. Thereafter, hydrogen 908 was fed into the pressurized feedstock and the resulting mixture passed through a pre-heater 910 prior to being introduced into the first of two pilot slurry phase/ebullated bed reactors 912.

Each of reactors 912, 912' had an interior volume of 2200 ml and included a porous supported catalyst and a mesh wire guard 914 to keep the supported catalyst within the reactor. The settled height of catalyst in each reactor is indicated by a lower dotted line 916, and the expanded catalyst bed during use is indicated by an upper dotted line 918. The first reactor was loaded with equilibrium catalyst from the second of two LC-Fining reactors in series, while the second reactor was loaded with ⅓ fresh catalyst and ⅔ equilibrium catalyst from the LC-Fining reactor. The reactors 912, 912' were operated at a space velocity of 0.28 reactor volume per hour with 2100 psig back pressure. The rate of hydrogen feed was 4500 scf/barrel, with 60% being introduced into the first reactor 912 and 40% being added as supplemental hydrogen 920 to the material being transferred from the first reactor 912 to the second reactor 912'.

During use, either the feedstock only (in the case of Run "A" using an ebullated bed catalyst only) or the feedstock and colloidal or molecular catalyst (in the case of Run "B" using an ebullated bed catalyst and the colloidal or molecular catalyst) were continuous recycled from the top of each reactor to the bottom of the reactor in a manner similar to an actual commercial ebullated bed reactor as it was being upgraded. Upgraded feedstock from the first reactor 912 was transferred together with supplemental hydrogen into the second reactor 912' for further hydroprocessing. The further upgraded material from the second reactor 912' was introduced into a first hot separator 922 to separate gases and vapors 924 from a liquid fraction. The liquid 926 from the first hot separator was introduced into a second hot separator 928 to remove additional gases and vapors 924', which were blended with those from the first hot separator 922 and then separated into gases 930 and condensate 932. The hot separator bottoms 934 were removed from the second hot separator 928.

The first run (Run "A") was a base-line test simulating the current commercial unit operation with the EB catalyst, but without the colloidal or molecular catalyst. The second test (Run "B") was a duplication of Run "A", using an identical catalyst charge (i.e., a mixture of fresh and equilibrium EB catalyst), but with the feedstock conditioned with 50 parts per million of a molybdenum sulfide colloidal or molecular catalyst. For each run, the test unit was operated for 5 days at a reactor temperature of 425° C., followed by 4 days at a temperature of 432-434° C., and then 1 day at 440° C. Samples were taken from the hot separator bottoms at the end of each 24-hour period and tested.

The results of this comparative study are graphically depicted in FIGS. 15-22. The comparative study demonstrated the ability of the colloidal or molecular catalyst to convert asphaltenes to lower boiling materials while also reducing the formation of sediment in the reactors. It further confirmed the results of the examples above showing that the asphaltene fraction can be converted at the same rate as the overall resid material.

Figure 15:
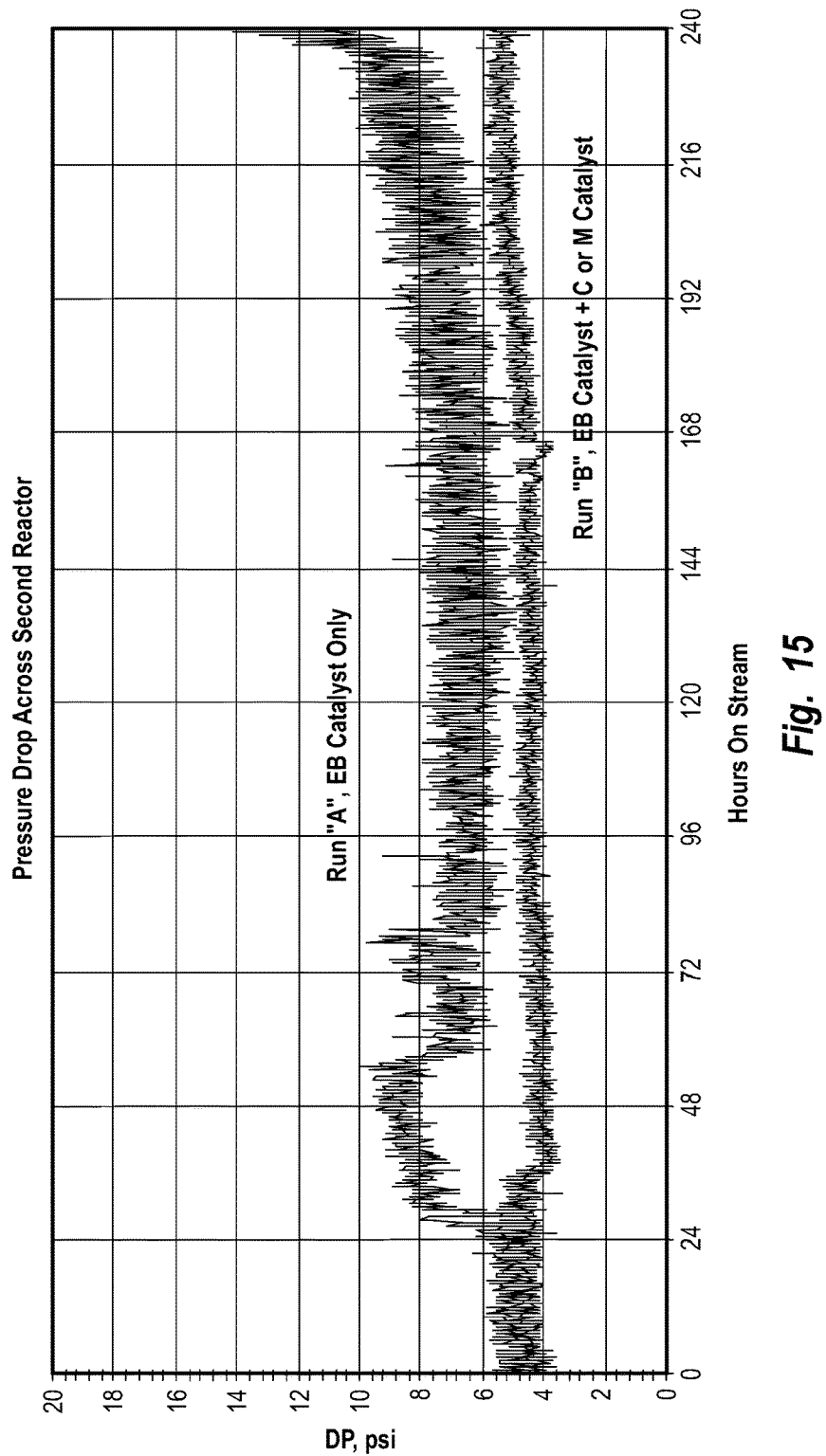
FIG. 15 is a chart comparing increases in pressure drop across the second pilot ebullated bed reactor over time for test runs using either a porous supported catalyst by itself or in combination with a colloidal or molecular catalyst.
Figure 16:
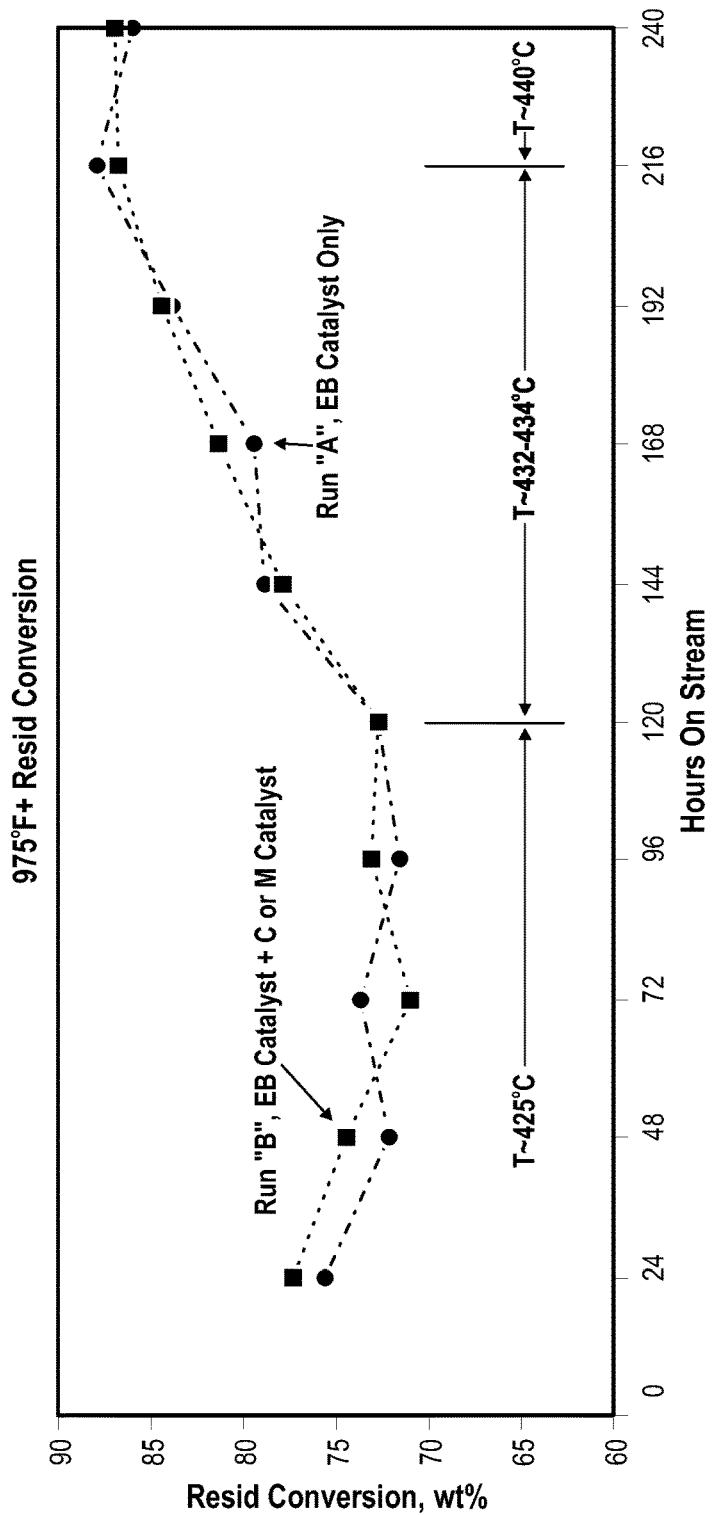
FIG. 16 is a chart comparing resid conversion at various hours on stream for test runs using either a porous supported catalyst by itself or in combination with the colloidal or molecular catalyst.

The chart shown in FIG. 15 plots the pressure drop across the second reactor for each of Runs "A" and "B" throughout the duration of the test. The chart shown in FIG. 16 plots resid conversion for Runs "A" and "B" versus hours on stream. Throughout the test, the overall conversion levels for the two types of catalysts were kept about the same. Nevertheless, the chart shown in FIG. 15 shows a greater pressure drop across the second reactor for Run "A" compared to Run "B" throughout the test after the first 24 hours. The greater pressure differential suggests a significantly larger buildup of sediment in the reactors during Run "A" than in Run "B", which is consistent with lower conversion of asphaltenes in Run "A".

Figure 17:
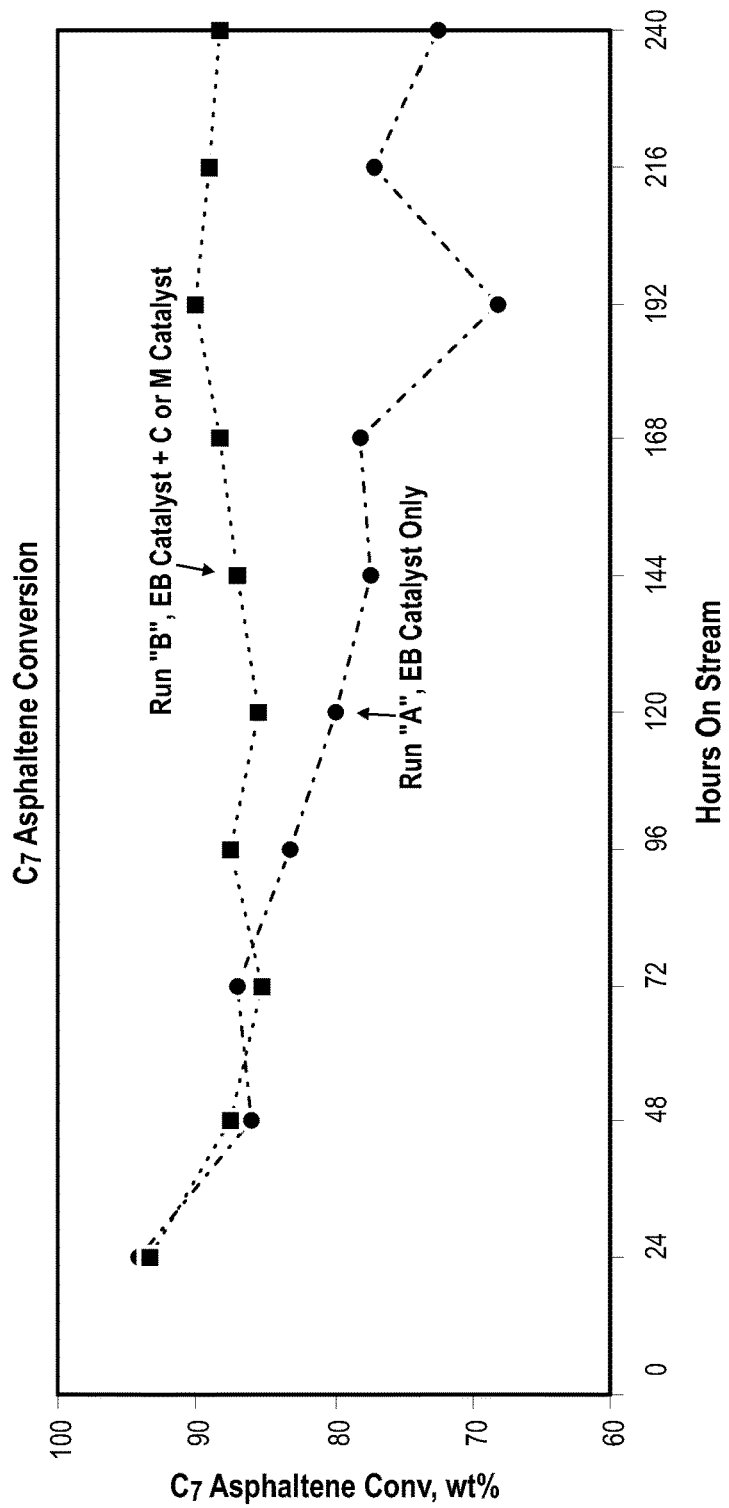
FIG. 17 is a chart comparing $C_7$ asphaltene conversion at various hours on stream for test runs using either a porous supported catalyst by itself or in combination with a colloidal or molecular catalyst.

In fact, the chart depicted in FIG. 17 shows that the asphaltene conversion (defined in terms of heptane ($C_7$) insolubles) versus time on-stream at various resid conversion levels was substantially higher in Run "B" compared to Run "A". The asphaltene conversion levels for each of Runs "A" and "B" started out relative high. Thereafter, the asphaltene conversion for Run "B" remained high (i.e., greater than about 85%, while the asphaltene conversion for Run "A" progressively dropped as the test continued. Moreover, the difference between the asphaltene conversion levels for Runs "A" and "B" progressively widened as the test progressed. This demonstrates that the colloidal or molecular catalyst greatly assisted in converting the asphaltene fraction, particularly over time, compared to using the porous supported catalyst by itself.

Figure 18:
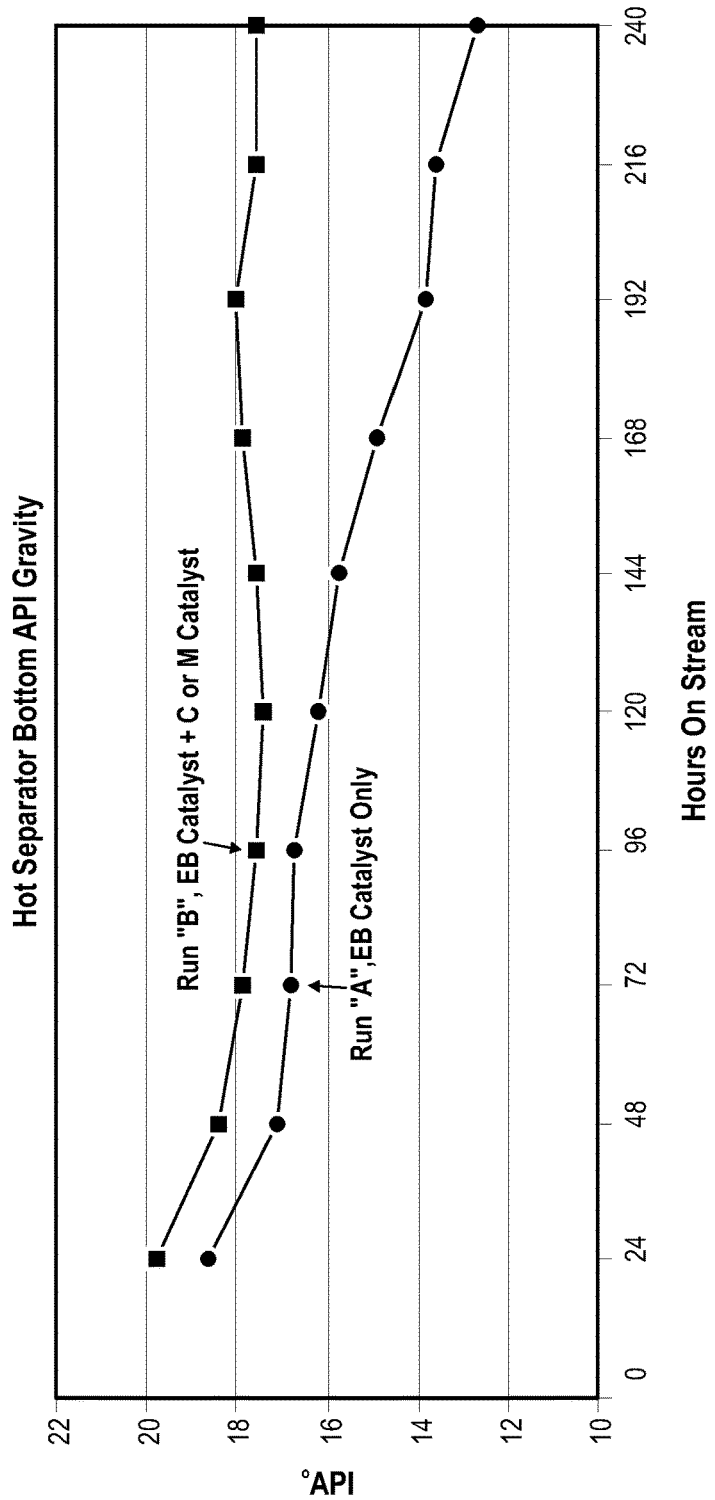
FIG. 18 is a chart comparing hot separator bottom API gravity at various hours on stream for test runs using either a porous supported catalyst by itself or in combination with a colloidal or molecular catalyst.
Figure 19:
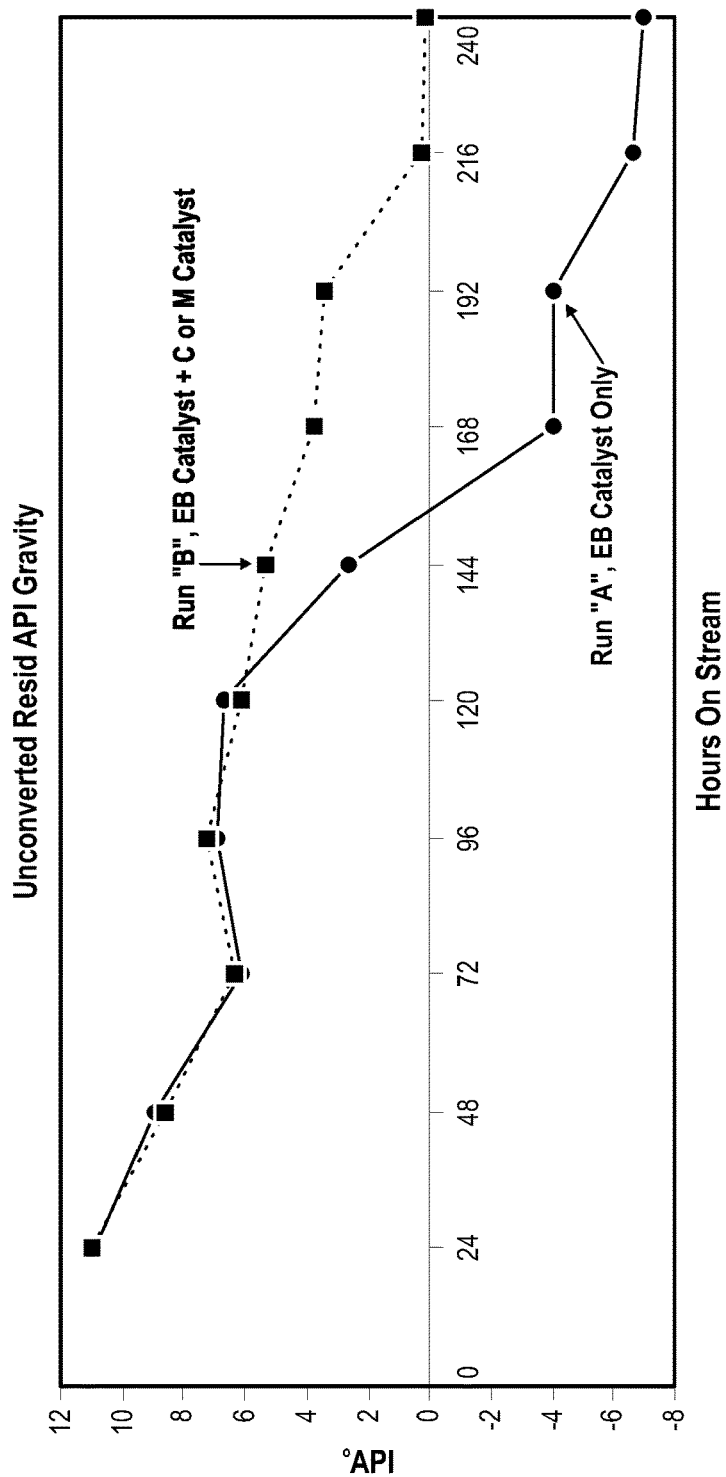
FIG. 19 is a chart comparing unconverted resid API gravity at various hours on stream for test runs using either a porous supported catalyst by itself or in combination with a colloidal or molecular catalyst.

The chart depicted in FIG. 18 plots the API gravity of the hot separator bottoms for Runs "A" and "B". The chart depicted in FIG. 19 plots the unconverted resid API gravity for Runs "A" and "B". The data in both charts are consistent with the overall increase in asphaltene conversion in Run "B" compared to Run "A" and increased hydrogen transfer to the product via the colloidal or molecular catalyst and the less deactivated porous supported catalyst. The reduction in sediment formation slows the deactivation of the supported catalyst, which is clearly demonstrated by the higher API gravity shown in FIGS. 18 and 19. Since API gravity is directly related to quality and hydrogen contents, higher API gravity means higher hydrogen contents and lower absolute specific gravity.

Figure 20:
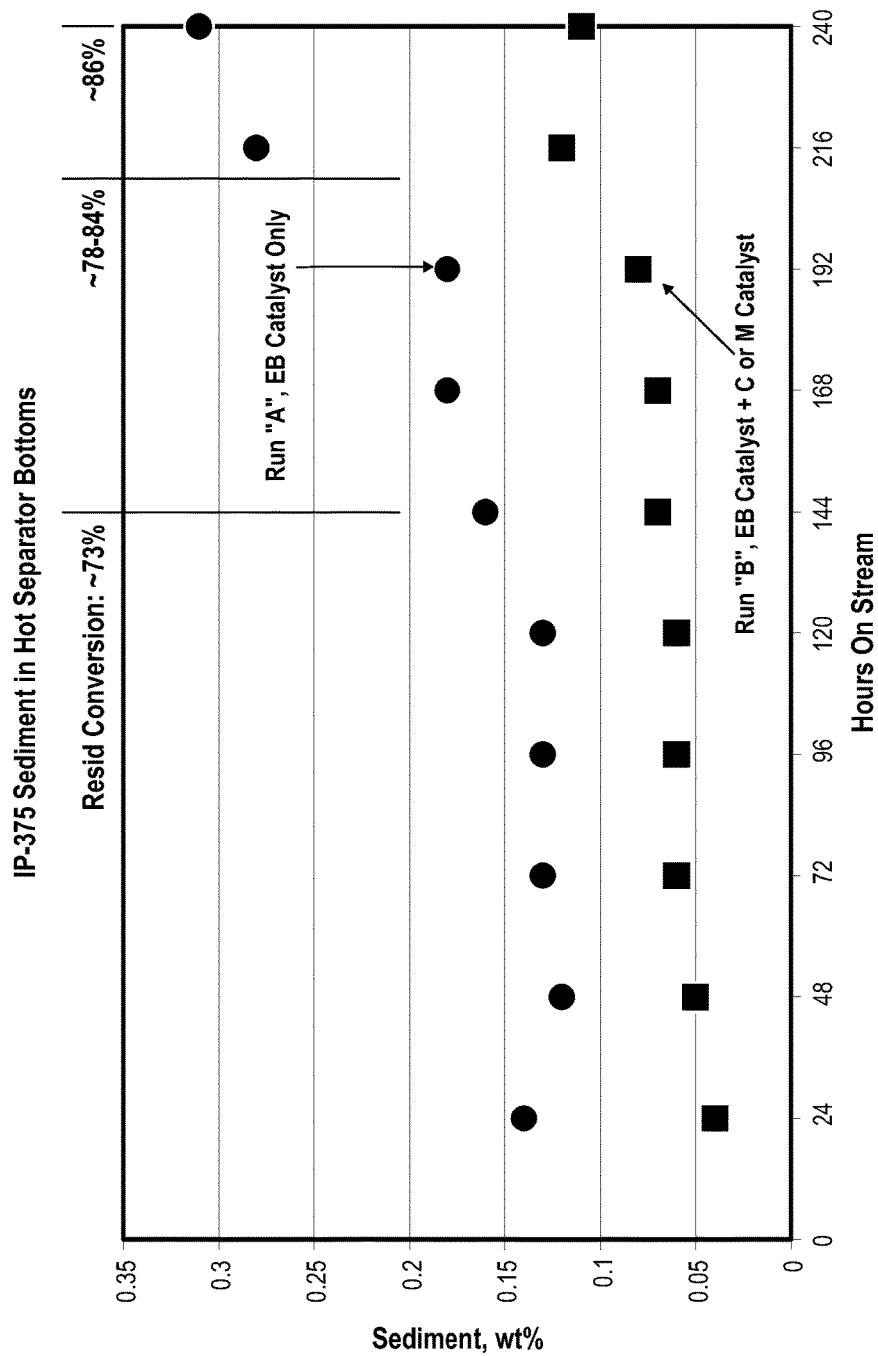
FIG. 20 is a chart comparing IP-375 sediment in hot separator bottoms at various hours on stream for test runs using either a porous supported catalyst by itself or in combination with a colloidal or molecular catalyst.
Figure 21:
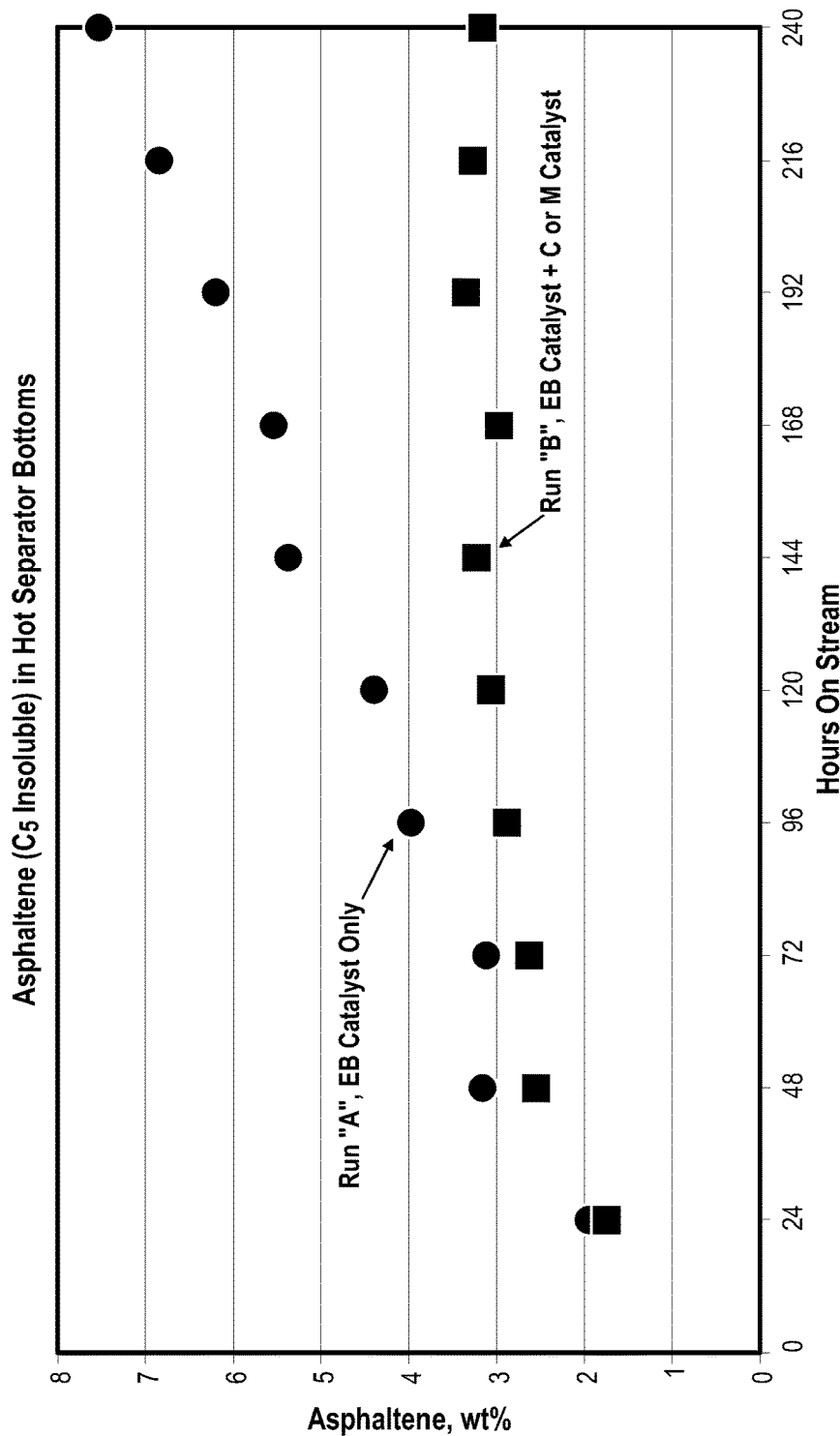
FIG. 21 is a chart comparing the asphaltene concentration in the hot separator bottoms at various hours on stream or test runs using either a porous supported catalyst by itself or in combination with a colloidal or molecular catalyst.

The chart shown in FIG. 20 plots the IP-375 sediment found in the hot separator bottoms for each of Runs "A" and "B". The chart depicted in FIG. 21 plots the percentage of asphaltenes found in the hot separator bottoms for each of Runs "A" and "B". The 2-3 fold increase in sediment found in the hot separator bottoms produced in Run "A" compared to Run "B" is consistent with the greater concentration of asphaltenes found in the hot separator bottoms from Run "A". Moreover, while the concentration of asphaltenes found in the hot separator bottoms from Run "B" remained substantially constant throughout the test, the asphaltenes found in the hot separator bottoms from Run "A" progressively increased over time. This shows that using the colloidal or molecular catalyst would be expected to greatly assist in maintaining steadier levels of asphaltenes in the processed feedstocks, with an attendant reduction in sediment formation compared to using a porous supported catalyst by itself.

Figure 22:
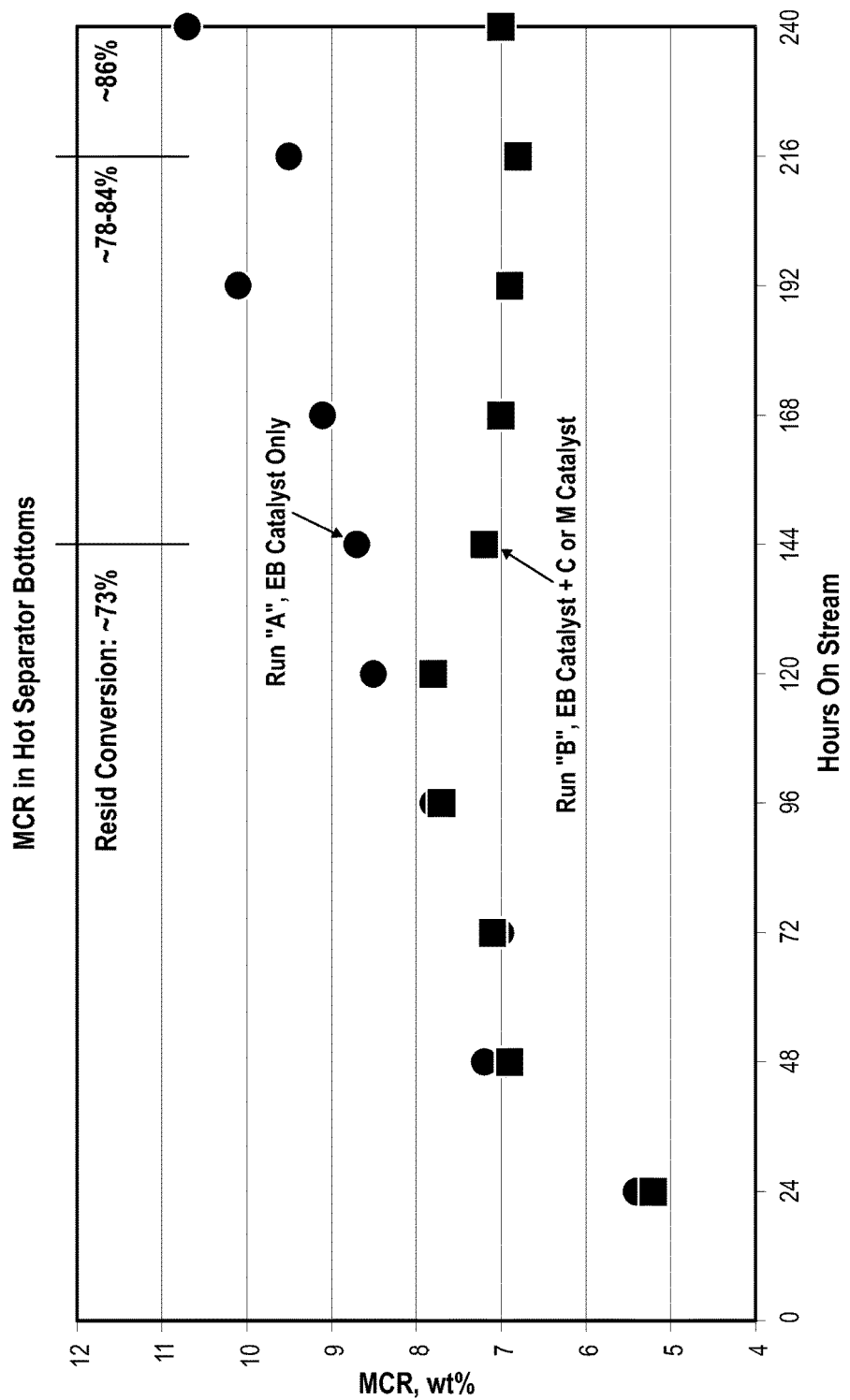
FIG. 22 is a chart comparing the MCR in hot separator bottoms at various hours on stream for test runs using either a porous supported catalyst by itself or in combination with a colloidal or molecular catalyst.
Figure 2A:
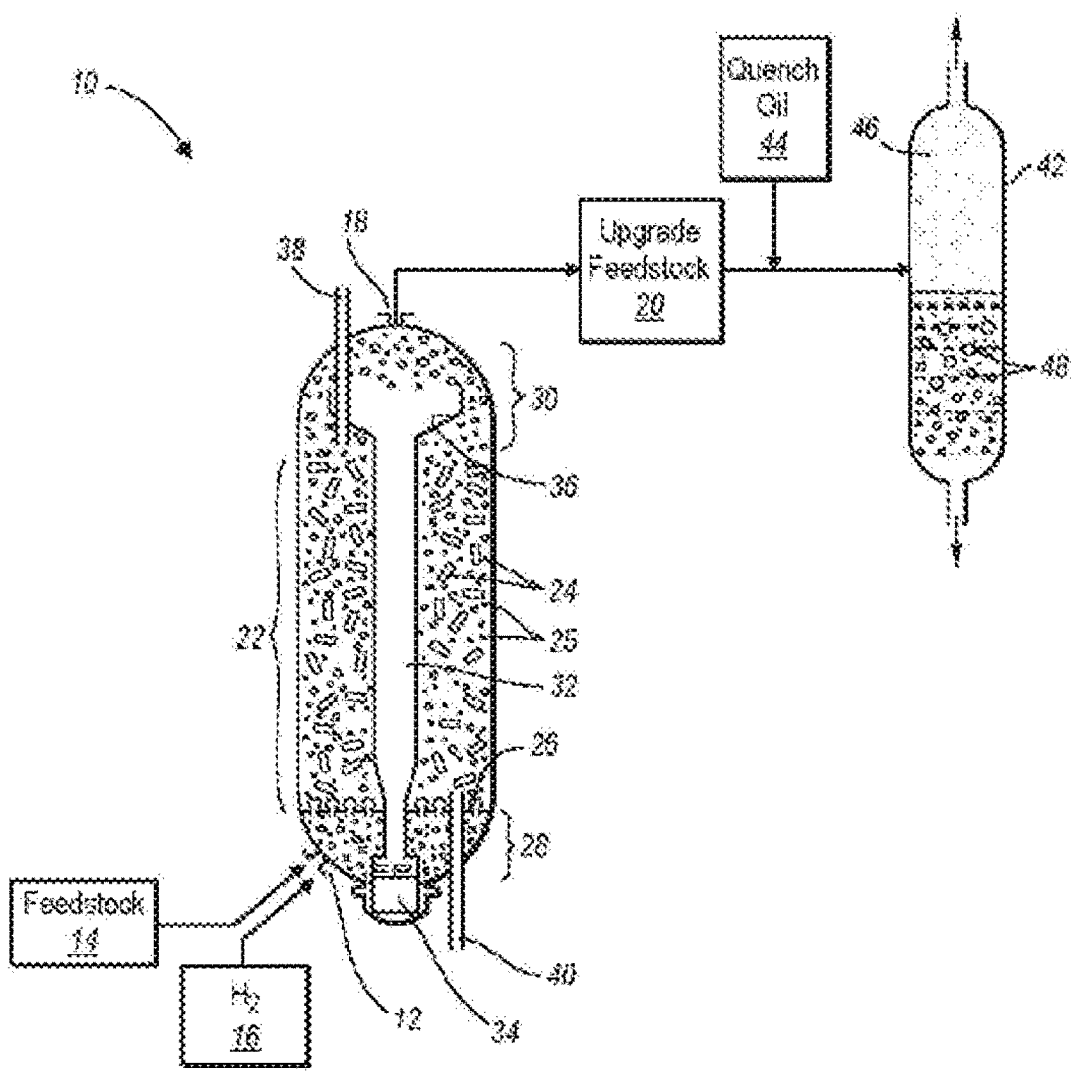
Figure 2B:
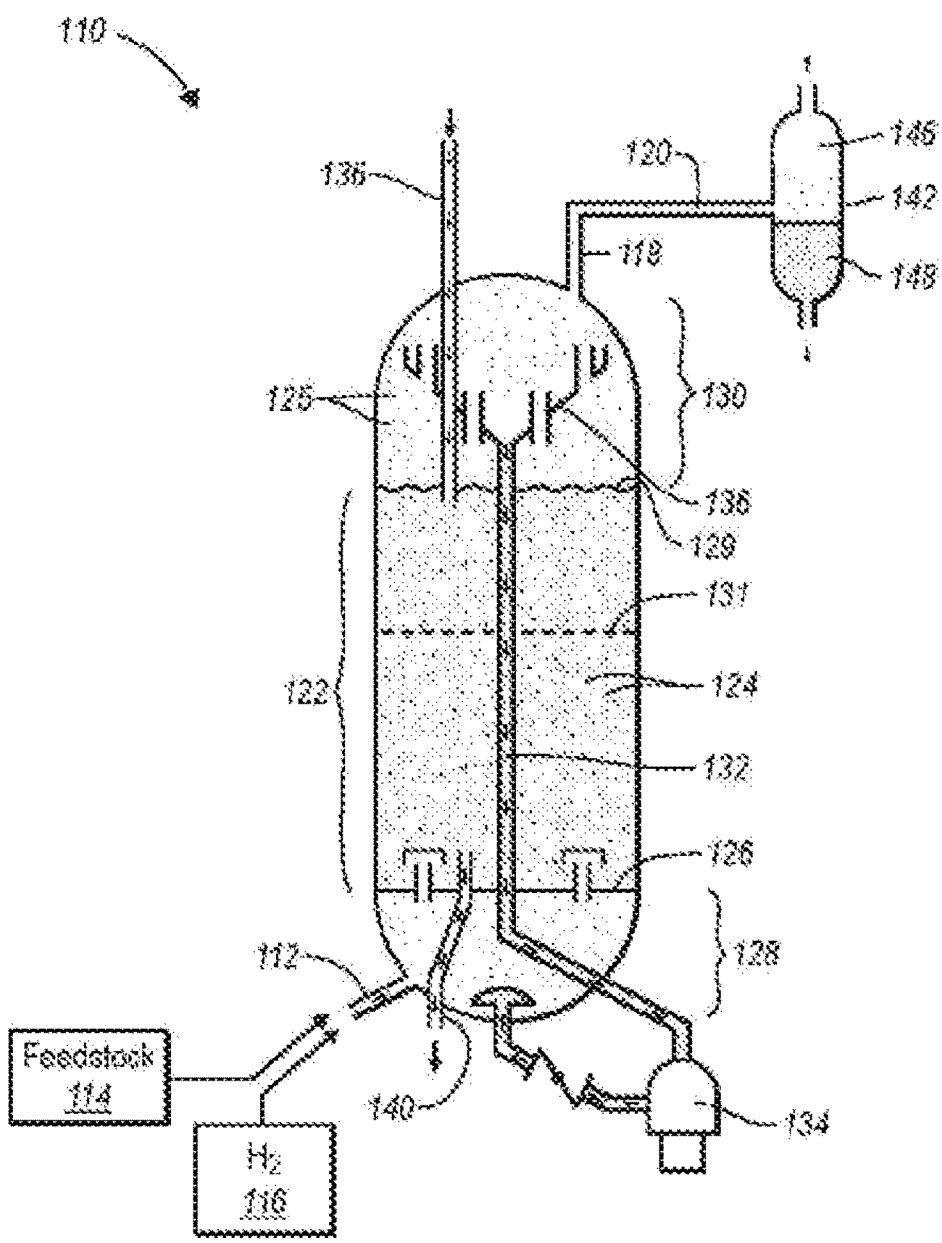
Figure 2C:
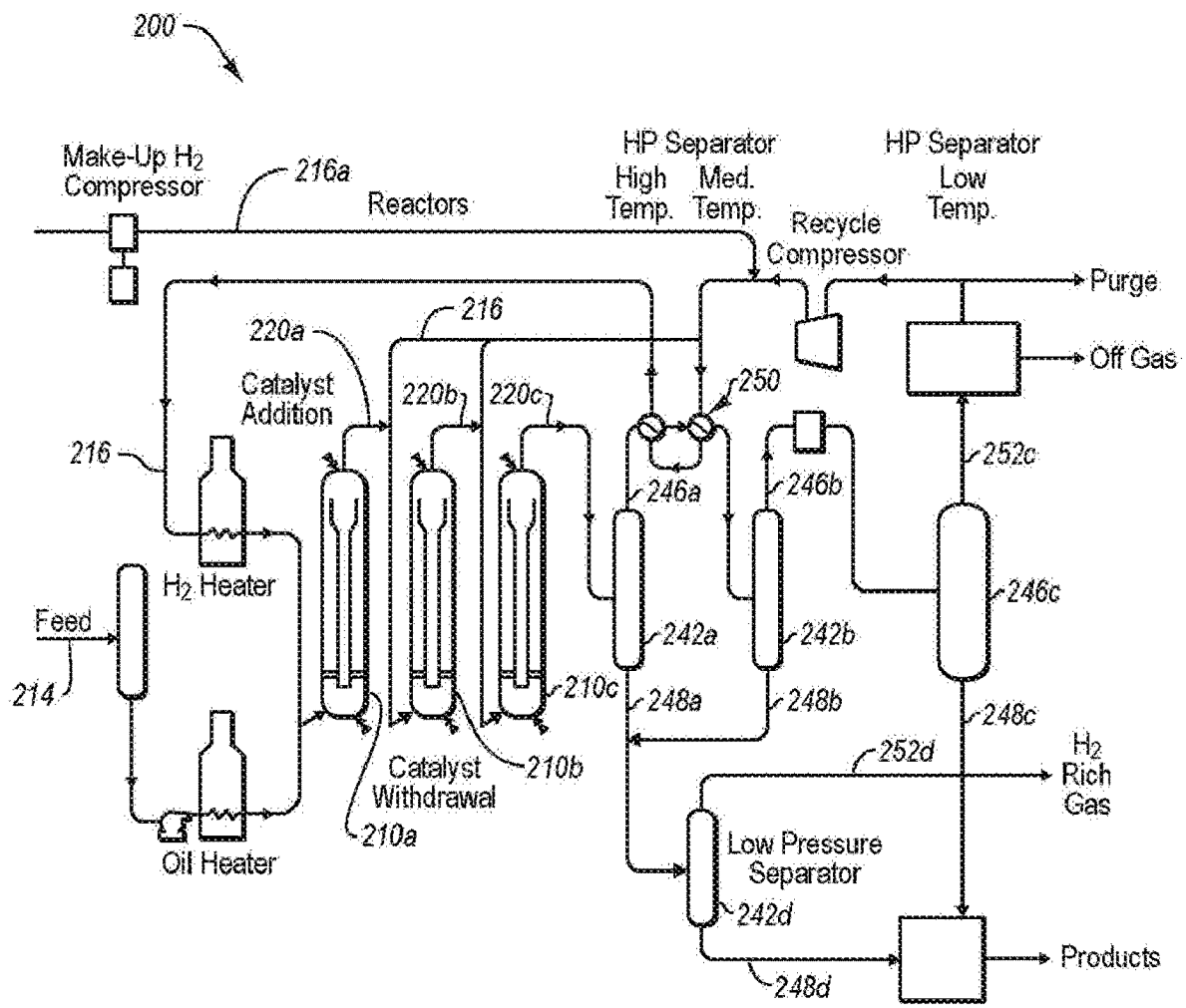

The chart in FIG. 22 plots the weight percent of micro carbon residue (MCR) found in the hot separator bottoms for each of Runs "A" and "B". Consistent with the previous data, the MCR in the hot separator bottoms for Run "B" increased throughout the test, while it initially increased then stagnated throughout Run "A".

The benefits of adding the colloidal or molecular catalyst in addition to the porous supported ebullated bed catalyst compared to using the ebullated bed catalyst by itself can be seen by the follow additional data gleaned from the foregoing test set forth in Table V:

TABLE V

| | Catalyst | | |
| --- | --- | --- | --- |
| | EB Catalyst | EB Cat. + C or M Cat. | Change |
| 525° C. + Conv. wt % | 72.8 | 81.7 | 8.9 |
| $C_1$-$C_3$, wt % feed | 3.9 | 5.3 | 1.4 |
| $C_4$-524° C. Barrel product/Barrel feed | 0.77 (34.1° API) | 0.88 (36.9° API) | 0.11 (2.8° API) |
| 525° C.+, Barrel product/Barrel feed | 0.25 (5.8° API) | 0.16 (4.3° API) | −0.09 (−1.5° API) |
| Conradson Carbon residue or MCR Conversion | 69.3 | 76.4 | 7.1 |
| $C_7$ Asph Conv wt % | 79.8 | 88.4 | 8.6 |
| Sediment after hot filtration test following the blending of 525° C. + resid with a light crude oil | 0.03 | <0.01 | −0.02 |
| Basic Sediment and Water content | 0.2 | 0.1 | −0.1 |

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for preparing and conditioning a heavy oil feedstock for hydroprocessing in a hydroprocessing system, comprising:
    a catalyst precursor;
    a hydrocarbon diluent;
    a heavy oil feedstock separate from the hydrocarbon diluent;
    a first mixing vessel configured for receiving and mixing the catalyst precursor with the hydrocarbon diluent below a temperature at which a significant portion of the catalyst precursor decomposes to form a diluted precursor mixture comprising mixture products of the catalyst precursor and the hydrocarbon diluent;
    a second mixing vessel, downstream from the first mixing vessel, configured for receiving and mixing the diluted precursor mixture with the heavy oil feedstock without heating to a temperature at which a substantial portion of the catalyst precursor decomposes to form a conditioned feedstock comprising mixture products of the catalyst precursor, the hydrocarbon diluent, and the heavy oil feedstock; and a heater, downstream from the second mixing vessel and upstream from a hydroprocessing reactor and/or that comprises the hydroprocessing reactor, and which heats the conditioned feedstock and decompose the catalyst precursor so that metal from the decomposed catalyst precursor reacts with sulfur in the heated feedstock to form metal sulfide catalyst particles in situ within the heated feedstock.

2. The system of claim 1, wherein the heavy oil feedstock comprises at least one of heavy crude oil, oil sand bitumen, atmospheric tower bottoms, vacuum tower bottoms, resid, visbreaker bottoms, coal tar, heavy oil from oil shale, or liquefied coal.

3. The system of claim 1, wherein the heavy oil feedstock comprises at least about 95% by weight of hydrocarbons having a boiling point of at least about 524° C.

4. The system of claim 1, wherein the catalyst precursor is oil soluble.

5. The system of claim 1, wherein the hydrocarbon diluent comprises at least one of hydrocarbon oil, vacuum gas oil, decant oil, cycle oil, or light gas oil.

6. The system of claim 1, wherein the catalyst precursor comprises at least one transition metal and at least one organic moiety comprising or derived from octanoic acid, 2-ethylhexanoic acid, naphthenic acid, pentacarbonyl, or hexacarbonyl.

7. The system of claim 1, wherein the catalyst precursor comprises at least one of molybdenum 2-ethylhexanoate, molybdenum naphthenate, molybdenum hexacarbonyl, vanadium octoate, vanadium naphthenate, or iron pentacarbonyl.

8. The system of claim 1, wherein the first mixing vessel is configured to receive and mix the hydrocarbon diluent and the catalyst precursor at a temperature in a range of about 25° C. to about 250° C., wherein the second mixing vessel is configured to receive and mix the diluted precursor mixture and the heavy oil feedstock at a temperature in a range of about 25° C. to about 350° C., and wherein the heater is configured to receive and heat the conditioned feedstock to a temperature in a range of about 275° C. to about 450° C.

9. The system of claim 1, wherein the first mixing vessel is configured to receive and mix the hydrocarbon diluent and the catalyst precursor at a temperature in a range of about 50° C. to about 200° C., wherein the second mixing vessel is configured to receive and mix the diluted precursor mixture and the heavy oil feedstock at a temperature in a range of about 50° C. to about 300° C., and wherein the heater is configured to receive and heat the conditioned feedstock to a temperature in a range of about 300° C. to about 440° C.

10. The system of claim 1, wherein the first mixing vessel is configured to receive and mix the hydrocarbon diluent and the catalyst precursor at a temperature in a range of about 75° C. to about 150° C., wherein the second mixing vessel is configured to receive and mix the diluted precursor mixture and the heavy oil feedstock at a temperature in a range of about 75° C. to about 250° C., and wherein the heater is configured to receive and heat the conditioned feedstock to a temperature in a range of about 375° C. to about 420° C.

11. The system of claim 1, wherein the first mixing vessel is configured to receive and mix the diluent and the catalyst precursor for a time period in a range of about 1 second to about 20 minutes, and wherein the second mixing vessel is configured to receive and mix the diluted precursor mixture and the heavy oil feedstock for a time period in a range of about 1 second to about 20 minutes.

12. The system of claim 1, wherein the first mixing vessel is configured to receive and mix the diluent and the catalyst precursor for a time period in a range of about 1 second to about 5 minutes, and wherein the second mixing vessel is configured to receive and mix the diluted precursor mixture and the heavy oil feedstock for a time period in a range of about 1 second to about 10 minutes.

13. The system of claim 1, wherein the first mixing vessel is configured to receive and mix the diluent and the catalyst precursor for a time period in a range of about 1 second to about 5 minutes, and wherein the second mixing vessel is configured to receive and mix the diluted precursor mixture and the heavy oil feedstock for a time period in a range of about 1 second to about 3 minutes.

14. The system of claim 1, wherein the heater is positioned upstream from the hydroprocessing reactor and configured to form at least a portion of the metal sulfide catalyst particles in situ in the heated feedstock and upstream from the hydroprocessing reactor.

15. The system of claim 1, wherein the system is configured so that at least a portion of the metal sulfide catalyst particles are formed in situ within the hydroprocessing reactor.

16. The system of claim 1, wherein the system is configured so that the in situ formed metal sulfide catalyst particles comprise colloidal or molecular catalyst particles less than 1 micron in size.

17. The system of claim 16, wherein the colloidal or molecular catalyst particles are less than about 100 nm in size.

18. A system for preparing and conditioning a heavy oil feedstock for hydroprocessing in a hydroprocessing system, comprising:
a first mixing vessel configured to receive a catalyst precursor and a hydrocarbon diluent and mix them below a temperature at which a significant portion of the catalyst precursor decomposes to form a diluted precursor mixture comprising mixture products of the catalyst precursor and the hydrocarbon diluent;
a second mixing vessel, downstream from the first mixing vessel, configured to receive the diluted precursor mixture and a heavy oil feedstock separate from the hydrocarbon diluent and mix them without heating to a temperature at which a substantial portion of the catalyst precursor decomposes to form a conditioned feedstock comprising mixture products of the catalyst precursor, the hydrocarbon diluent, and the heavy oil feedstock; and
a pre-heater, downstream from the second mixing vessel and upstream of a hydroprocessing reactor of the hydroprocessing system, configured to receive and heat the conditioned feedstock to decompose the catalyst precursor so that metal from the decomposed catalyst precursor reacts with sulfur in the heated feedstock to form metal sulfide catalyst particles in situ within the heated feedstock.

19. The system of claim 18, wherein the catalyst precursor is oil soluble and wherein the hydrocarbon diluent comprises at least one of hydrocarbon oil, vacuum gas oil, decant oil, cycle oil, or light gas oil.

20. The system of claim 18, wherein the catalyst precursor is selected from the group consisting of molybdenum 2-ethylhexanoate, molybdenum naphthenate, molybdenum hexacarbonyl, vanadium octoate, vanadium naphthenate, and iron pentacarbonyl.

21. The system of claim 18, wherein the first mixing vessel is configured to receive and mix the hydrocarbon diluent and the catalyst precursor for a time period in a range of about 1 second to about 5 minutes, and wherein the second mixer is configured to receive and mix the diluted precursor mixture and the heavy oil feedstock for a time period in a range of about 1 second to about 10 minutes.

22. A system for preparing and conditioning a heavy oil feedstock for hydroprocessing in a hydroprocessing system, comprising:
- a heavy oil feedstock comprised of hydrocarbons having a boiling point greater than 343° C. and metal sulfide catalyst particles dispersed in the heavy oil feedstock and having been formed from an oil-soluble catalyst precursor in situ within the heavy oil feedstock;
- a first mixing vessel configured to receive the oil-soluble catalyst precursor and a hydrocarbon diluent separate from the heavy oil feedstock and mix them below a temperature at which a significant portion of the oil-soluble catalyst precursor decomposes to form a diluted precursor mixture comprising mixture products of the oil-soluble catalyst precursor and the hydrocarbon diluent;
- a second mixing vessel, downstream from the first mixing vessel, configured to receive the diluted precursor mixture and the heavy oil feedstock and mix them without heating to a temperature at which a substantial portion of the oil-soluble catalyst precursor decomposes to form a conditioned feedstock comprising mixture products of the oil-soluble catalyst precursor, the hydrocarbon diluent, and the heavy oil feedstock; and
- a heater, downstream from the second mixing vessel, configured to heat the conditioned feedstock so as to decompose the oil-soluble catalyst precursor, cause or allow metal from the decomposed catalyst precursor to react with sulfur in the heavy oil feedstock, and form the metal sulfide catalyst particles in situ within the heavy oil feedstock.

23. The system of claim 22, wherein the first mixing vessel is configured to mix the diluent and the oil-soluble catalyst precursor for a time period in a range of about 1 second to about 10 minutes, and wherein the second mixing vessel is configured to mix the diluted precursor mixture with the entirety of the heavy oil feedstock for a time period in a range of about 1 second to about 5 minutes.

24. The system of claim 22, wherein the first mixing vessel is configured to mix the diluent and oil-soluble catalyst precursor for a time period in a range of about 1 second to about 5 minutes, and wherein the second mixing vessel is configured to mix the diluted precursor mixture with the entirety of the heavy oil feedstock for a time period in a range of about 1 second to about 3 minutes.

25. The system of claim 22, wherein the in situ formed metal sulfide catalyst particles comprise colloidal or molecular catalyst particles less than 1 micron in size.

26. A method for preparing and conditioning a heavy oil feedstock for hydroprocessing in a hydroprocessing system, comprising:
- providing a catalyst precursor, a hydrocarbon diluent, and a heavy oil feedstock separate from the hydrocarbon diluent;
- in a first mixing vessel, receiving and mixing the catalyst precursor with the hydrocarbon diluent below a temperature at which a significant portion of the catalyst precursor decomposes to form a diluted precursor mixture comprising mixture products of the catalyst precursor and the hydrocarbon diluent;
- in a second mixing vessel, downstream from the first mixing vessel, receiving and mixing the diluted precursor mixture with the heavy oil feedstock without heating to a temperature at which a substantial portion of the catalyst precursor decomposes to form a conditioned feedstock comprising mixture products of the catalyst precursor, the hydrocarbon diluent, and the heavy oil feedstock; and
- in a heater, downstream from the second mixing vessel and upstream from a hydroprocessing reactor, heating the conditioned feedstock and decomposing the catalyst precursor so that metal from the decomposed catalyst precursor reacts with sulfur in the heated feedstock to form metal sulfide catalyst particles in situ within the heated feedstock.

27. A method for preparing and conditioning a heavy oil feedstock for hydroprocessing in a hydroprocessing system, comprising:
- in a first mixing vessel, receiving a catalyst precursor and a hydrocarbon diluent and mixing them below a temperature at which a significant portion of the catalyst precursor decomposes to form a diluted precursor mixture comprising mixture products of the catalyst precursor and the hydrocarbon diluent;
- in a second mixing vessel, downstream from the first mixing vessel, receiving the diluted precursor mixture and a heavy oil feedstock and mixing them without heating to a temperature at which a substantial portion of the catalyst precursor decomposes to form a conditioned feedstock comprising mixture products of the catalyst precursor, the hydrocarbon diluent, and the heavy oil feedstock; and
- in a pre-heater, downstream from the second mixing vessel and upstream of a hydroprocessing reactor, receiving and heating the conditioned feedstock to decompose the catalyst precursor so that metal from the decomposed catalyst precursor reacts with sulfur in the heated feedstock to form metal sulfide catalyst particles in situ within the heated feedstock.

28. A method for preparing and conditioning a heavy oil feedstock for hydroprocessing in a hydroprocessing reactor, comprising:
- preparing a heavy oil feedstock comprised of hydrocarbons having a boiling point greater than 343° C. and metal sulfide catalyst particles dispersed in the heavy oil feedstock, the metal sulfide catalyst particles being formed from an oil-soluble catalyst precursor in situ within the heavy oil feedstock by:
  - in a first mixing vessel, receiving and mixing a hydrocarbon diluent and the oil-soluble catalyst precursor below a temperature at which the oil-soluble catalyst precursor decomposes to form a diluted precursor mixture comprising mixture products of the oil-soluble catalyst precursor and the hydrocarbon diluent;
  - in a second mixing vessel, downstream from the first mixing vessel, receiving the diluted precursor mixture and the heavy oil feedstock and mixing them without heating to a temperature at which a substantial portion of the oil-soluble precursor decomposes to form a conditioned feedstock comprising mixture products of the oil-soluble catalyst precursor, the hydrocarbon diluent, and the heavy oil feedstock; and
  - in a heater, downstream from the second mixing vessel, heating the conditioned feedstock so as to decompose the oil-soluble catalyst precursor, cause or allow metal from the decomposed catalyst precursor to react with sulfur in the heavy oil feedstock, and form the metal sulfide catalyst particles in situ within the heavy oil feedstock.

* * * * *

UNITED STATES PATENT AND TRADEMARK OFFICE
CERTIFICATE OF CORRECTION

PATENT NO. : 10,118,146 B2
APPLICATION NO. : 15/354230
DATED : November 6, 2018
INVENTOR(S) : Lott et al.

It is certified that error appears in the above-identified patent and that said Letters Patent is hereby corrected as shown below:

On the Title Page

Page 2
Item (60), Related U.S. Application Data, change "division of application No. 11/117,202, filed on Aug. 28, 2005" to –division of application No. 11/117,202, filed on Apr. 28, 2005–

In the Drawings

Sheet 2, replace Fig. 2A with the attached figure, where reference number 10 has been added, "Feedstack 14" has been replaced with –Feedstock 14– and "Feedstack 20" has been replaced with –Feedstock 20–

Sheet 3, replace Fig. 2B with the attached figure, where reference number 110 has been added and "Feedstack 114" has been replaced with –Feedstock 114–

Sheet 4, replace Fig. 2C with the attached figure, where reference number "242c" has been replaced with reference number –246c–

In the Specification

Column 15
Line 12, change "type" to –types–

Column 18
Lines 24-25, change "210b and 210b" to –210b and 210c–

Column 20
Line 16, change "second" to –seconds–
Line 19, change "reduce" to –reduces–

Signed and Sealed this
Twenty-third Day of April, 2019

Andrei Iancu
*Director of the United States Patent and Trademark Office*

CERTIFICATE OF CORRECTION (continued)
U.S. Pat. No. 10,118,146 B2

Line 29, change "follows" to –followed–
Line 49, change "dispersed" to –disperse–

Column 22
Lines 62-63, change "$1000^3$ (or 1 million)" to –$100^3$ (or 1 million)–

Column 27
Line 57, change "previous" to –previously–

Column 28
Line 6, change "It within" to –It is within–
Line 9, change "on" to –one–

Column 29
Line 30, change "feed" to –fed–

Column 31
Line 42, change "reside" to –resid–

Column 34
Line 17, change "describes" to –described–

Column 36
Line 6, change "included" to –includes–
Line 41, change "continuous" to –continuously–

Column 37
Line 28, change "relative" to –relatively–

In the Claims

Column 39
Line 4, change "decompose" to –decomposes–